US012370743B2

(12) United States Patent
Wynne et al.

(10) Patent No.: US 12,370,743 B2
(45) Date of Patent: Jul. 29, 2025

(54) CALIBRATION SYSTEMS AND METHODS FOR ADDITIVE MANUFACTURING SYSTEMS WITH MULTIPLE IMAGE PROJECTION

(71) Applicant: Intrepid Automation, Inc., San Diego, CA (US)

(72) Inventors: Ben Wynne, Escondido, CA (US); Ivan Dejesus Chousal, Chula Vista, CA (US); Christopher Sean Tanner, Idyllwild, CA (US); Robert Lee Mueller, San Diego, CA (US); James Michael Pingel, San Diego, CA (US)

(73) Assignee: Intrepid Automation, Inc., San Diego, CA (US)

( * ) Notice: Subject to any disclaimer, the term of this patent is extended or adjusted under 35 U.S.C. 154(b) by 225 days.

(21) Appl. No.: 17/815,398

(22) Filed: Jul. 27, 2022

(65) Prior Publication Data
US 2022/0355548 A1  Nov. 10, 2022

Related U.S. Application Data

(63) Continuation-in-part of application No. 17/661,856, filed on May 3, 2022, now Pat. No. 11,897,196,
(Continued)

(51) Int. Cl.
*B29C 64/268* (2017.01)
*B29C 64/129* (2017.01)
(Continued)

(52) U.S. Cl.
CPC .......... *B29C 64/268* (2017.08); *B29C 64/129* (2017.08); *B29C 64/135* (2017.08);
(Continued)

(58) Field of Classification Search
CPC ................ B29C 64/268; B29C 64/129; B29C 64/135; B29C 64/291; B33Y 30/00
See application file for complete search history.

(56) References Cited

U.S. PATENT DOCUMENTS

| 4,575,330 A | 3/1986 | Hull |
| 5,258,146 A | 11/1993 | Almquist et al. |

(Continued)

FOREIGN PATENT DOCUMENTS

| AU | 2008243078 A1 | 5/2010 |
| CN | 104015363 A | 9/2014 |

(Continued)

OTHER PUBLICATIONS

International Search Report and Written Opinion dated Nov. 11, 2022 for PCT Patent Application No. PCT/IB2022/056959.

(Continued)

*Primary Examiner* — Christina A Johnson
*Assistant Examiner* — Xue H Liu
(74) *Attorney, Agent, or Firm* — MLO, a professional corp.

(57) ABSTRACT

The present disclosure provides techniques for calibration systems and methods for additive manufacturing systems with multiple image projection. In some embodiments, a method of calibrating two or more image projectors of a photoreactive 3D printing system (PRPS) includes: projecting a sub-image from each of the two or more image projectors; measuring light from an image projector using a light sensor of a calibration system; receiving a signal from the light sensor; processing information from the light sensor; and changing a parameter of a sub-image based on the processed information. In some cases, a PRPS includes a calibration fixture comprising the light sensor. In some cases, a PRPS can be calibrated using a modular calibration (Continued)

fixture comprising the light sensor, wherein the modular calibration fixture can be coupled to the PRPS, leveled and height adjusted, and then a calibration routine can be performed.

15 Claims, 53 Drawing Sheets

Related U.S. Application Data which is a continuation of application No. 17/301,204, filed on Mar. 29, 2021, now Pat. No. 11,338,511, which is a continuation of application No. 16/938,298, filed on Jul. 24, 2020, now Pat. No. 11,014,301, which is a continuation of application No. 16/370,337, filed on Mar. 29, 2019, now Pat. No. 10,780,640.

(60) Provisional application No. 63/203,752, filed on Jul. 29, 2021, provisional application No. 62/734,003, filed on Sep. 20, 2018, provisional application No. 62/711,719, filed on Jul. 30, 2018.

(51) Int. Cl.
 *B29C 64/135* (2017.01)
 *B29C 64/291* (2017.01)
 *B33Y 10/00* (2015.01)
 *B33Y 30/00* (2015.01)

(52) U.S. Cl.
 CPC ............ *B29C 64/291* (2017.08); *B33Y 10/00* (2014.12); *B33Y 30/00* (2014.12)

(56) References Cited

U.S. PATENT DOCUMENTS

| | | |
|---|---|---|
| 5,554,336 A | 9/1996 | Hull |
| 5,569,431 A | 10/1996 | Hull |
| 5,902,537 A | 5/1999 | Almquist et al. |
| 6,416,185 B1 | 7/2002 | Smith |
| 6,456,339 B1 | 9/2002 | Surati et al. |
| 6,616,263 B2 | 9/2003 | Allen et al. |
| 6,652,061 B2 | 11/2003 | Allen et al. |
| 6,916,079 B2 | 7/2005 | Allen et al. |
| 7,079,157 B2 | 7/2006 | Deering |
| 7,215,362 B2 | 5/2007 | Klose |
| 7,270,426 B2 | 9/2007 | Miyazawa |
| 7,318,718 B2 | 1/2008 | Ueno |
| 7,443,364 B2 | 10/2008 | Damera-Venkata et al. |
| 7,559,658 B2 | 7/2009 | Kamiya et al. |
| 7,742,011 B2 | 6/2010 | Damera-Venkata et al. |
| 7,907,792 B2 | 3/2011 | Harville |
| 8,142,026 B2 | 3/2012 | Aufranc et al. |
| 8,666,142 B2 | 3/2014 | Shkolnik et al. |
| 8,766,998 B1 | 7/2014 | Morgan, III et al. |
| 9,453,142 B2 | 9/2016 | Rolland et al. |
| 9,497,447 B2 | 11/2016 | Green et al. |
| 9,914,266 B2 | 3/2018 | Ueda et al. |
| 9,930,307 B1 | 3/2018 | Kursula et al. |
| 10,532,554 B2 | 1/2020 | Tanner |
| 10,647,055 B2 | 5/2020 | Wynne et al. |
| 10,723,078 B2 | 7/2020 | Cooper |
| 10,773,510 B2 | 9/2020 | Wynne et al. |
| 11,054,808 B2 | 7/2021 | Wynne et al. |
| 11,584,085 B2 | 2/2023 | Wynne et al. |
| 11,760,032 B2 | 9/2023 | Tanner |
| 2007/0104361 A1 | 5/2007 | Alexander |
| 2008/0169586 A1 | 7/2008 | Hull et al. |
| 2010/0271608 A1 | 10/2010 | Schlienger et al. |
| 2014/0140627 A1 | 5/2014 | Wu et al. |
| 2014/0226167 A1 | 8/2014 | Smith et al. |
| 2015/0137426 A1 | 5/2015 | Esbroeck et al. |
| 2015/0147424 A1 | 5/2015 | Bibas |
| 2015/0202805 A1 | 7/2015 | Saruhashi et al. |
| 2016/0121547 A1 | 5/2016 | Kobayashi |
| 2016/0368221 A1 | 12/2016 | Ueda et al. |
| 2017/0102679 A1 | 4/2017 | Greene et al. |
| 2017/0283766 A1 | 10/2017 | Hribar et al. |
| 2017/0318186 A1 | 11/2017 | Morovic et al. |
| 2018/0139426 A1 | 5/2018 | Ueda |
| 2018/0236710 A1 | 8/2018 | Turner |
| 2018/0322621 A1 | 11/2018 | Craeghs et al. |
| 2018/0345594 A1 | 12/2018 | Tanner |
| 2019/0118481 A1 | 4/2019 | Brown |
| 2019/0134899 A1 | 5/2019 | Mueller et al. |
| 2019/0210289 A1 | 7/2019 | Frantzdale et al. |
| 2020/0001541 A1 | 1/2020 | Eiriksson et al. |
| 2020/0292415 A1 | 9/2020 | Goldman et al. |
| 2021/0016394 A1 | 1/2021 | McCarthy et al. |

FOREIGN PATENT DOCUMENTS

| | | |
|---|---|---|
| CN | 104669621 A | 6/2015 |
| CN | 104669625 A | 6/2015 |
| CN | 205238580 U | 5/2016 |
| CN | 104015363 B | 8/2016 |
| CN | 106273487 A | 1/2017 |
| WO | 2016179661 A1 | 11/2016 |
| WO | 2017165832 A1 | 9/2017 |
| WO | 2017210298 A1 | 12/2017 |
| WO | 2018097954 A1 | 5/2018 |

OTHER PUBLICATIONS

Extended European Search Report dated Mar. 3, 2022 for European Patent Application No. 19843981.2.
International Search Report dated Nov. 8, 2019 for PCT Patent Application No. PCT/US19/43305.
Notice of Allowance and Fees dated Jan. 28, 2022 for U.S. Appl. No. 17/301,204.
Notice of Allowance dated Jan. 15, 2021 for U.S. Appl. No. 16/938,298.
Notice of Allowance dated Jun. 29, 2020 for U.S. Appl. No. 16/370,337.
Office Action dated Jun. 1, 2020 for U.S. Appl. No. 16/370,337.
Office Action dated Oct. 6, 2020 for U.S. Appl. No. 16/938,298.
Office Action dated Sep. 2, 2021 for U.S. Appl. No. 17/301,204.
Office Action dated Jul. 27, 2022 for China Patent Application No. 201980051272.5.
Bimber et al, "Multifocal projection: a multiprojector technique for increasing focal depth," in IEEE Transactions on Visualization and Computer Graphics, vol. 12, No. 4, pp. 658-667, Jul.-Aug. 2006, doi: 10.1109/TVCG.2006.75.
Brown and Lowe, "Automatic panoramic image stitching using invariant features." International journal of computer vision, 74 (Aug. 2007): 59-73.
Camano et al "Materials characterization for stereolithography." High Value Manufacturing: Advanced Research in Virtual and Rapid Prototyping: Proceedings of the 6th International Conference on Advanced Research in Virtual and Rapid Prototyping,Leiria, Portugal, Oct. 1-5, 2013. CRC Press, 2013.
Garcia-Dorado and Cooperstock, "Fully automatic multi-projector calibration with an uncalibrated camera," CVPR 2011 Workshops, Colorado Springs, CO, USA, Jul. 2011, pp. 29-36, doi: 10.1109/CVPRW.2011.5981726.
Harville et al, "Practical Methods for Geometric and Photometric Correction of Tiled Projector," 2006 Conference on Computer Vision and Pattern Recognition Workshop (CVPRW'06), New York, NY, USA, Jul. 2006, pp. 5-5, doi: 10.1109/CVPRW.2006.161.
Jacobs, Rapid Prototyping & Manufacturing, Fundamentals of StereoLithography (1992), Chapters 2, 10, and 11.
Lewis, Applied Optimal Control & Estimation (1992), Chapter 1.
Majumber er al. Practical Multi-Projector Display Design (2007), Chapters 1-4, B and C.
Quang, et al, "Auto-focusing technique in a projector-camera system," 2008 10th International Conference on Control, Automation, Robotics and Vision, Hanoi, Dec. 2008, pp. 1914-1919, doi: 10.1109/ICARCV.2008.4795821.

(56) References Cited

OTHER PUBLICATIONS

Song et al, "A new edge blending paradigm for multi-projector tiled display wall," 2010 International Conference on Computer Application and System Modeling (ICCASM 2010), Taiyuan, Oct. 2010, pp. V5-349-V5-352, doi: 10.1109/ICCASM.2010.5620133.

Xu et al., "Influence of recoating parameters on thickness of resin layer in high-resolution stereolithography system." Advanced Materials Research 189 (Feb. 2011): 3697-3700.

Zhou et al "Parametric process optimization to improve the accuracy of rapid prototyped stereolithography parts." International Journal of Machine Tools and Manufacture 40.3 (Feb. 2000): 363-379.

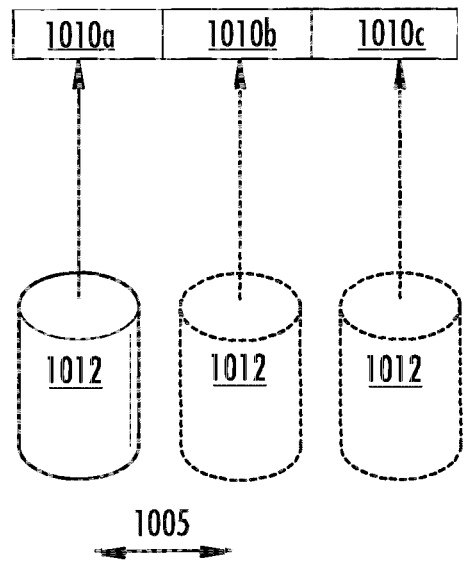
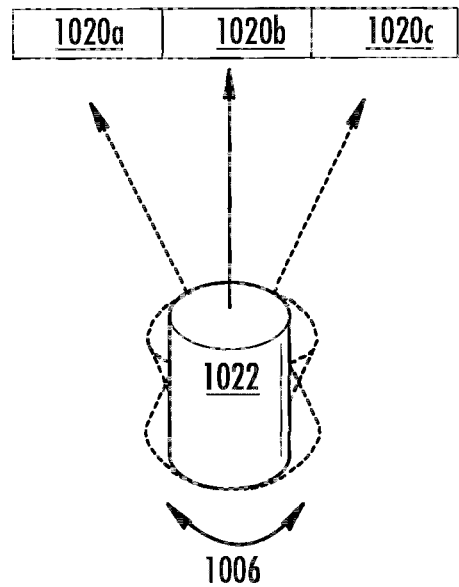
FIG. 10A
FIG. 10B
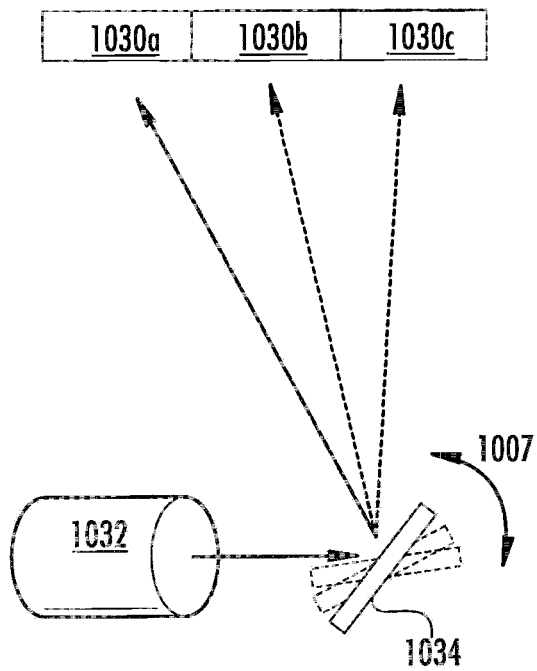
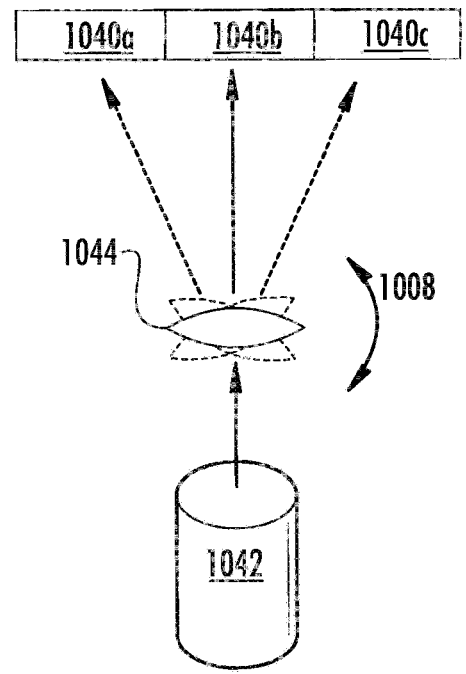
FIG. 10C
FIG. 10D

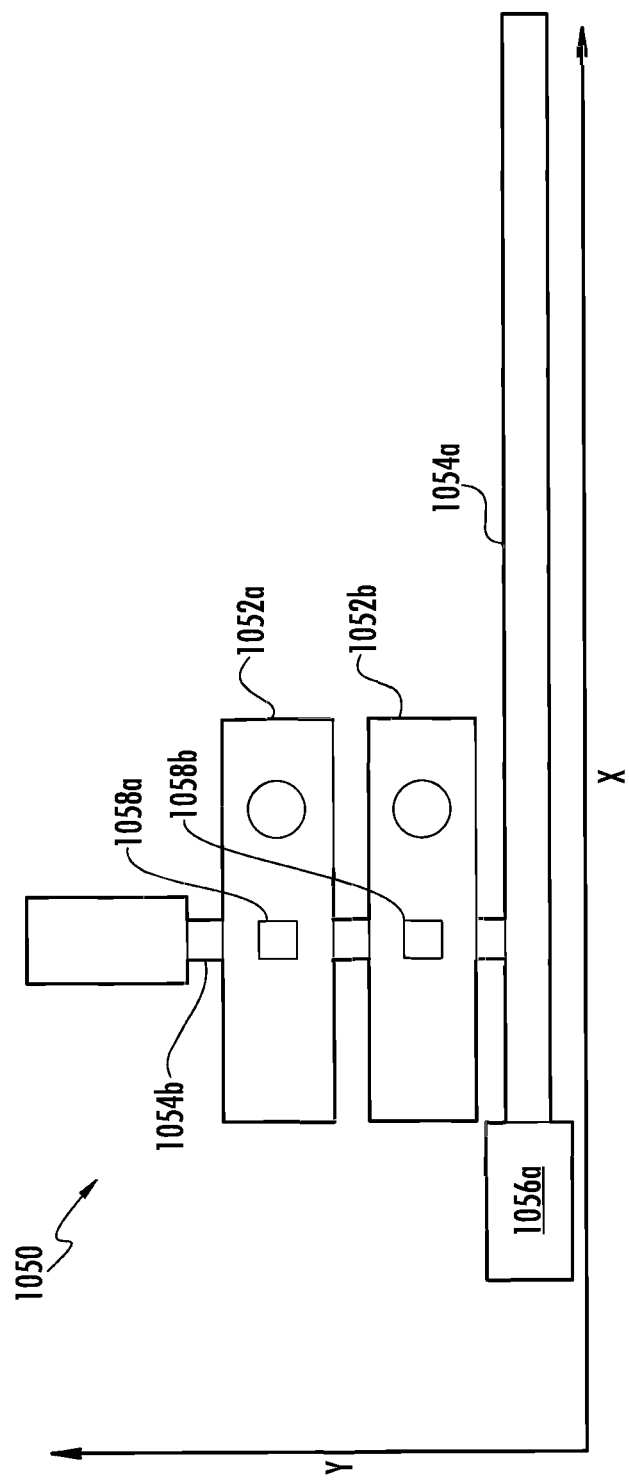

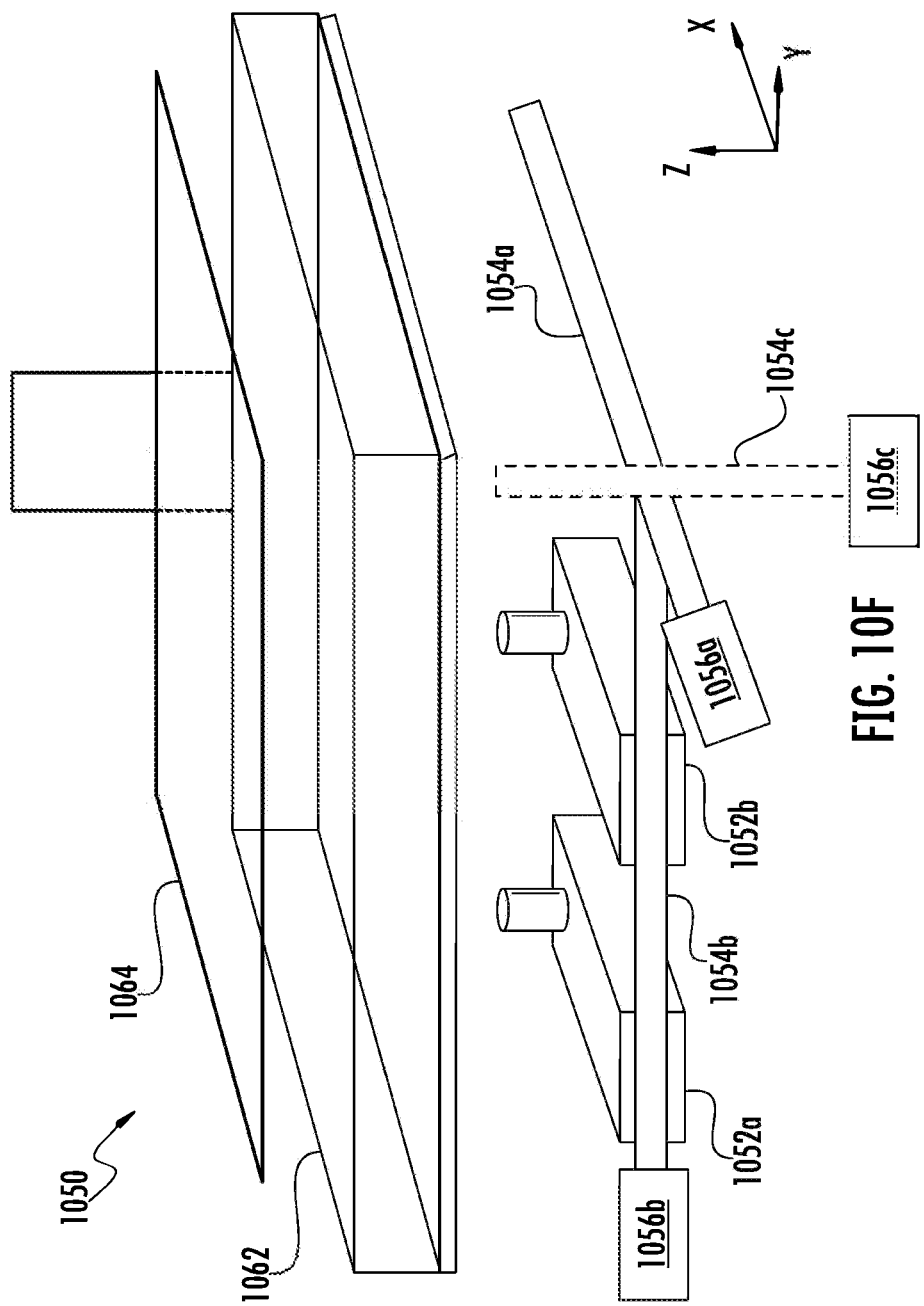

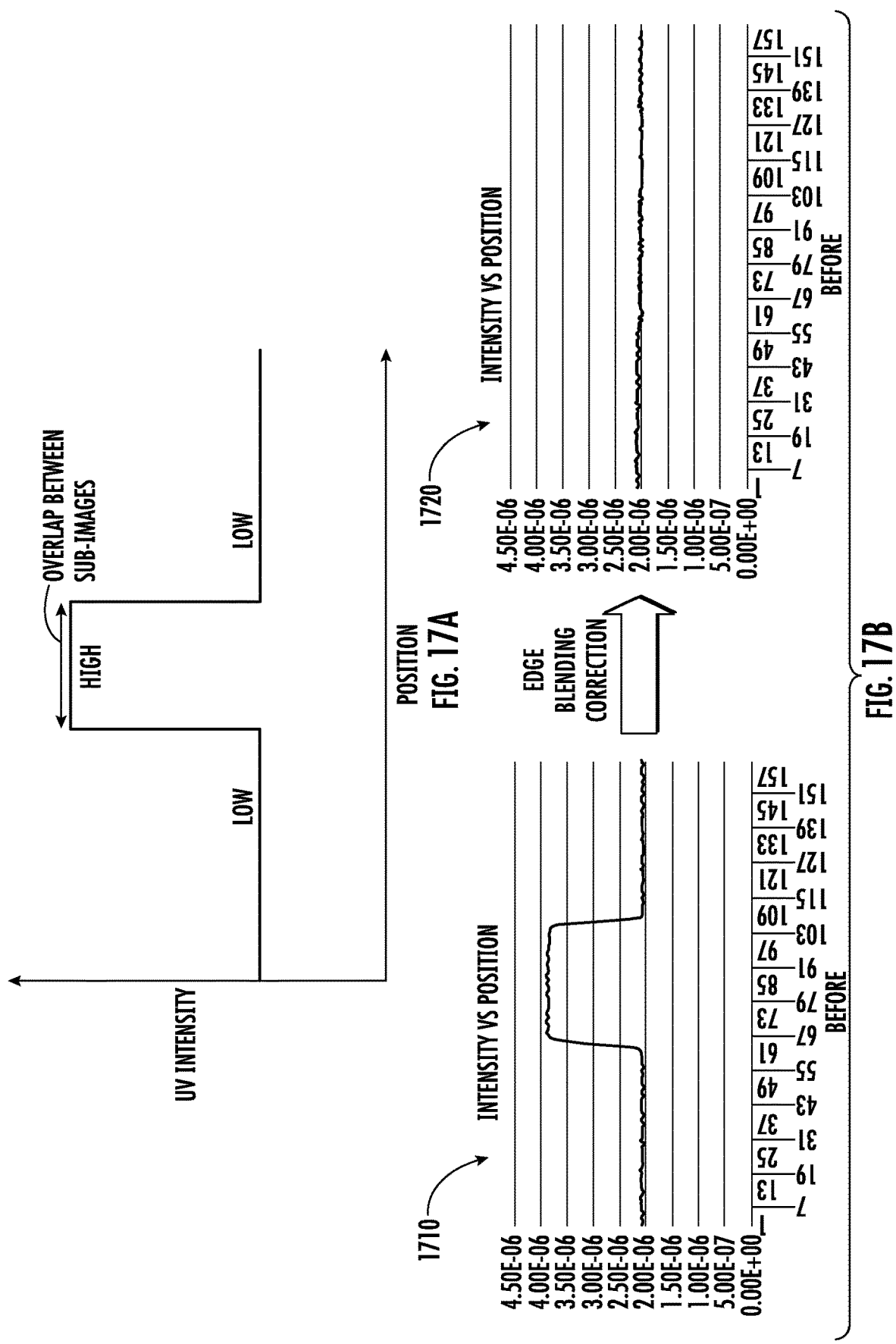

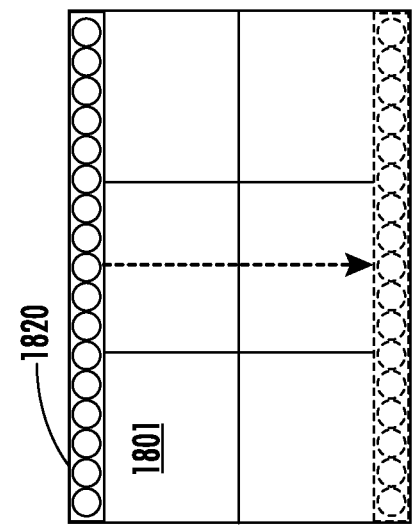
FIG. 18A X-Y SWEEP MOTION
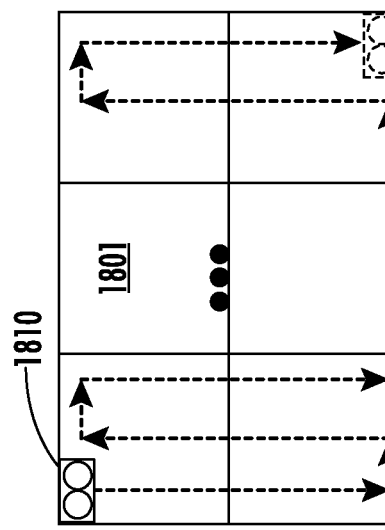
FIG. 18B Y-X SWEEP MOTION
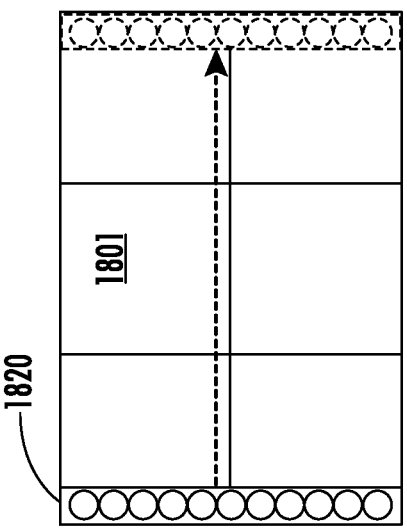
FIG. 18E ARRAY Y MOTION
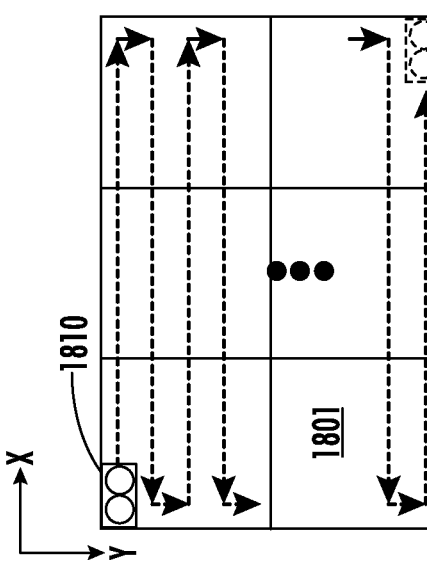
FIG. 18C Y RETRACE MOTION
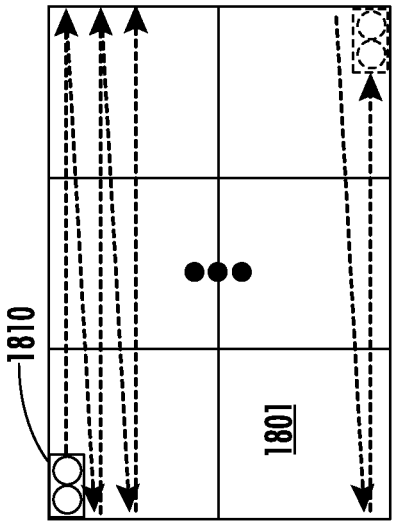
FIG. 18D X RETRACE MOTION
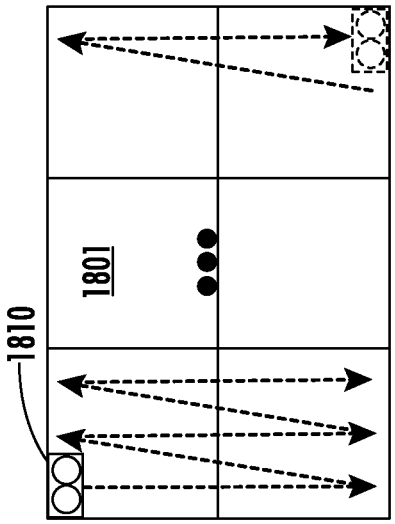
FIG. 18F ARRAY X MOTION

Z MOTION, SENSOR CLUSTER RIDES X-AXIS
(VAT LEVEL CAN BE ADJUSTED)

Z MOTION, SENSOR ARRAY
(VAT LEVEL CAN BE ADJUSTED)

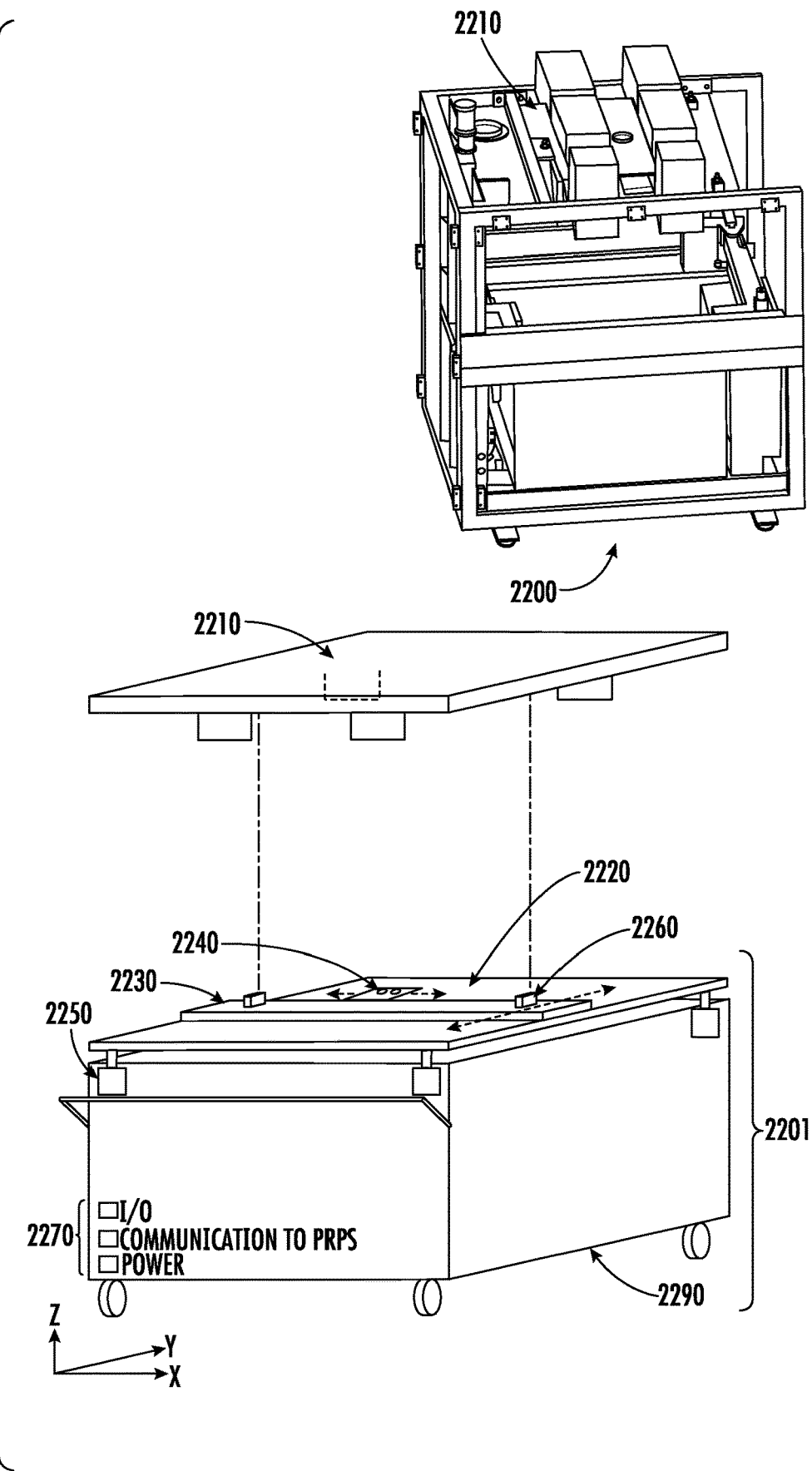

CALIBRATION SYSTEMS AND METHODS FOR ADDITIVE MANUFACTURING SYSTEMS WITH MULTIPLE IMAGE PROJECTION

RELATED APPLICATIONS

This application is a continuation-in-part of U.S. Non-Provisional patent application Ser. No. 17/661,856, filed May 3, 2022, and entitled "Multiple Image Projection System and Method For Additive Manufacturing"; and claims priority to U.S. Provisional Patent Application No. 63/203,752, filed Jul. 29, 2021, and entitled "Calibration Systems and Methods for Additive Manufacturing Systems with Multiple Image Projection"; all of which are hereby incorporated by reference for all purposes.

U.S. Non-Provisional patent application Ser. No. 17/661,856 is a continuation of U.S. Non-Provisional patent application Ser. No. 17/301,204, filed Mar. 29, 2021, which is a continuation of U.S. patent application Ser. No. 16/938,298, filed Jul. 24, 2020 and issued as U.S. Pat. No. 11,014,301, which is a continuation of U.S. patent application Ser. No. 16/370,337, filed Mar. 29, 2019 and issued as U.S. Pat. No. 10,780,640, which claims priority to U.S. Provisional Patent Application No. 62/711,719, filed on Jul. 30, 2018, and entitled "Multiple Image Projection System for Additive Manufacturing"; and U.S. Provisional Patent Application No. 62/734,003, filed on Sep. 20, 2018, and entitled "Multiple Image Projection System for Additive Manufacturing"; which are hereby incorporated by reference for all purposes.

BACKGROUND

Stereolithography (SLA) 3D printing classically employed a point laser or lasers that were moved around a 2D plane to rasterize the outline and fill of a layer. Instead of SLA, conventional 3D printing systems typically use digital light processing (DLP) or alike imaging in order to expose an entire layer at once with improved speed. However, one problem that arises with conventional additive manufacturing systems utilizing DLP is that as the layer size increases, the pixel size increases proportionally. The result is a decrease in the resolution of the final part, which will negatively affect part accuracy and surface finish. This also has the negative affect of reducing the projected energy density, which slows down the print process further as each layer needs a longer exposure time. Therefore, as DLP systems are used for larger layer sizes, the theoretical advantage that full layer exposing achieves over conventional methods is reduced.

SUMMARY

The present disclosure provides techniques for calibration systems and methods for additive manufacturing systems with multiple image projection. In some embodiments, a method of calibrating two or more image projectors of a photoreactive 3D printing system (PRPS) includes: projecting a sub-image from each of the two or more image projectors to form an array of sub-images in a build area of the PRPS, wherein the two or more image projectors are controlled by an image display subsystem; positioning a calibration fixture having a light sensor such that the light sensor lines up with a position of one or more of the sub-images; measuring light from an image projector of the two or more image projectors using the light sensor; receiving a signal from the light sensor using the image display subsystem; processing information from the light sensor using the image display subsystem; and sending a signal from the image display subsystem to the image projector of the two or more image projectors to change a parameter of a sub-image in the array of sub-images based on the processed information.

In some embodiments, a photoreactive 3D printing system (PRPS) includes: a resin vat comprising a build area; two or more image projectors each projecting a sub-image onto the build area; and a calibration fixture comprising a light sensor configured to measure light from the two or more image projectors, wherein the light sensor lines up with a position of the one or more of the sub-images; and an image display subsystem in communication with the calibration fixture and the two or more image projectors.

In some embodiments, a method of calibrating two or more image projectors of a photoreactive 3D printing system (PRPS) includes: coupling a modular calibration fixture to the PRPS; leveling the modular calibration fixture; adjusting a height of a light sensor of the modular calibration fixture; and performing a calibration routine using the light sensor of the modular calibration fixture to adjust a parameter of a sub-image projected by an image projector of the two or more image projectors.

In some embodiments, a modular calibration system used for calibrating a photoreactive 3D printing system (PRPS) includes: a light sensor coupled to a light sensor carriage that moves the light sensor in a first lateral direction; a carriage assembly that moves the light sensor and the light sensor carriage in a second lateral direction, wherein the second lateral direction is approximately perpendicular to the first lateral direction; two or more leveling motors that move the carriage assembly, the light sensor, and the light sensor carriage in a third direction, wherein the third direction is a height that is approximately perpendicular to the first lateral direction and the second lateral direction, such that the levelness of the calibration fixture and a height of the light sensor can both be adjusted using the two or more leveling motors; and a controller electrically coupled to the PRPS, wherein the controller is configured to receive signals from the light sensor, send information from the light sensor to the PRPS, and control the carriage assembly, the light sensor carriage, and the leveling motors.

BRIEF DESCRIPTION OF FIGURES

FIGS. 10A-10D are simplified schematics of moving light sources or moving optical systems to form composite images made up of moving sub-images, in accordance with some embodiments.

FIG. 10E is a simplified schematic in side view of a PRPS with moving light sources, in accordance with some embodiments.

FIG. 10F is a simplified schematic in perspective view of a PRPS with moving light sources, in accordance with some embodiments.

FIG. 17A shows a plot of detected UV light intensity (or irradiance) versus position as a sensor of the calibration fixture is swept in a direction across an overlap region between two adjacent sub-images, in accordance with some embodiments.

FIG. 17B shows an example of UV light intensity (or irradiance) versus position that was collected using a calibration fixture on a PRPS before and after edge blending correction, in accordance with some embodiments.

FIGS. 18A-18F depict some light sensor motion examples that can be executed to acquire the necessary data to calibrate one or more properties (as described herein) of a multi-image plane, in accordance with some embodiments.

FIGS. 22A-22H show examples of PRPSs with modular calibration fixtures, in accordance with some embodiments.

DEFINITIONS

Figure 1A:
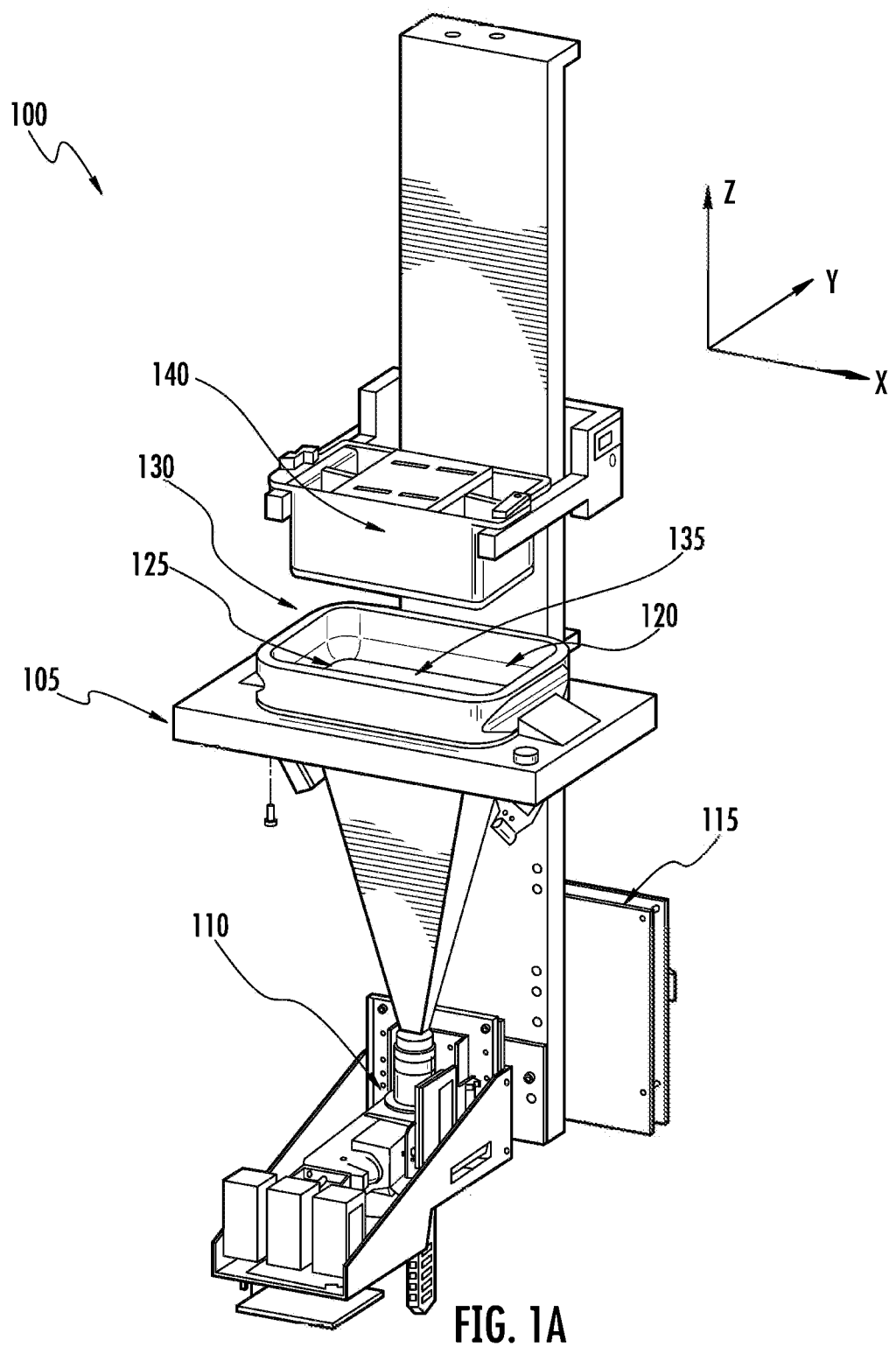
FIGS. 1A-1D are simplified schematics in perspective views of a photoreactive 3D printing systems (PRPS), in accordance with some embodiments.
Figure 1B:
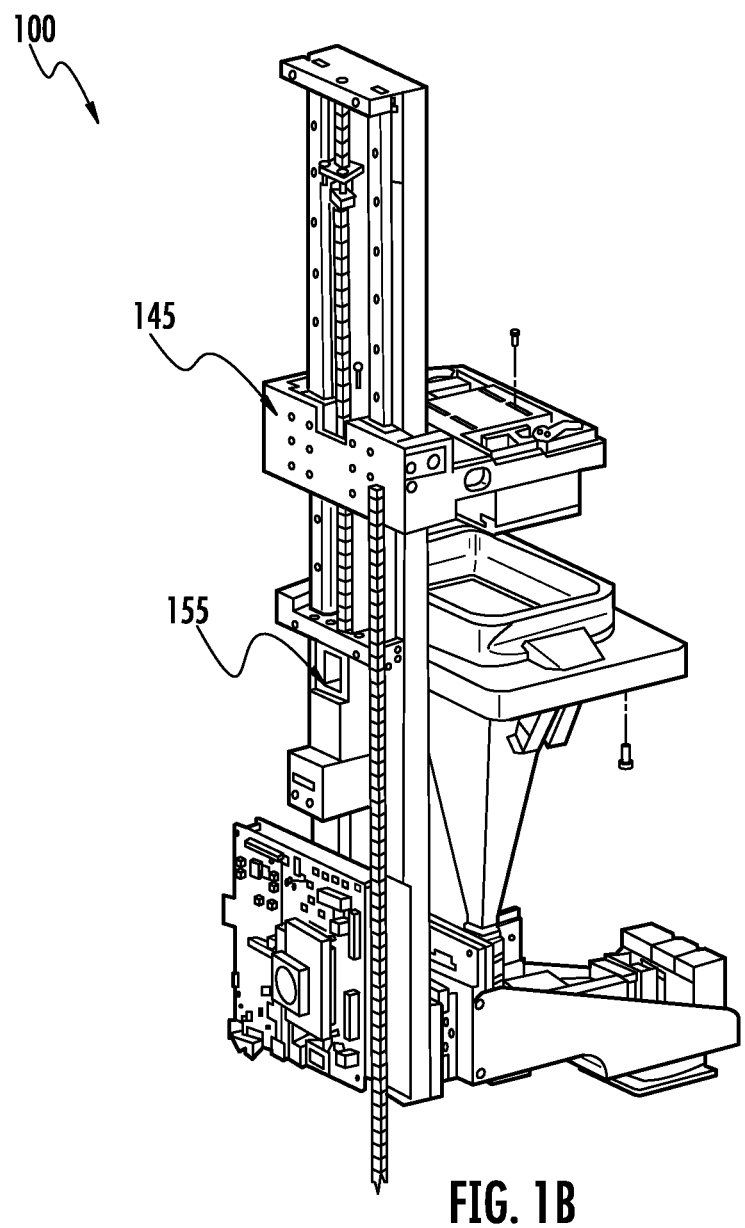
Figure 1C:
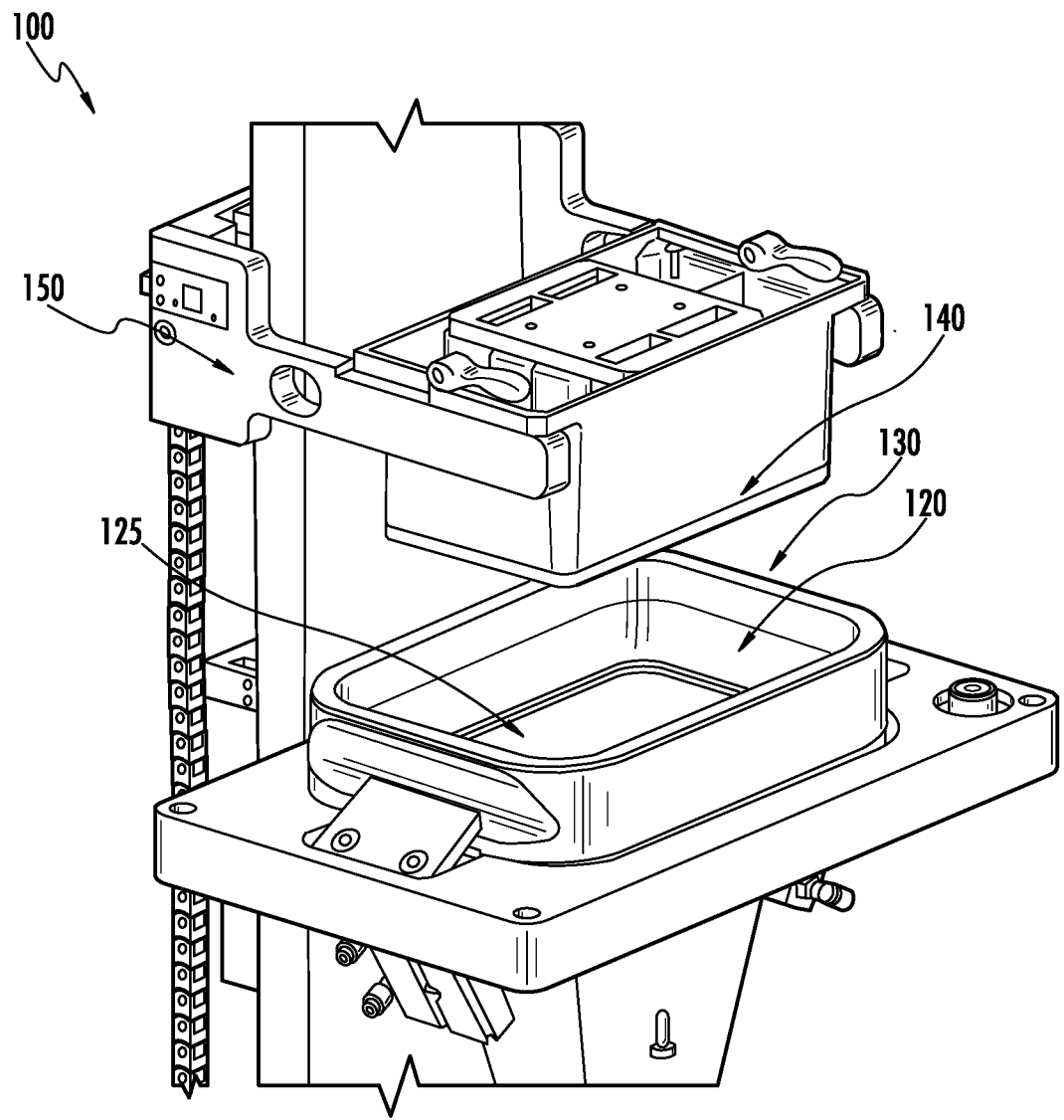
Figure 1D:
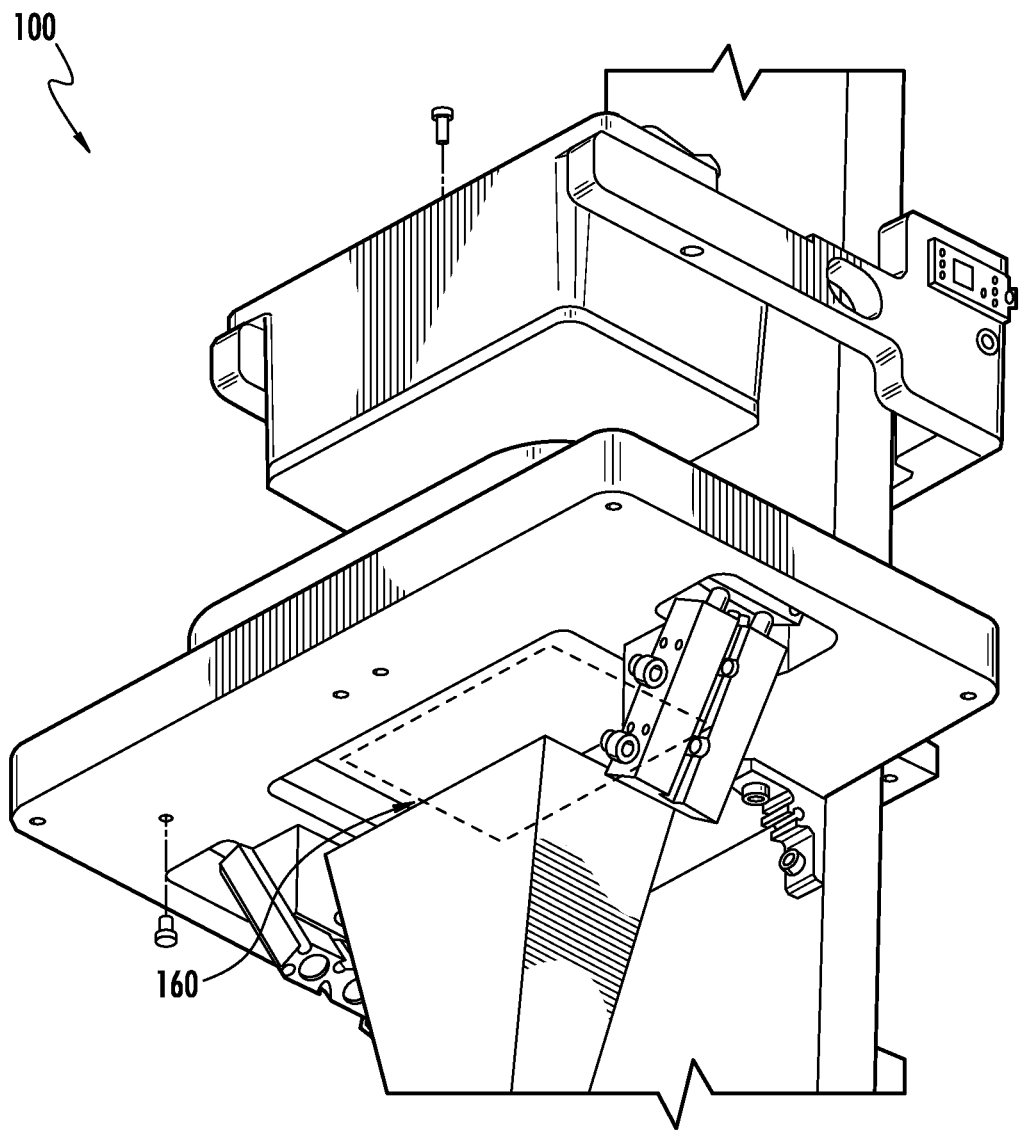

In the present disclosure, the following terms shall be used.

Resin: Generally refers to a monomer solution in an uncured state.

Resin Pool: Volume of resin contained within a Resin Tub, immediately available for a Print Job.

Resin Tub: Mechanical assembly incorporating a membrane and which holds the resin pool.

Print Platform (i.e., Print Tray): System attached to the elevator upon which the resin is cured and the physical part (i.e., printed object) is built.

Elevator system: System of parts that connect the Z-Stage to the Print Platform.

Z-Stage: Electro-mechanical system that provides motion to the Elevator System.

Polymer Interface: The physical boundary of the Resin Pool and the Image Display System's focal plane.

Membrane: Transparent media creating the Polymer Interface, generally oriented parallel to the XY plane.

Build Area: Area of the XY plane that can be physically addressed by the Image Display System.

Print Job (i.e., Print Run): Sequence of events initiated by the first, up to and including the last command of a 3D print.

Print Process Parameters (PPPs): Input variables that determine the system behavior during a Print Job.

Print Process: Overall print system behavior as governed by the Print Process Parameters.

Exposure: Temporal duration during which energy is transferred to the Polymer Interface.

Irradiance: Radiant power, per unit area, incident upon a surface, e.g., the Polymer Interface.

Pixel: Smallest subdivision of the build area XY plane where Irradiance can be directly manipulated.

Light: Electromagnetic radiation with ultraviolet (UV) wavelengths (e.g., from about 100 nm to about 500 nm), visible wavelengths (e.g., from about 380 nm to about 780 nm), and/or infrared (IR) wavelengths (e.g., from about 780 nm to about 1 mm). For example, light with UV wavelengths may in some cases be referred to as "UV light." Accordingly, "light sensors," as used herein, are sensors capable of detecting electromagnetic radiation with UV, visible, and/or IR wavelengths. For example, a light sensor capable of detecting light with UV wavelengths may in some cases be referred to as a "UV light sensor."

DETAILED DESCRIPTION

This disclosure describes additive manufacturing systems and methods with large build areas that are capable of high resolution and energy density. In some embodiments, the systems and methods utilize multiple image projectors to project a composite image onto the build area, thereby enabling large illumination areas with high pixel density (i.e., resolution) and high energy density. Such systems and methods are advantageous over conventional systems that increase the build area by magnifying an image from a single projector, which reduces the resolution and the projected energy density in the build area.

In some embodiments, the additive manufacturing system is a photoreactive 3D printing system (PRPS) and includes an image projection system with multiple image projectors. The image projection system can project a composite image onto a build area. A display subsystem can be used to control the image projection system using digital light processing (DLP). In some embodiments, the image projection system contains a plurality of image projectors, and the composite image contains a plurality of sub-images arranged in an array, where each of the image projectors projects a sub-image onto a portion of the build area.

In some embodiments, the display subsystem controls each of the image projectors in the image projection system to adjust the properties of each sub-image and the alignment of the position of each sub-image within the composite image. Some examples of digital filters that can be used by the display subsystem to adjust the properties of each sub-image include warp correction filters that provide geometric correction, filters with edge blending bars at one or more sub-image edges, irradiance mask filters that normalize irradiance, and "gamma" adjustment mask filters that adjust image (or sub-image) energy based on a reactivity of the resin being used. The use of filters that are applied (or overlaid) to a base source file (i.e., part of the instructions used to define the geometry of a part to be printed by the system), rather than changing the base source file itself, is advantageous because different filters can be used in different situations, or changed periodically, without changing the base source file. For example, the same base source file can be used with different resins by applying different gamma correction filters (associated with each different resin) to the unchanged base source file. Additionally, the base source file can be a vector-based file that includes desired physical dimensions for an object to be printed, while the filters can be discretized files (e.g., to line up with the pixels within the image projection system).

In some embodiments, the additive manufacturing system (i.e., the PRPS) further includes a calibration fixture containing a plurality of sets of light sensors. Each set of light sensors in the calibration fixture can be used to monitor a projected sub-image in a composite image. The properties of each sub-image and the alignment of the position of each sub-image within the composite image can then be adjusted using feedback from the plurality of sets of light sensors in the calibration fixture.

The intended image to be projected onto the build area can be referred to as the ideal composite image. Various issues can cause a composite image to be distorted compared to the ideal composite image. Some examples of issues that cause distortion of a composite image are mechanical assembly and mounting geometry (e.g., projectors with different angles relative to the build area that can lead to skewed projected sub-images), mechanical assembly and mounting inaccuracies (e.g., that can lead to misaligned sub-images), thermal effects that can misalign the projector systems (e.g., from LEDs, LED driving electronics, and other heat sources), and differences between projectors within the image projection system (e.g., variations in projected intensity between projectors). Furthermore, multiple issues that cause distortion of a composite image can act together, compounding the image distortion. For example, mechanical alignment tolerances for each part of the assembled PRPS (e.g., parts within the image projection system) can be met, but the slight misalignments for each part can stack up together and significantly distort the image. In some embodiments, the properties of each sub-image and the alignment of the position of each sub-image within the composite image are adjusted using digital filters to match (or substantially match) the ideal composite image. This can be beneficial because it can be more cost effective to adjust the properties of the sub-images to improve the composite image quality as described herein, compared to improving the mechanical alignment tolerances for the parts of the assembled PRPS to improve the composite image quality.

Some conventional large area displays (e.g., signs, projected movies, etc.) utilize composite images containing an array of sub-images projected from multiple image projectors, and employ filters to adjust the sub-images within the composite image. There are several substantial differences, however, between the requirements for large area displays and additive manufacturing systems that lead to significant differences in the image projection systems used in each application. Large area displays are used to display information to human observers, whose eyes are much less sensitive to variations than PRPSs. PRPSs use light to cause resin to react, and the reaction dynamics of the resin are much different (and less tolerant to deviations) than the response (and discrimination) of a human eye. As a result, the systems and methods used in conventional large area displays are not capable of meeting all of the requirements of additive manufacturing systems. Image projection systems that project composite images in additive manufacturing systems having substantial differences compared to large area displays are described in more detail below.

FIGS. 1A-1D illustrate an example of a PRPS 100, in accordance with some embodiments. The PRPS 100 shown in FIGS. 1A-1D contains a chassis 105, an image projection system (i.e., an "illumination system") 110, a display subsystem (i.e., an "image display system") 115, a resin pool 120, a polymer interface 125, a resin tub 130, a membrane 135, a print platform 140, an elevator system 145, elevator arms 150, a z-stage 155, and a build area 160. The operation of the example PRPS 100 shown in FIGS. 1A-1D will now be described.

The chassis 105 is a frame to which some of the PRPS 100 components (e.g., the elevator system 145) are attached. In some embodiments, one or more portions of the chassis 105 is oriented vertically, which defines a vertical direction (i.e., a z-direction) along which some of the PRPS 100 components (e.g., the elevator system 145) move. The print platform 140 is connected to the elevator arms 150, which are movably connected to the elevator system 145. The elevator system 145 enables the print platform 140 to move in the z-direction (as shown in FIG. 1A) through the action of the z-stage 155. The print platform 140 can thereby be lowered into the resin pool 120 to support the printed part and lift it out of the resin pool 120 during printing.

The illumination system 110 projects a first image through the membrane 135 into the resin pool 120 that is confined within the resin tub 130. The build area 160 is the area where the resin is exposed (e.g., to ultraviolet light from the illumination system) and crosslinks to form a first solid polymer layer on the print platform 140. Some non-limiting examples of resin materials include acrylates, epoxies, methacrylates, urethanes, silicone, vinyls, combinations thereof, or other photoreactive resins that crosslink upon exposure to illumination. Different photoreactive polymers have different curing times. Additionally, different resin formulations (e.g., different concentrations of photoreactive polymer to solvent, or different types of solvents) have different curing times. In some embodiments, the resin has a relatively short curing time compared to photosensitive resins with average curing times. Methods for adjusting the curing time for a specific resin (i.e., "gamma" corrections) are discussed further herein. In some embodiments, the resin is photosensitive to wavelengths of illumination from about 200 nm to about 500 nm, or to wavelengths outside of that range (e.g., greater than 500 nm, or from 500 nm to 1000 nm). In some embodiments, the resin forms a solid with properties after curing that are desirable for the specific object being fabricated, such as desirable mechanical properties (e.g., high fracture strength), desirable optical properties (e.g., high optical transmission in visible wavelengths), or desirable chemical properties (e.g., stable when exposed to moisture). After exposure of the first layer, the print platform 140 moves upwards (i.e., in the positive z-direction as shown in FIG. 1A), and a second layer can be formed by exposing a second pattern projected from the illumination system 110. This "bottom up" process can then be repeated until the entire object is printed, and the finished object is then lifted out of the resin pool 120.

In some embodiments, the illumination system 110 emits radiant energy (i.e., illumination) over a range of different wavelengths, for example, from 200 nm to 500 nm, or from 500 nm to 1000 nm, or over other wavelength ranges. The illumination system 110 can use any illumination source that is capable of projecting an image. Some non-limiting examples of illumination sources are arrays of light emitting diodes, liquid crystal based projection systems, liquid crystal displays (LCDs), liquid crystal on silicon (LCOS) displays, mercury vapor lamp based projection systems, digital light processing (DLP) projectors, discrete lasers, and laser projection systems.

Figure 1E:
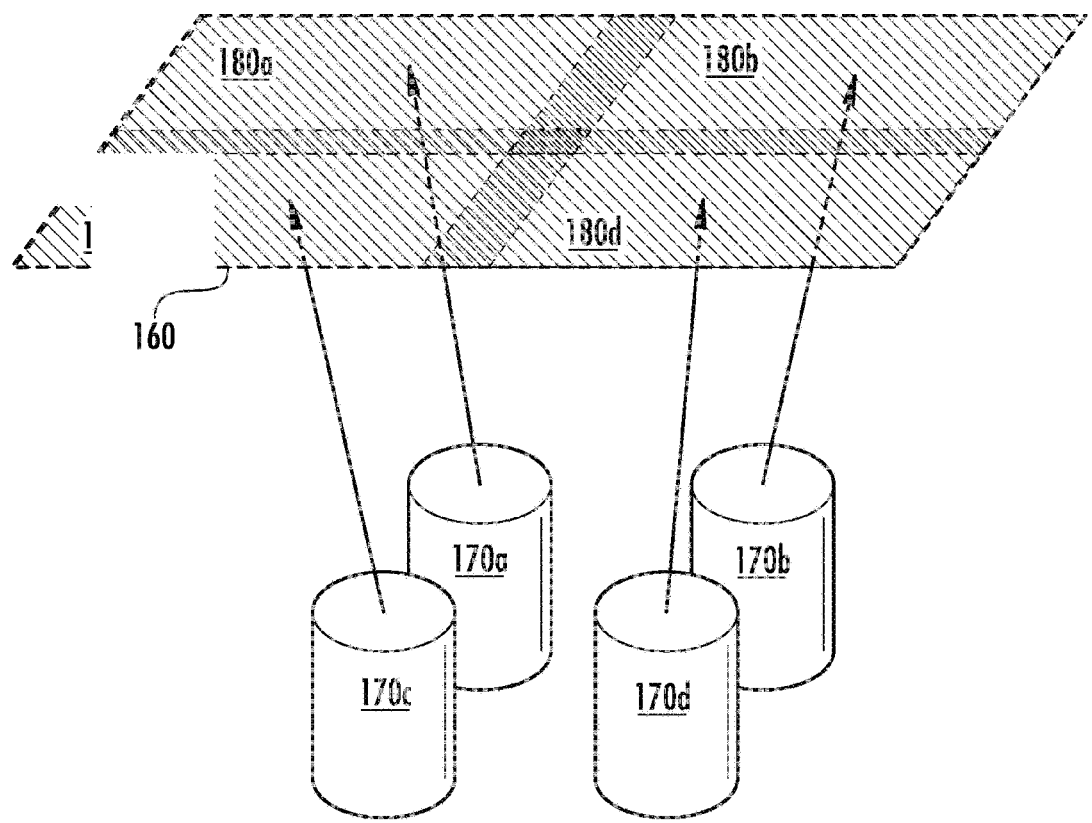
FIG. 1E is a simplified schematic in perspective view of a PRPS with four image projectors and a composite image with four sub-images, in accordance with some embodiments.

In some embodiments, the illumination systems (i.e., the image projection systems) of the PRPSs described herein (e.g., as shown in element 110 of the PRPS in FIGS. 1A-1D) contain a plurality of image projectors configured in an array. This can be advantageous to cover a large printing area with a high resolution of build element pixels without sacrificing print speed. FIG. 1E shows a simplified schematic example of a PRPS containing four image projectors 170a-d configured to project four sub-images 180a-d to form a single composite image over build area 160. FIG. 1E shows an example where the illumination systems are projection based systems, however, in other embodiments, the illumination systems can be projection or non-projection based systems including those that contain arrays of light emitting diodes, liquid crystal based projection systems, LCDs, LCOS displays, mercury vapor lamp based projection systems, DLP projectors, discrete lasers, and laser projection systems.

Figure 1F:
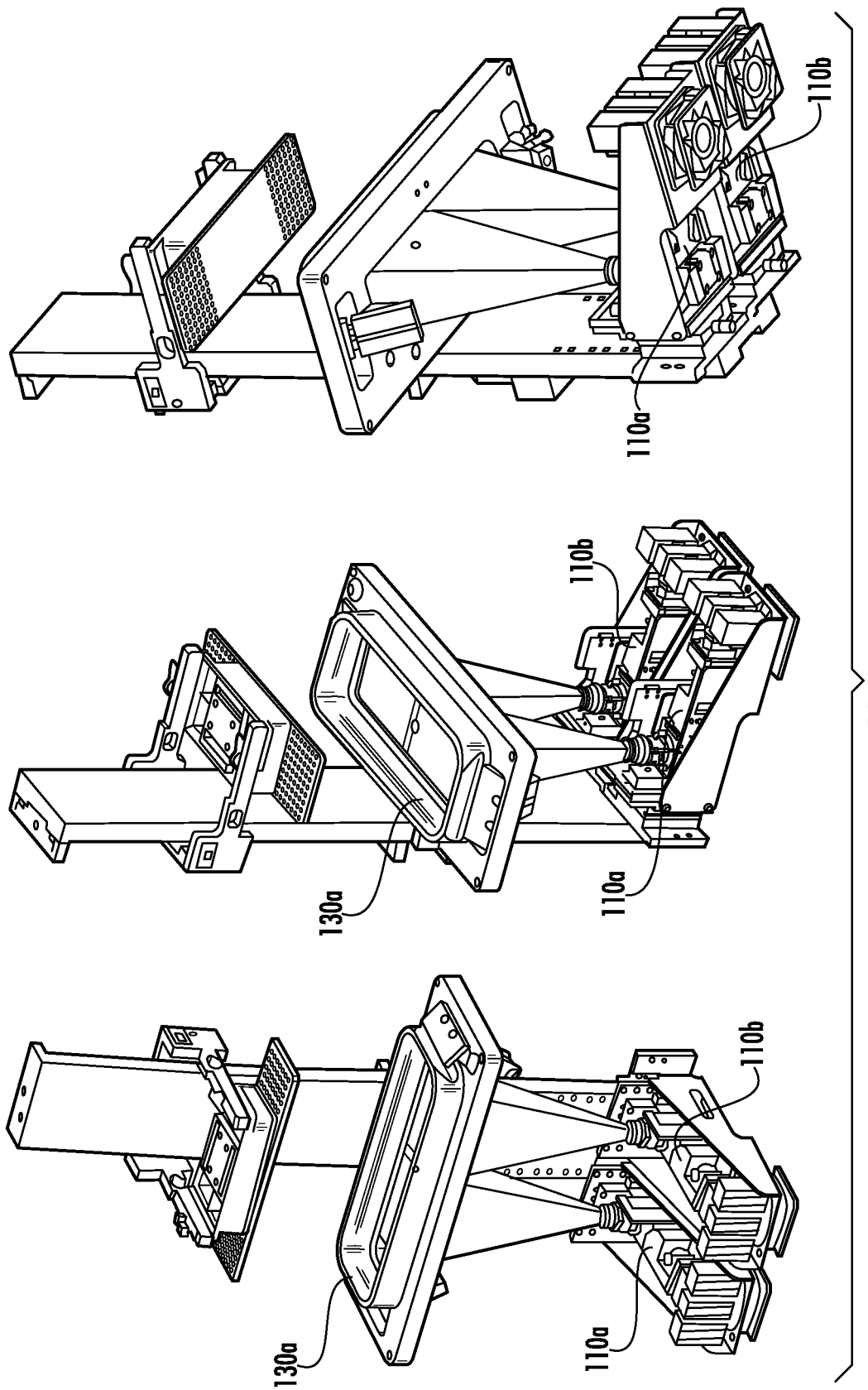
FIG. 1F shows three simplified schematics in perspective views of a PRPS with two image projection systems, in accordance with some embodiments.

FIG. 1F shows three perspective schematics of a non-limiting example of a PRPS with two image projection systems 110a-b. The other components of the PRPS shown in FIG. 1F are similar to those shown in FIGS. 1A-1D, and some components of the PRPS are not shown in the system in FIG. 1F for clarity. The resin tub 130a and build area (not shown) within the resin tub are about twice as large as in the PRPS shown in FIGS. 1A-1D, which is enabled by using two image projection systems 110a-b rather than one.

Figure 1G:
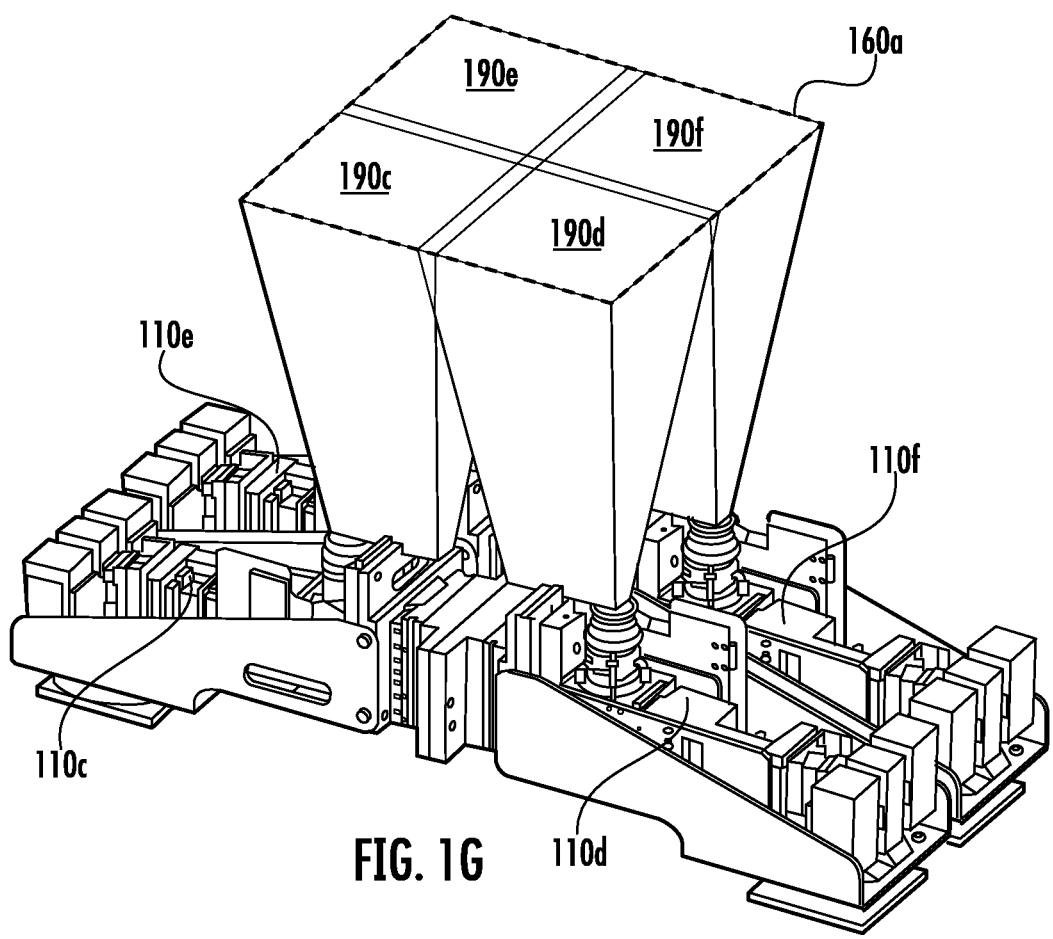
FIG. 1G is a simplified schematic of a portion of a PRPS in perspective view with four image projection systems, in accordance with some embodiments.

FIG. 1G shows a non-limiting example of a portion of a PRPS with four image projection systems 110c-f. In this example, the four image projection systems are arranged in a 2×2 array. In other embodiments, a PRPS has multiple image projection systems, which are arranged in an N×M array, where N is the number of image projection systems in one direction of the array and M is the number of image projection systems in another direction of the array, where N and/or M can be from 1 to 5, or 1 to 10, or 1 to 20, or 1 to 100, or 2, or 5, or 10, or 20, or 100. FIG. 1G shows four image projection systems 110c-f configured to project four sub-images 190c-f, respectively, to form a single composite image over build area 160a. FIG. 1G also shows that the sub-images overlap in this example.

The systems and methods described herein can minimize (or eliminate) unit by unit variation of each projected sub-image within a composite image in a PRPS. Due to unit by unit variations, each image projector within an image projection system creates a unique image, both from a geometric and power (radiant energy) standpoint. The variations between sub-images are exacerbated by the resin irradiance and reactivity relationships, which can cause subtle variations in geometry or power to have large effects on the final printed part.

In some embodiments, the build area is from 100×100 mm$^2$ to 1000×1000 mm$^2$, or from 100×100 mm$^2$ to 500×500 mm$^2$, or from 100×1000 mm$^2$ to 500×1000 mm$^2$, or square or rectangular ranges in between the previous ranges, or larger than 1000×1000 mm². In some embodiments, the sub-images projected from the image projectors each have an area that is from 50×50 mm² to 200×200 mm², or from 50×50 mm² to 150×150 mm², or from 50×100 mm² to 100×200 mm², or from 50×50 mm² to 150×150 mm², or 192 mm×102.4 mm, or 134.4 mm×71.68 mm. In some embodiments, the area covered by each sub-image is approximately rectangular, square, circular, oval, or other shape. In some embodiments, each image projector projects light with maximum or average power densities from 5 mW/cm² to 50 mW/cm², or from 10 mW/cm² to 50 mW/cm², or from 5 mW/cm² to 20 mW/cm². In some embodiments, the exposure time of each pixel or layer is from 0.05 s to 3000 s, or from 0.08 s to 1500 s, or from 0.08 s to 500 s, or from 0.05 s to 1500 s.

The example PRPS 100 shown in FIGS. 1A-1D and the PRPSs shown in FIGS. 1E-1G, are non-limiting examples only, and variations on these designs can be made in accordance with some embodiments described herein. For example, other PRPSs can be inverted with respect to the system shown in FIGS. 1A-1G. In such "top down" systems, the illumination source is above the resin pool, the print area is at the upper surface of the resin pool, and the print platform moves down within the resin pool between each printed layer. The image projection systems and methods described herein are applicable to any PRPS configuration, including inverted systems. In some cases, the systems and methods described herein (e.g., the geometry of the image projection systems and/or calibration fixtures) can change to accommodate a different PRPS geometry, without changing their fundamental operation. In other examples, the PRPSs can contain more of fewer image projectors than those shown in FIGS. 1A-1G. And, as described herein, in some embodiments, the present PRPSs contain moving image projectors or moving optical systems.

Figure 2A:
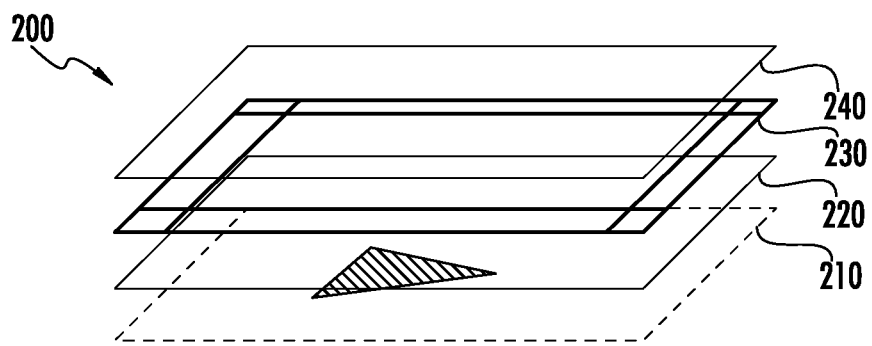
FIG. 2A is a simplified schematic example of a stack of digital filters used to adjust an image (or sub-image) projected in a PRPS, in accordance with some embodiments.

FIG. 2A shows an example of a stack of digital filters 200 used to adjust an image (or sub-image) projected in a PRPS (e.g., PRPS 100 in FIGS. 1A-1D), in accordance with some embodiments. The stack of multiple digital filters 200 is applied to the image to adjust different properties of a projected image and/or the alignment of the position of a projected image. In the example shown in FIG. 2A, a stack of digital filters 200 containing a warp correction filter 210, a resin reactivity "gamma" adjustment mask filter 220, a filter with edge blending bars 230, and an irradiance mask filter 240 is applied to a projected image. In some embodiments, one digital filter is applied to an image. In other embodiments, a stack of digital filters containing more than 1 digital filter, from 1 to 5 digital filters, or from 1 to 10 digital filters are applied to an image. In some embodiments, a filter stack contains 1 or more of a given type of filter. For example, a filter stack can contain 1 or more warp correction filters, 1 or more resin reactivity "gamma" adjustment mask filters, 1 or more filters with edge blending bars, and/or 1 or more irradiance mask filters. The example stack of filters shown in FIG. 2A can be used to correct sub-images in PRPSs with projection or non-projection based illumination systems including those that contain arrays of light emitting diodes, liquid crystal based projection systems, LCDs, LCOS displays, mercury vapor lamp based projection systems, DLP projectors, discrete lasers, and laser projection systems.

Figure 2B:
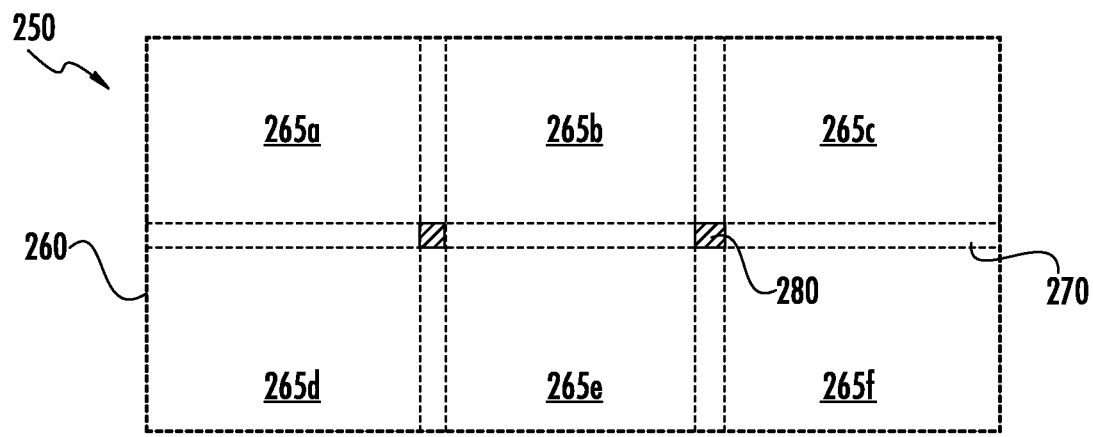
FIG. 2B is a simplified schematic example of a composite image covering a build area, where the composite image contains 6 sub-images, in accordance with some embodiments.

In some embodiments, a plurality of digital filters (or a plurality of stacks of digital filters) are applied to a plurality of sub-images that make up a composite image, and the properties of each sub-image and the alignment of the position of each sub-image within the composite image are adjusted by the stack of digital filters. FIG. 2B shows an example of a composite image 250 covering a build area 260, where the composite image contains 6 sub-images 265a-f. In this example, the sub-images 265a-f overlap at the edges creating a first set of regions 270 where two sub-images overlap and a second set of regions 280 where four sub-images overlap. In this example 6 sets of digital filters can be applied, one to each sub-image 265a-f in composite image 250 to correct for distortions in the individual sub-images and to align the sub-images with one another.

One example of a type of digital filter that can be used to adjust an image is a warp correction filter 210, wherein the filter applies 4 point (or more than 4 point) warp correction to an image (or sub-image in a composite image) enabling projected image geometric correction. For example, a warp correction filter can be used to correct warp or skew in projected images that are caused by variation in projector optics or alignment within the build area. In embodiments where a composite image contains multiple sub-images, the warp correction filter can be used to correct the warp of each sub-image, and allow the sub-images to be aligned with each other to form the composite image. Correcting the warp can enable more accurate alignment and other corrections to be made on sub-images within a composite image. Warp correction can also enable PRPSs to print curved (or non-planar, or non-2D) layers (or slices), which is useful for some applications and part types.

Figure 3:
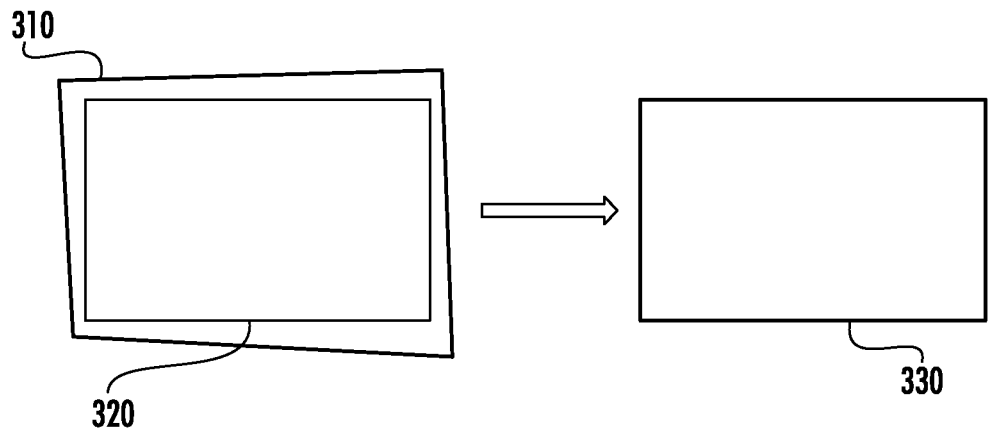
FIG. 3 is a simplified schematic example of warp correction where a warped projected image has been corrected, in accordance with some embodiments.

FIG. 3 shows an example of warp correction where a warped projected image has been corrected (e.g., to align with an area within the build area). FIG. 3 shows an uncorrected projector field of view (FOV) 310 that contains a warp distortion and a desired projector FOV 320. FIG. 3 also shows the projected FOV 330 after correction using a warp correction filter, which aligns the post-correction projector FOV 330 with the desired projector FOV 320.

Another example of a type of digital filter that can be used to adjust an image is an edge blending filter, where each image (or sub-image in a composite image) has programmable blending bars on one or more edges of the image (e.g., the top, left, bottom, and/or right edge of the image). Edge blending allows the top, left, right and/or bottom edges to be faded out according to a chosen blending function. In a composite image containing an array of sub-images, edge blending can enable the data at the perimeters of adjacent projected sub-images to be faded out so that the transition between the adjacent sub-images can be made less noticeable. For example, composite image 250 in FIG. 2B contains an array of sub-images 265a-f that overlap one another in regions 270 and 280, and edge blending can enable the data within the overlapping regions 270 and 280 to be faded out so that the transition between adjacent sub-images can be made less noticeable. In PRPSs using multiple image projectors to project a composite image, less noticeable transitions between the projected sub-images translates into improved quality of a printed object (e.g., improved printed object surface roughness and/or structural integrity). The blending distance and blending function can be adjusted for each image. Some examples of blending functions are linear, sigmoid, and geometric.

Figure 4A:
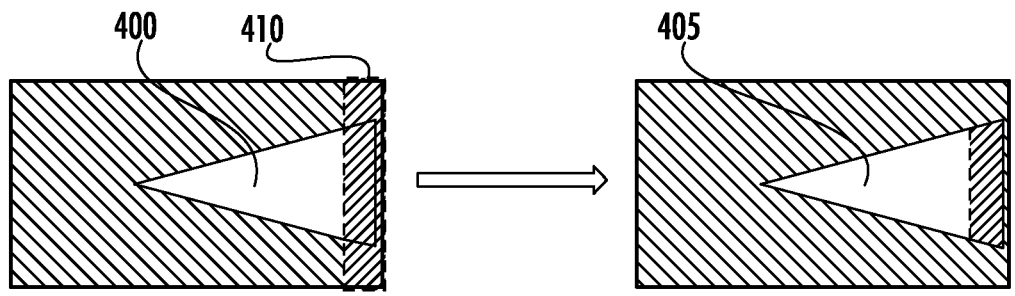
FIGS. 4A and 4B are simplified schematic examples of edge blending filters that can be applied to an image, in accordance with some embodiments.
Figure 4B:
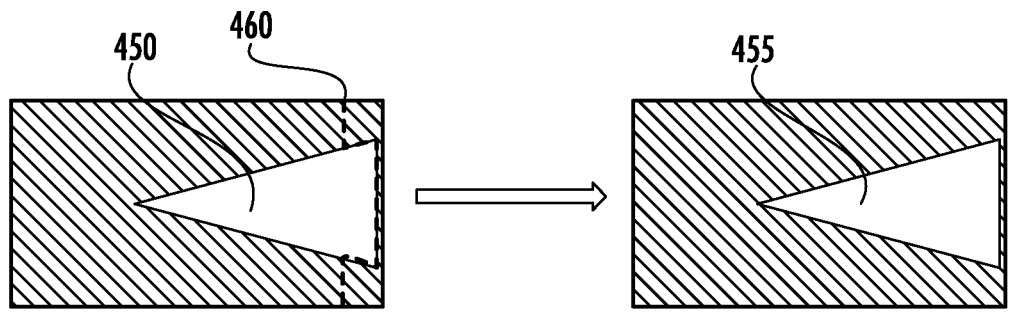

FIGS. 4A and 4B show some non-limiting examples of edge blending filters that can be applied to an image. FIG. 4A shows an example where one edge of an image 400 contains a blending bar 410. The intensity of the image within the area of the blending bar 410 is reduced using a blending function to produce the image 405. For example, a linear blending function can be used that reduces the intensity of the pixels linearly across the blending bar 410 such that the intensity of the pixels is highest towards the interior of the image and lowest towards the edge of the image within the blending bar 410. In some embodiments, an edge blending filter can contain 4 edge blending bars (i.e., one on the top, one on the right, one on the left, and one on the bottom of the image). In some embodiments, the edge blending bars will overlap with each other at the corners of an image, and cause the intensity in the corner of the image to be reduced by additive effects of more than one edge blending function. For example, the overlapping regions 270 and 280 in composite image 250 in FIG. 2B can be linearly faded out as described above, causing intensity variations between adjacent sub-images to be less noticeable than if no edge blending correction was done.

In some embodiments, the number of edge blending bars, the edge blending distances, and the edge blending functions are chosen based on the distance of overlap between adjacent sub-images within a composite image. In some embodiments, two adjacent sub-images in a composite image overlap at one edge, and the overlapping regions of both sub-images contain edge blending bars. In some such cases, the edge blending distances and the edge blending functions for both sub-images are chosen such that the total intensity of the pixels within the overlapping region substantially match the intensity of the ideal composite image within that region. In one non-limiting example, edge blending can be used to fade out the pixels of a first sub-image as they approach an edge boundary at the same rate as the pixels of a second adjacent overlapping sub-image are faded in as they move away from the edge boundary into the second sub-image. In some embodiments, the edge blending filters enable a constant irradiance (or a total irradiance more closely matching the ideal composite image) when both sub-image pixels are combined within the overlapping region.

In some embodiments, sub-images from multiple projectors overlap and the percentage the areas of adjacent sub-images that overlap with each other are 0%, approximately 0%, approximately 1%, approximately 2%, approximately 5%, approximately 10%, approximately 20%, approximately 50%, approximately 90%, or approximately 100%, or from 0% to 100%, or from approximately 1% to approximately 5%, or from approximately 5% to approximately 100%, or from approximately 50% to approximately 100% (or any ranges in between). Overlapping sub-images can be beneficial to minimize artifacts between sub-images (e.g., with 1% to 5% overlap, and using edge blending filters). Overlapping sub-images (e.g., with 50% to 100% overlap) can also be beneficial to increase the local power within the composite image without increasing the power of individual image projectors in the system, which can enable shorter curing and exposure times. In some embodiments, edge blending filters can be used when some sub-images within the composite image overlap with one another and some do not. In some cases, when the overlap area between adjacent sub-images is small (e.g., 0% or approximately 0%), then adjacent sub-images can be scaled (i.e., the magnification of the sub-image can be changed) to improve their alignment.

FIG. 4B illustrates an example where geometric correction is used in edge blending to analyze adjacent sub-images, and one sub-image is selected to exclusively display the layer data. This allows the location of the transition (or seam) 460 between sub-image 450 and the adjacent sub-image (not shown) to be positioned based on one or more layer boundary locations within the layer being displayed. In this example, sub-image 450 is the sub-image before edge blending and sub-image 455 is the sub-image after edge blending. In this case, the transition 460 was chosen to leave a portion of sub-image 450 within the overlap region between the sub-images intact after the edge blending is performed, and the sub-image 455 (after edge blending) is the same as sub-image 450 (before edge blending). In other words, the transition 460 was determined based on a layer boundary location within the sub-image 450. This can be useful, for example, if the data ends (i.e., contains a boundary) in the overlapping region (e.g., a region of illuminated pixels has a boundary within the overlap region), then one sub-image can be chosen to display the content within the overlapping region, and the overlapping region of the other sub-image can be attenuated to zero intensity. In other examples, by analyzing the geometry of the layer across the boundary, the seam between sub-images can be hidden exclusively within the part or at an edge boundary, thereby allowing the effects of any slight misalignment in multiple projectors to be minimized.

Figure 4C:
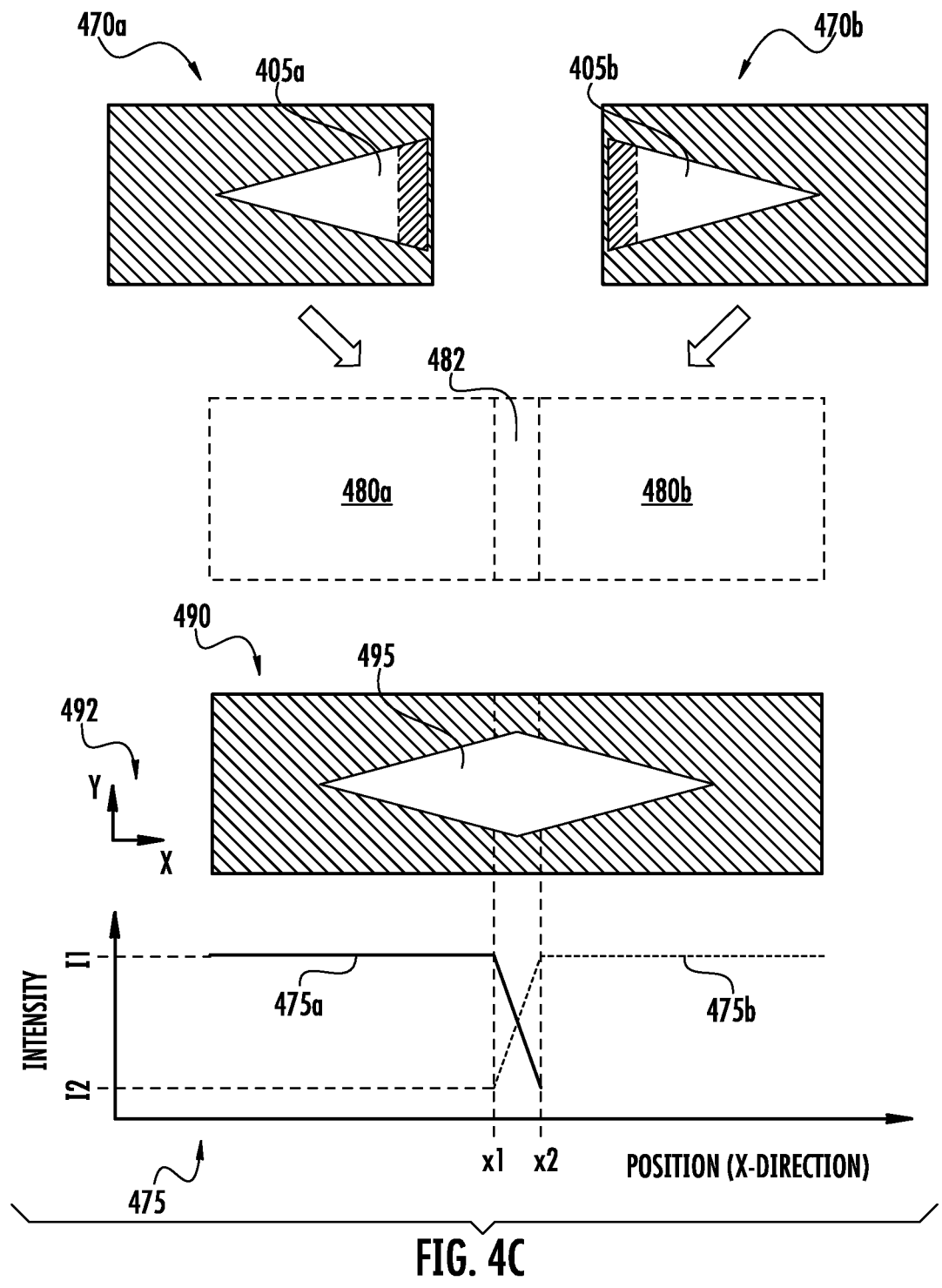
FIG. 4C is a simplified schematic example showing how two adjacent overlapping sub-images can utilize edge blending filters to form a single composite image, in accordance with some embodiments.

FIG. 4C shows a non-limiting example of how two adjacent overlapping sub-images 470*a-b* can utilize edge blending filters (i.e., with edge blending bars) to form a single composite image 490 with minimal edge artifacts in the overlapping region 482 of the sub-images. Sub-images 470*a-b* each contain a portion 405*a-b* of a feature 495 to be printed in a single layer. The sub-images 470*a-b* will be positioned such that they overlap in locations 480*a-b*, with overlapping region 482.

The illumination intensity (or intensity) of each sub-image is shown in plot 475 along the x-direction in composite image 490 defined by the direction legend 492. The intensity of sub-image 470*a* follows the intensity function 475*a*, and the intensity of sub-image 470*b* follow the intensity function 475*b*. Intensity functions 475*a-b* show that the intensity of the sub-images 470*a-b* are constant (at value I1) outside of the overlap region 482, while within overlap region 482 (between positions x1 and x2 in plot 475), the intensities of sub-images 470*a-b* are reduced in a complementary linear manner down to a lower intensity I2. In some embodiments, I2 can be zero intensity, or close to zero intensity, or can be any intensity that is less than I1. In other embodiments, the functions within the overlap region can be non-linear (e.g., sigmoid or geometric, or be described by a decreasing polynomial, logarithmic, exponential, or asymptotic function) and/or be not perfectly complementary (i.e., one image can have a higher average intensity within the overlap region than the other). The composite image 490 contains a feature 495 which has minimal artifacts (e.g., unintended low or high intensity regions) within the composite image 490, due in part to the edge blending filters used.

Figure 4D:
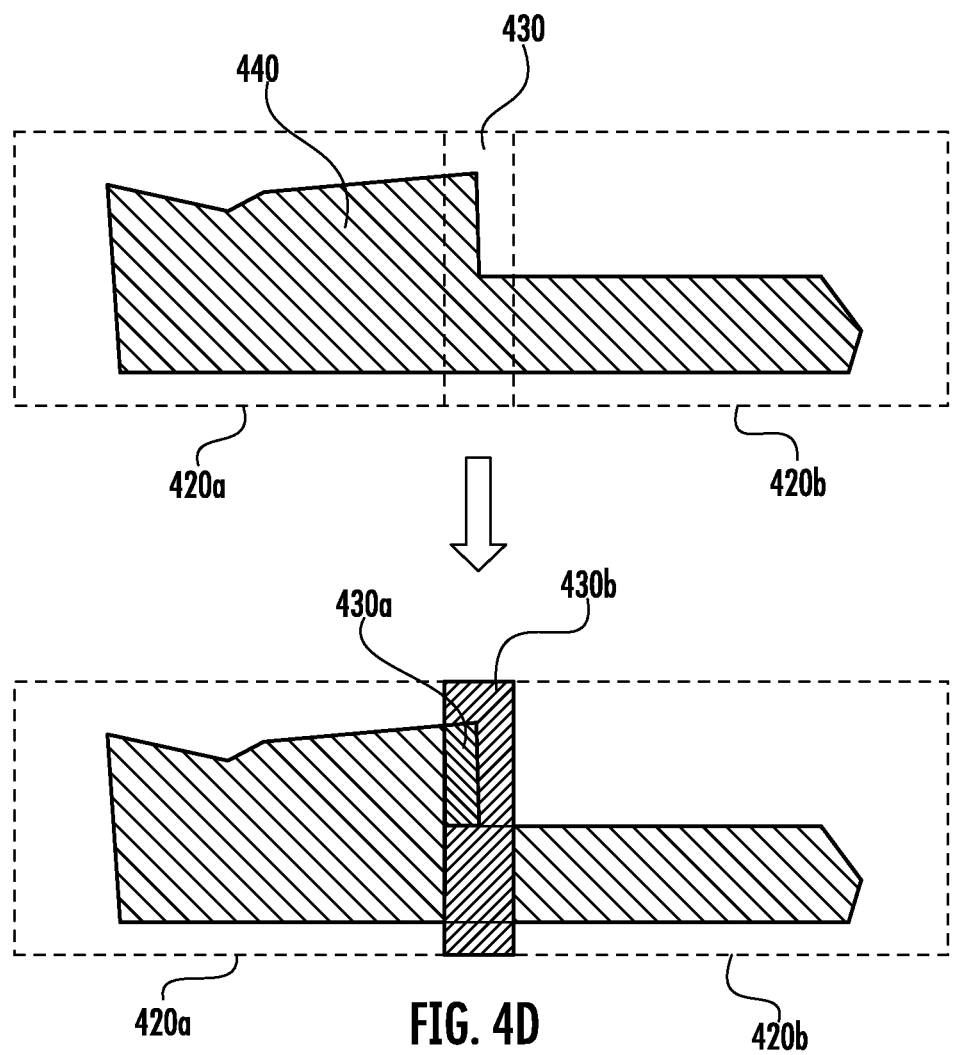
FIG. 4D is a simplified schematic example where different types of edge blending filters can be used together in concert within a single overlap region, in accordance with some embodiments.

FIG. 4D shows a non-limiting example where different types of edge blending filters can be used together in concert within a single overlap region. FIG. 4D shows two sub-images 420*a-b* that overlap in region 430, and the composite image contains a feature 440. One region of the feature within the overlap region 430 has a boundary that ends within the overlap region, and this region 430*a* is not blended—rather the region 430*a* has 100% of the intensity from sub-image 420*a*, and 0% intensity from sub-image 420*b*. The rest of the overlap region 430*b* (i.e., the whole overlap region 430 except the region 430*a*) can be blended by taking some intensity from sub-image 420*a* and some intensity from sub-image 420*b* (e.g., as discussed above, and in the example depicted in FIG. 4C). Therefore, FIG. 4D illustrates another example of how one or more edge blending bars can adjust one or more images (or sub-images) based on a layer boundary location within the object being manufactured.

Another example of a type of digital filter that can be used to adjust an image is an irradiance masking filter, where the filter applies a normalizing irradiance mask to an image (or each sub-image in a composite image) such that the image (or composite image) has a uniform irradiance range (i.e., from zero exposure to a maximum exposure limit) across the area. For example, irradiance masking filters can be used to normalize the irradiance non-uniformities within the image projection system arising from projector-based spatial energy non-uniformities. Irradiance masking filters can be applied to the image projection system as a whole (i.e., on the composite image), and/or to each of the sub-images individually to correct differences between sub-images. In some embodiments, the parameters of the irradiance mask filter are set based on lowest region of energy (i.e., that corresponds to the darkest region of pixels) in display plane. In some embodiments, the parameters of the irradiance mask filter are set based on highest region of energy (i.e., that corresponds to the brightest region of pixels) in display plane. In some embodiments, the parameters of the irradiance mask filter are set based on the range, average, median, or other calculated quantities of the energy distribution in display plane. In some embodiments, the highest energy region (i.e., brightest pixel region) can be used to determine the offset magnitude from the lowest energy region in the irradiance mask filters. In some embodiments, the irradiance mask filters enable control over the energy across the build area to compensate for non-uniformities in the projector optics and/or optical path. In some embodiments, the output power from an image projector is limited to less than 100% of its maximum output power using an irradiance mask filter. Limiting an image projector's power to less than 100% can be advantageous to avoid damaging the system components, and to maintain consistency of output power as the light source within the projector ages (i.e., as the light source ages the output power can be increased to maintain a constant irradiance from the image projector over time).

Another example of a type of digital filter that can be used to adjust an image is gamma correction, where the composite image (or each sub-image in a composite image) has a gamma correction filter applied that is based on the particular resin reactivity ranges in the PRPS. In some embodiments, based on the curing behavior of a particular resin, the gamma correction filter for the composite image (or sub-images within the composite image) is optimized to map the irradiance range to the particular resin reactivity range. This can enable smoother and more accurate surfaces to be realized across different resins. The reactivity of the resin can change based on the resin composition (e.g., pigments, photo-initiators, photo-initiator concentrations, etc.). Furthermore, resins tend to have nonlinear response curves with respect to energy. Gamma correction filter provides resin reactivity leveling, and enables correct smoothing (and/or antialiasing) of pixels by mapping the pixel intensity range (e.g., 0-255) to the minimum and maximum reactivity characteristics of the pixel. Gamma correction filters can be used to correct sub-images in PRPSs with projection or non-projection based illumination systems including those that contain arrays of light emitting diodes, liquid crystal based projection systems, LCDs, LCOS displays, mercury vapor lamp based projection systems, DLP projectors, discrete lasers, and laser projection systems.

Figure 5A:
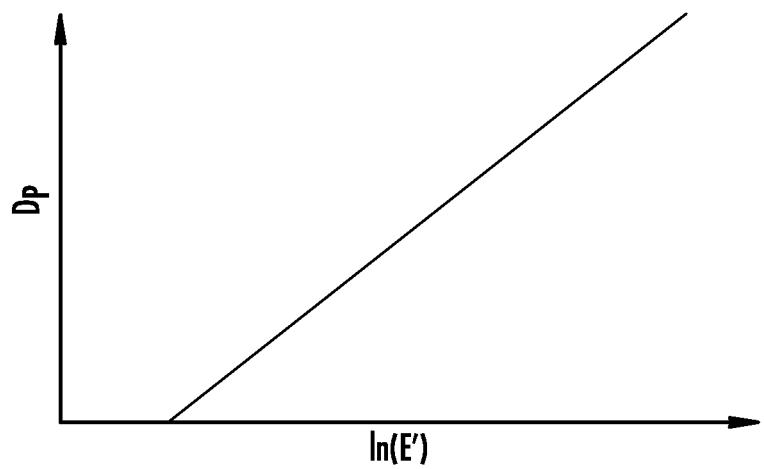
FIGS. 5A-5B are plots illustrating one example of a gamma correction relationship that can be used in a gamma correction filter, in accordance with some embodiments.
Figure 5B:
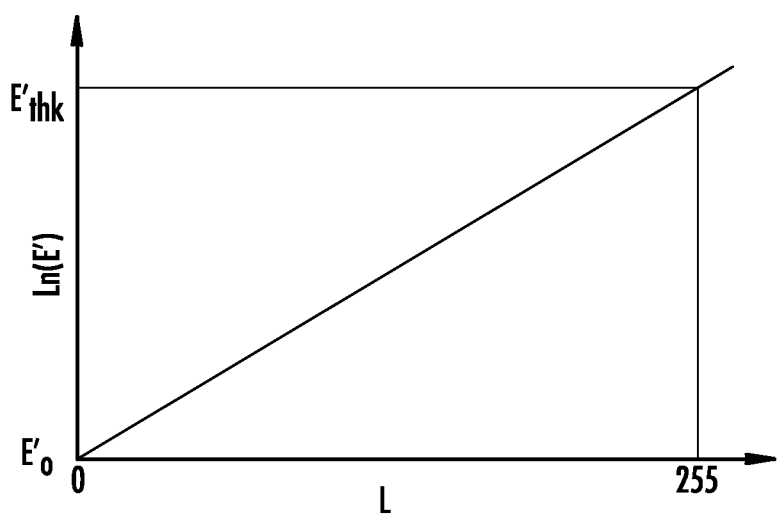

FIGS. 5A-5B illustrate one example of a gamma correction relationship that can be used in a gamma correction filter. In the example shown in FIGS. 5A-5B, a logarithmic relationship between the irradiance energy per unit area (E') and the pixel intensity (L) is used. The energy per unit area E' is related to the output illumination from the illumination source (e.g., an image projector) and the pixel intensity L is an input defining the geometry of a part to be printed (i.e., from a source file with the part geometry).

The cure depth $D_p$, can be represented by the logarithmic function $$D_p = m_1 * \ln(E') + b_1 \qquad (1)$$

where E' is the energy per unit area, and $m_1$ and $b_1$ are constants that are particular to a given resin formulation. FIG. 5A graphically depicts this logarithmic relationship where $D_p$ is plotted on the y-axis against $\ln(E')$ on the x-axis. E' can also be defined by the expression $$E' = T_{exp} * Ir \qquad (2)$$

where $T_{exp}$ is the exposure time and $Ir$ is the irradiance impinging on the resin. Rearranging equation (1), combining with equation (2), and rearranging again yields the expression $$T_{exp} = \exp((D_p - b_1)/m_1)/Ir \qquad (3)$$

which can be used to calculate the exposure time required to achieve a particular cure depth, for a particular combination of irradiance level and resin cure behavior.

The expression (1) and the graph in FIG. 5A can be used to determine the energy per unit area $E'_0$ that will produce a cure depth of zero. This will determine the minimum irradiance in the irradiance range (i.e., to produce a cure depth of zero). To calculate $E'_0$, equation (1) can be solved for $D_p = 0$, producing the expression $$E'_0 = \exp(-b_1/m_1). \qquad (4)$$

Similarly, expression (1) can be solved for a maximum energy per unit area $E_{max}'$ by solving expression (1) for a maximum desired cure depth $D_{p,max}$. In some cases, the $D_{p,max}$ is related to a physical constraint of the PRPS (e.g., how much power the illumination system can output). The resulting expression is $$E'_{max} = \exp((D_{p,max} - b_1)/m_1). \qquad (5)$$

The energy per unit area E' can be related to the pixel intensity L by the logarithmic function $$\mathrm{Ln}(E') = b_2 + m_2 * L \qquad (6)$$

where $m_2$ and $b_2$ are constants that are particular to a given resin formulation. The relationship in equation 6 is shown in the plot in FIG. 5B where $\ln(E')$ is plotted on the y-axis against L on the x-axis. Solving equation 6 for L=0 and L=255 allows the determination of $b_2$ and $m_2$. Plugging the determined $b_2$ and $m_2$ values into equation 6 yields the relationship $$E' = E'_0 * (E_{max}/E'_0)^{(L/255)}. \qquad (7)$$

Equation 7 is a relationship that can be used to map the pixel intensity L to an energy per unit area in the build plane E', which takes advantage of the full dynamic range of pixel intensity levels L that will yield cured resin. In other words, using equation 7, a pixel intensity of L=0 corresponds to an energy per unit area E' that will produce a minimum cure depth, $D_p = 0$, in the resin. Similarly, using equation 7, a pixel intensity of L=255 corresponds to an energy per unit area E' that will produce a maximum cure depth, $D_p = D_{p,max}$, in the resin.

Using the relationships shown above in equations (1)-(7) and in FIGS. 5A-5B, gamma correction filters can be implemented to map the irradiance range used during printing to a particular reactivity range for a given resin formulation. This is beneficial because different resins have different reactivity ranges that require different irradiance and exposure times to achieve the same cure depth. Gamma correction filters, therefore, allow PRPSs to employ different resin systems with different reactivity ranges while achieving desired cure depths within the printed part.

In other embodiments, different relationships between the cure depth ($D_p$) and the energy per unit area (E') are possible. For example, rather than logarithmic, the relationship between cure depth ($D_p$) and the energy per unit area (E') can follow another continuous function (e.g., a polynomial, or asymptotic function), a piece-wise continuous function (e.g., containing different polynomials or logarithmic functions for different regions of the relationship), or can be non-analytical (e.g., can be based on a look-up-table). Similar relationships as those shown in FIGS. 5A-5B and equations (1)-(7) will still apply in these situations, and the same gamma correction concepts, systems and methods as those described herein can be used. Additionally, in the example depicted in equations (1)-(7), the pixel intensity L varies from 0-255, however, in other examples, the pixel intensity can vary over any range and the concepts described can still be used for gamma correction.

Figure 6:
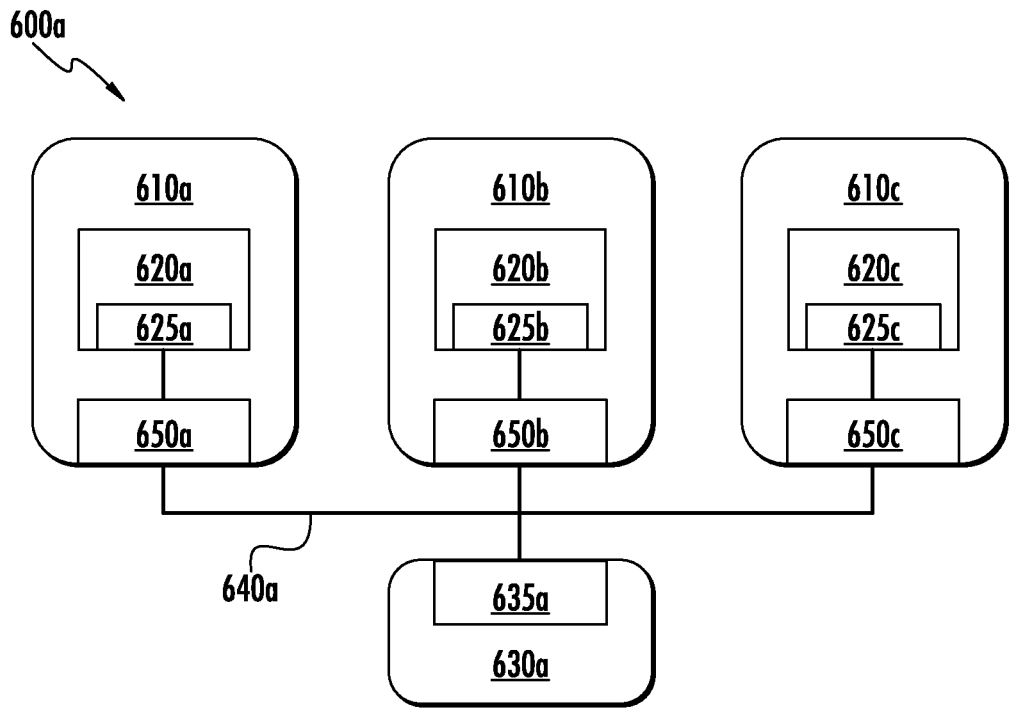
FIGS. 6 and 7 are simplified examples of electrical schematics of image projection systems for PRPSs using hardware systems to synchronize multiple projection illumination systems together, in accordance with some embodiments.
Figure 7:
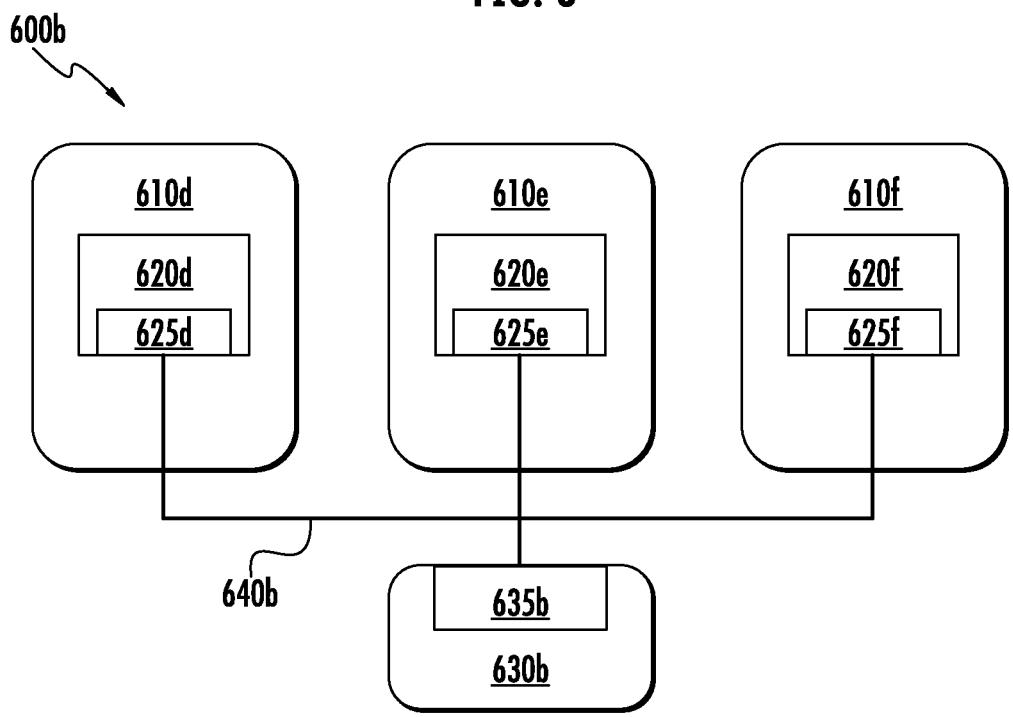

FIGS. 6 and 7 show examples of image projection systems 600a-b for PRPSs using hardware systems to synchronize multiple projection illumination systems 610a-f together. The examples in FIGS. 6-7 show three projection illumination systems 610a-f in each system 600a-b, however there can be less or more than three image projectors in different cases (e.g., more than three, from 2 to 10, or from 2 to 100). In some embodiments, image projection systems for PRPSs contain LED light sources that use electronic LED drive circuits 620a-f to control the light power emitted by each projector. The image projection systems in these examples contain multiple image projectors (i.e., projection illumination systems) 610a-f connected to a system controller 630a-b through the LED drive circuits 620a-f. The LED driver systems (i.e., LED drive circuits) 620a-f in these examples each have an enable input 625a-f on the driver circuit to control (e.g., gate) the light output. The enable inputs 625a-f in these examples can be controlled by the system controller 630a-b, which is equipped with digital/analog outputs 635a-b to drive the enable inputs 625a-f of the multiple projectors 610a-f. The physical connections 640a-b between the system controller 630a-b and projection illumination systems 610a-f can be either electrical or optical cabling.

The outputs 635a-b on the system controller 630a-b can be buffered, isolated, and/or amplified in order to overcome any potential weak drive strength or noise immunity issues from the on-board processor (or GPIO-Expander, etc.) of the system controller. Such buffers or isolators can reside either on or off the system controller board.

Likewise, the enable inputs of the LED drive circuits of each projection illumination system can also be buffered, isolated, and/or amplified to reshape the signal from the system controller and mitigate the effects of electrical noise distorting the signal between the system controller and the LED drive circuit. The buffering, isolation, and/or amplification can improve the noise immunity and system reliability. The location of the buffers, isolators, or amplifiers can be positioned in a number of ways to achieve the same goal. For example, buffers, isolators, and/or amplifiers can be positioned at the outputs 635a-b of the system controller 630a-b and not the inputs of the LED drive circuits, or vice versa. In the example shown in FIG. 6, the buffers, isolators, and/or amplifiers 650a-c are positioned at both the outputs 635a of the system controller 630a and the inputs of the LED drive circuits 620a-c. In the example shown in FIG. 7, no buffers, isolators, or amplifiers are used (neither at the outputs 635b of the system controller 630b nor at the inputs of the LED drive circuits 620d-f).

FIGS. 8A-8D show further examples of image projection systems for PRPSs using hardware solutions to synchronize multiple projection illumination systems together with more detail than FIGS. 6 and 7. The image projectors (labeled as "Projector 1", "Projector 2" . . . "Projector N" in the figures) each contain an LED drive circuit (labeled as "LED Drive" in the figures) with enable inputs (labeled as "EN" in the figures). Each of the image projectors is connected to the display subsystem (labeled as "Master Control System" in the figures) through hardware "cabled connections". Each cabled connection has terminals (in some cases with digital grounds) at the output of the display subsystem and at the input of each image projector.

Different options for isolation, buffering and/or amplification at the input of the LED drive circuit are shown in FIGS. 8A-8D. In different embodiments, the different image projectors in the image projection system can contain opto-isolated, transistor buffered, integrated buffered, or non-buffered and non-isolated circuits at the inputs of their respective LED drive circuits. "Projector 1" in FIGS. 8A-8D contains an example of an "opto-isolated" circuit at the input of the LED drive circuit. "Projector 2" in FIGS. 8A-8D contains an example of a "transistor buffered" circuit at the input of the LED drive circuit. "Projector 3" in FIGS. 8A-8D contains an example of an "integrated buffered" circuit at the input of the LED drive circuit. "Projector 4" in FIGS. 8A-8D contains an example of a non-buffered and non-isolated input of the LED drive circuit. The systems shown in FIGS. 8A-8D are non-limiting examples to illustrate the different types of circuits that can be used. In some embodiments, the plurality of image projectors in the image projection system each contain the same type of circuits, or different types of circuits, or a mixture of the same and different types of circuits at the inputs of their respective LED drive circuits.

Different options for the display subsystem (labeled as "Master Control System" in the figures) are also shown in FIGS. 8A-8D. The display subsystem can contain a real-time processor/controller (i.e., the system controller, or a portion thereof) with a single output as shown in the example in FIG. 8A (the single output from the system controller is labeled "Output"). In other embodiments, the display subsystem can contain a real-time processor controller with multiple outputs as shown in the example in FIG. 8B (the multiple outputs from the system controller are labeled "Out 1", "Out 2" . . . "Out N"). In some embodiments, the display subsystem can contain a real-time processor controller with an onboard FPGA (i.e., integrated with the master control system) as shown in the example in FIG. 8C, or an offboard FPGA (separate from the master control system) as shown in the example in FIG. 8D. In some embodiments, the system controller (e.g., shown in FIGS. 6 and 7) and master controller (e.g., shown in FIGS. 8A-8D) are the same physical unit. In some embodiments, the system controller and master controller are different physical units. For example, the system controller relative to an individual projective print engine can be a custom real-time embedded printed circuit assembly board where the master controller that resides above such engines can be an off-the-shelf industrial computer with multiple inputs and outputs. In some embodiments, a master controller controls several print engines.

Figure 8A:
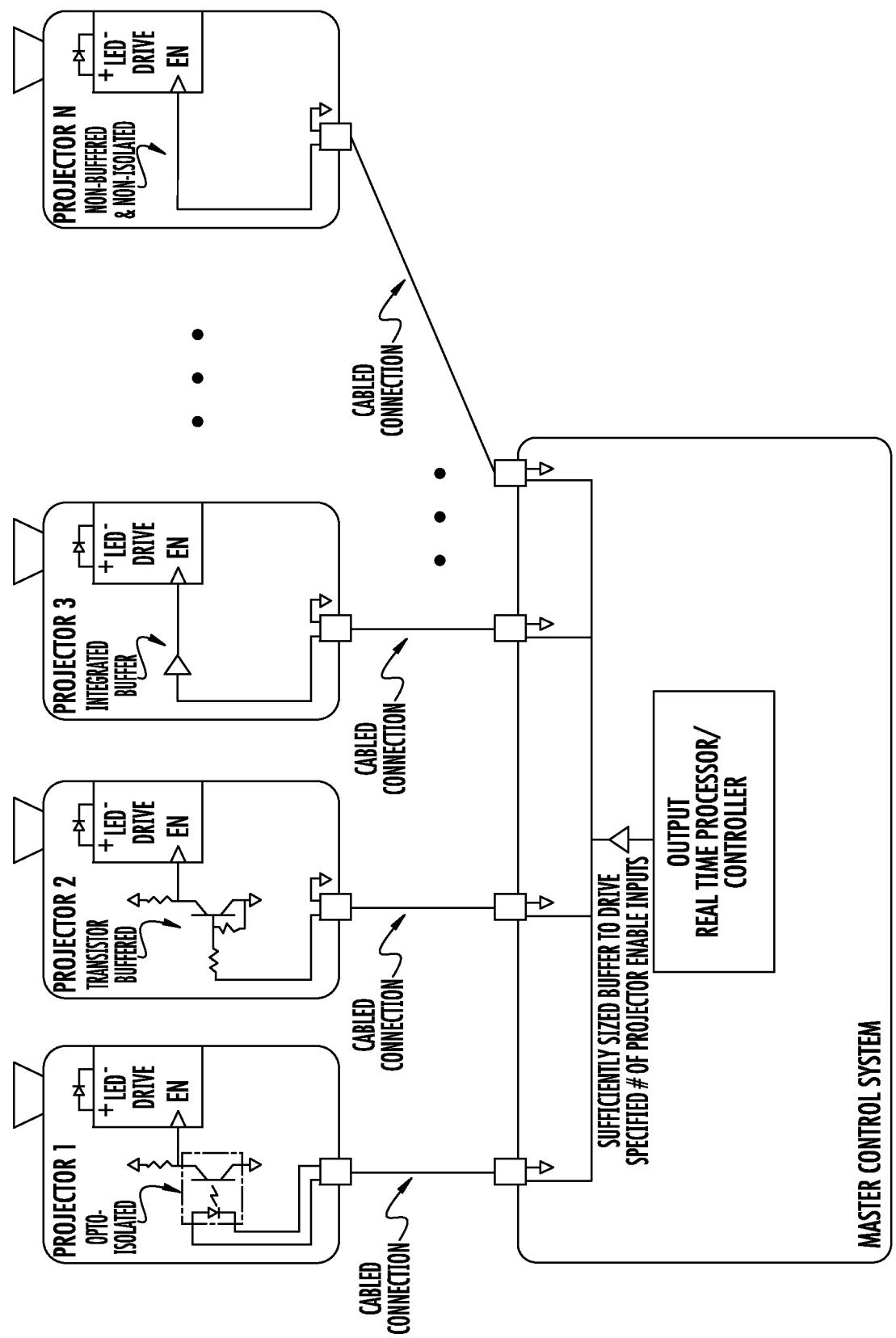
FIGS. 8A-8D are simplified examples of electrical schematics including schematics of the display subsystems for image projection systems for PRPSs using hardware systems to synchronize multiple projection illumination systems together, in accordance with some embodiments.
Figure 8B:
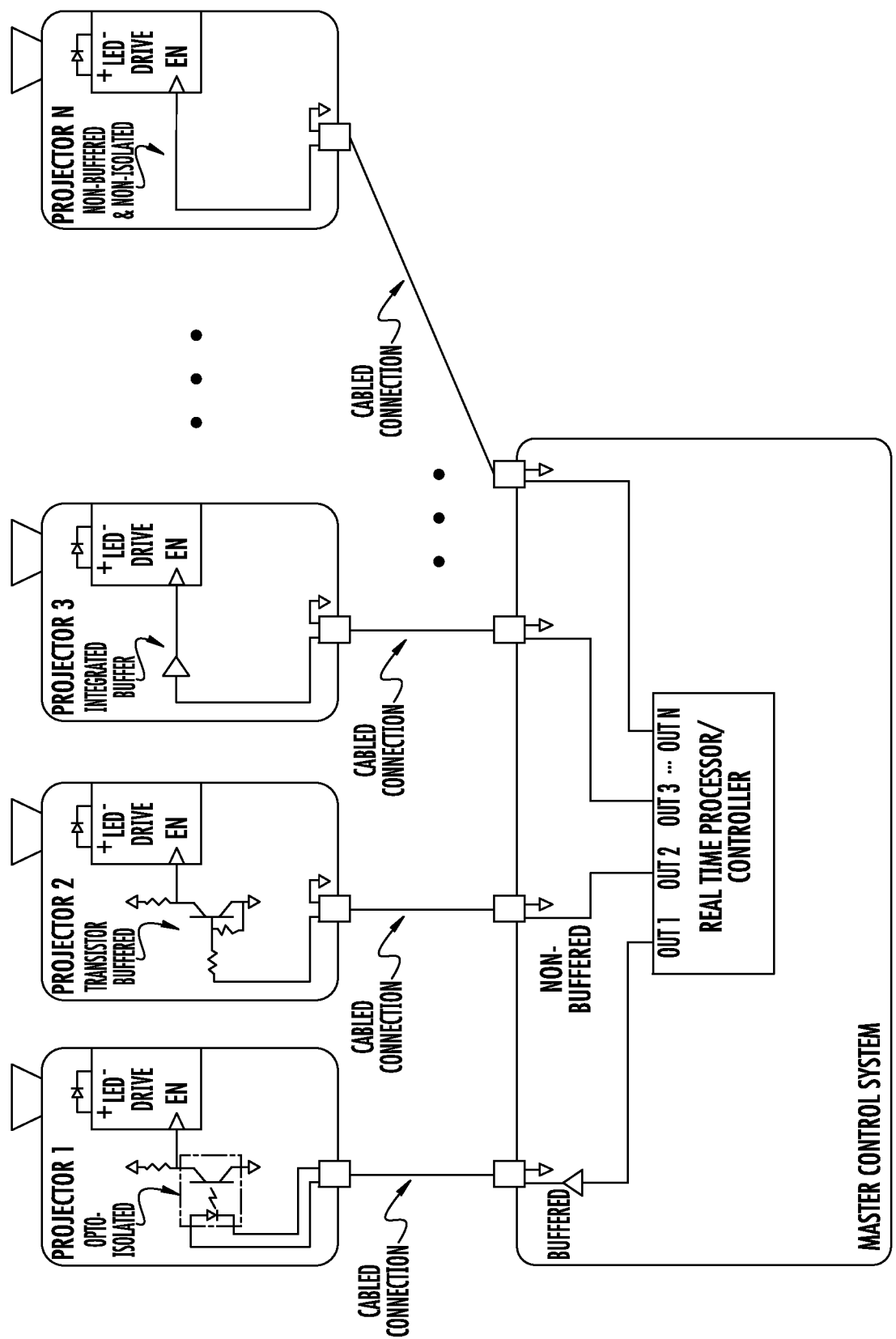
Figure 8C:
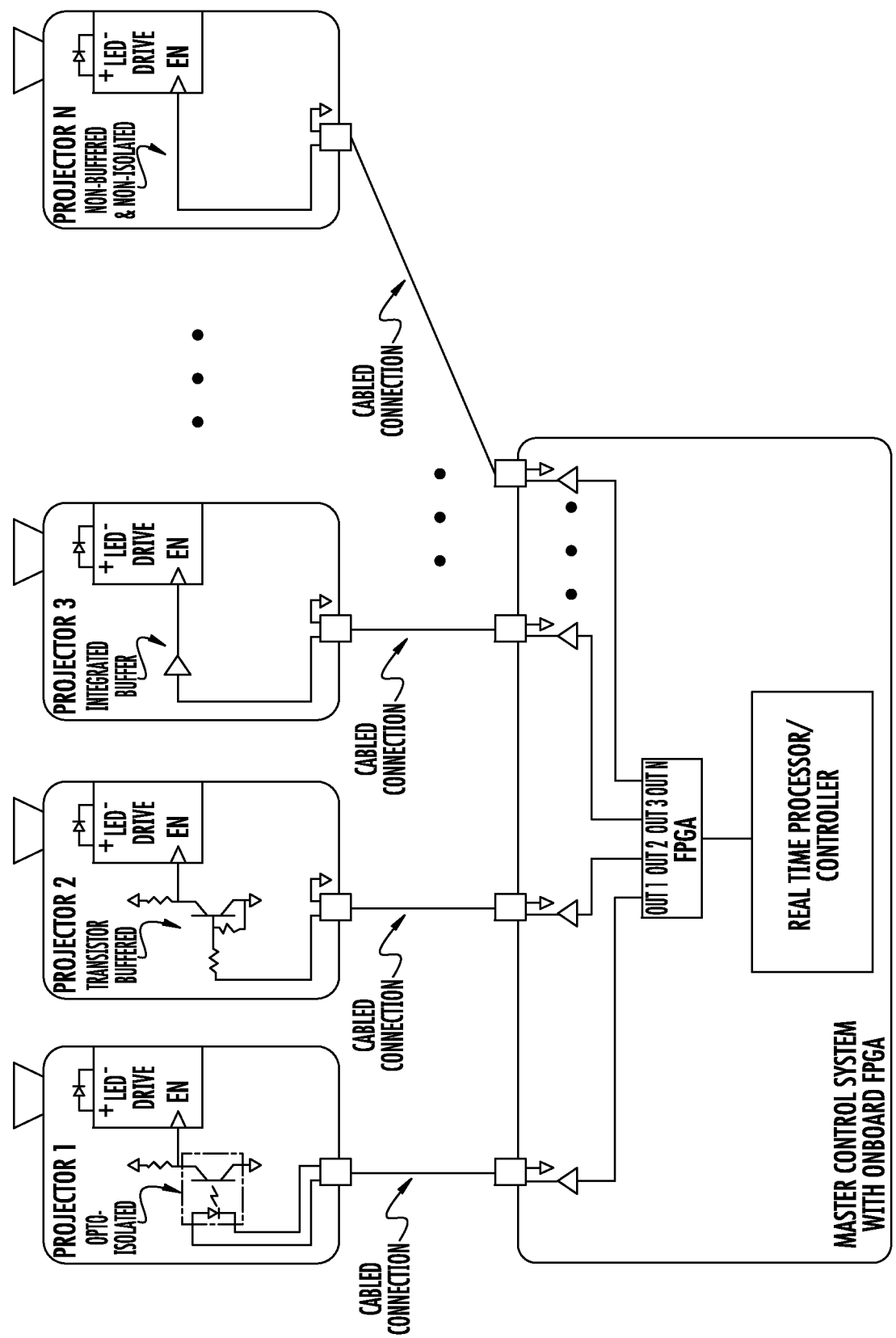
Figure 8D:
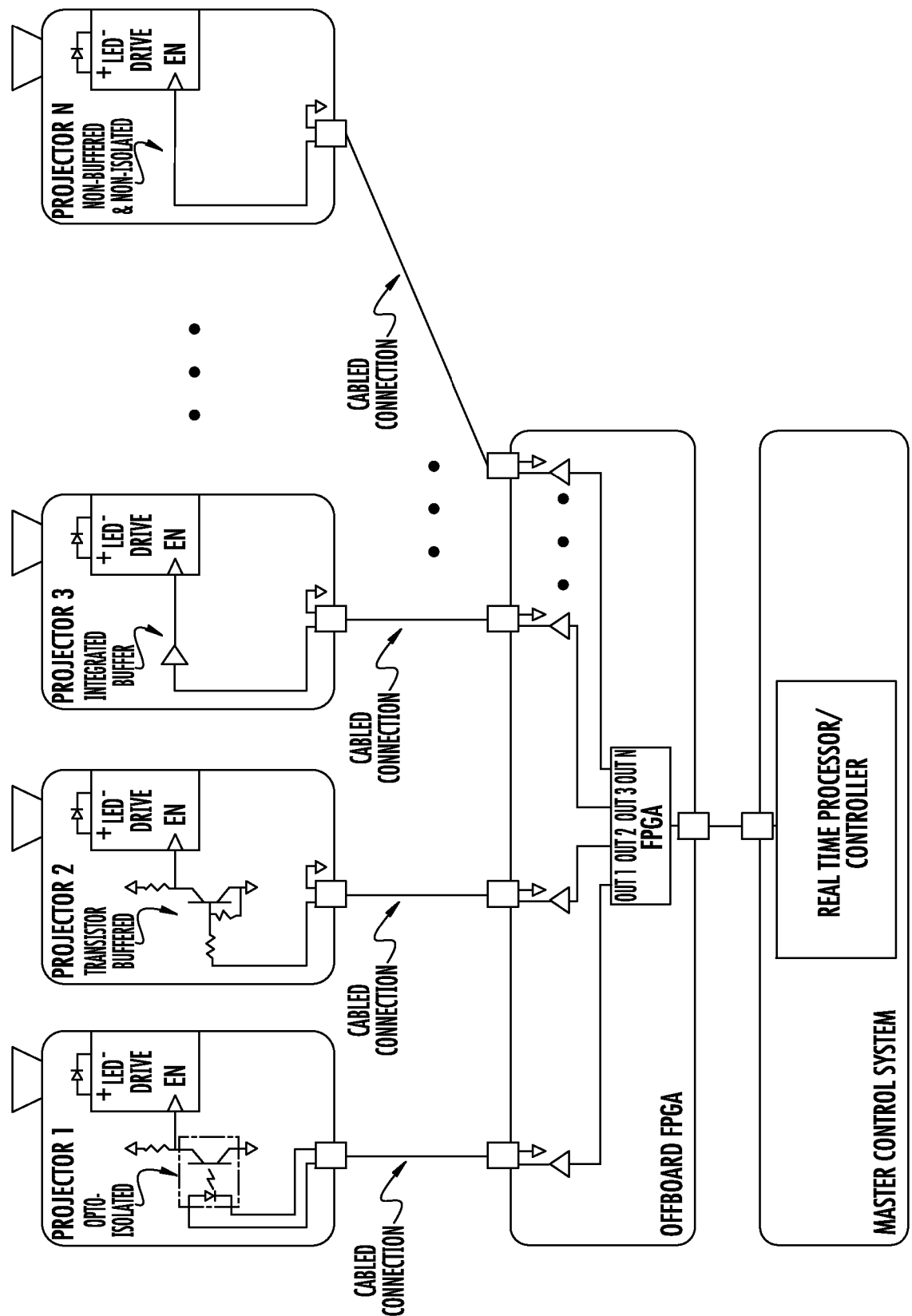

The outputs from the display subsystem can be buffered (e.g., as shown in the "Out 1" output in FIG. 8B), or non-buffered (e.g., as shown in the "Out 2" output in FIG. 8B). In cases where the display subsystem contains a real-time processor controller with a single output, the single output can be buffered with a sufficiently sized buffer to drive all of the plurality of enable inputs on the LED drive circuits of each image projector (as shown for the "Output" in FIG. 8A). FIGS. 8C-8D show examples where the display subsystem includes an FPGA, and each output of the FPGA is buffered. FIG. 8D shows an example of a display subsystem with a "master control system" and an offboard FPGA, with a cabled connection between them. The configurations of buffered outputs from the master control system and/or the FPGA shown in FIGS. 8A-8D are non-limiting examples only to illustrate the different options possible. In some embodiments, the outputs from the master control system and/or the FPGA are all the same, and in other cases they can be different from one another.

The example systems shown in FIGS. 6-7 and 8A-8D can be used to control illumination systems in PRPSs with projection or non-projection based illumination systems including those that contain arrays of light emitting diodes, liquid crystal based projection systems, LCDs, LCOS displays, mercury vapor lamp based projection systems, DLP projectors, discrete lasers, and laser projection systems.

In some embodiments, the image projection system projects an array of sub-images (e.g., 1D or 2D array) that are moved or indexed during the exposure of a layer and/or between the exposures of subsequent layers. A sub-image is an image that is projected from an image projector and makes up a part of a composite image at a given instant in time (i.e., during a print run), where the composite image defines a layer of an object to be printed. When a sub-image from an image projector moves from a first position within the composite image to a second position within the composite image, the patterns (or pixel intensities) within the sub-image can stay the same (e.g., in the case of objects with repeating features), or can change (e.g., to more generally print any object layer shape). In some embodiments, each of the image projectors projects a sub-image onto a portion of the build area, and the image projectors are moved (or separate optical systems such as mirrors are moved, as described below) to move the sub-images. In some embodiments, as the sub-images move, they are projected onto different portions of the build area during the exposure of a layer. The content of the sub-images can change (e.g., the shapes making up the sub-images and/or the average intensity of the sub-images can change) as they are moved to define a different portion of the layer to be printed. However, some embodiments contain repeating structures, and in such cases the sub-images can remain the same as they are moved or indexed. The array of image projectors project sub-images that can cover the entire build area, or a portion of the build area needing exposure for a particular layer. The image projection system containing the array of image projectors can be moved over the print area (e.g., within an open vat of resin or under a membrane and resin tub) to produce larger 3D printed parts than can be made conventionally (i.e., conventional parts must fit within projected areas of non-mobile (i.e., static) imaging systems focused on a pre-determined build area). An advantage of such systems is that fewer image projectors can be used to cover a large build area without compromising pixel resolution (i.e., without enlarging a single projector to cover a larger area, which results in lower resolution projected images). In other words, an advantage of the systems described herein is that large parts can be printed with high spatial resolution. Such systems are capable of creating larger printed parts without sacrificing the spatial resolution of the imaging system, compared to a static image projection system where the image projectors are positioned farther away from the build area, or the magnification of the imaging system is increased, to increase the sub-image size of each projector at the expense of spatial resolution.

In some embodiments, the exposure time of the pixels within a composite image of a given size will be a function of the movement of the projected sub-images, the magnification of the projected sub-images, and/or the total number of sub-images. For example, a single projector is capable of projecting a certain amount of power. If the magnification is increased (i.e., to project a larger sub-image) then the photon flux incident on each pixel will be reduced. In embodiments where the sub-images move in either step-wise or continuous motion, the amount of time the image is projected on a certain pixel before moving to a different location is directly related the amount of light exposure that pixel experiences.

Figure 9A:
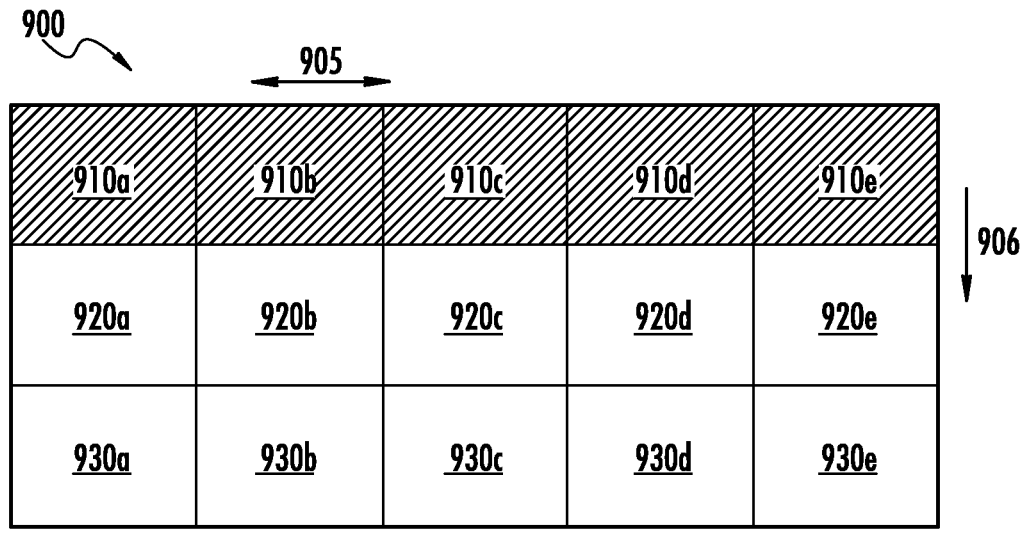
FIGS. 9A and 9B are simplified schematics of composite images composed of moving sub-images, in accordance with some embodiments.
Figure 9B:
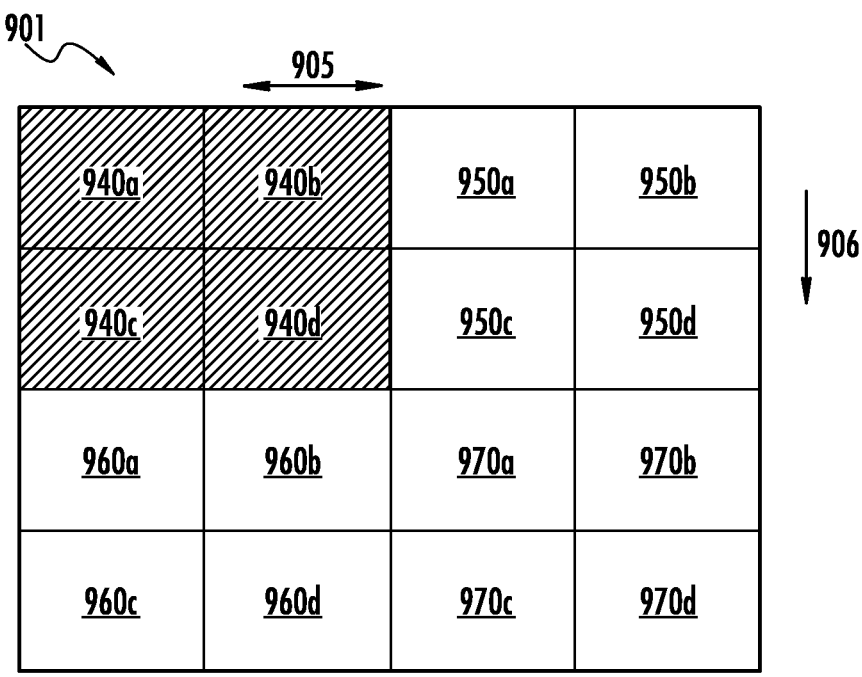

The sub-images being emitted by the projectors can move in one direction or two directions across the build area. FIG. 9A shows a non-limiting example of a composite image 900 made up of 15 sub-images 910*a-e*, 920*a-e* and 930*a-e* arranged in a 3×5 array (with 3 rows and 5 columns). In this example, an array of image projectors projects a 1D array of sub-images 910*a-e* (i.e., containing a row of sub-images) oriented in a first direction 905 (e.g., covering the whole width of the build area), and then the 1D array of sub-images 910*a-e* is moved along a second direction 906 perpendicular to the first direction (e.g., along the length of the build area to cover the whole build area) to project sub-images 920*a-e* corresponding to a second row of sub-images, and sub-images 930*a-e* corresponding to a third row of sub-images. FIG. 9B shows a second non-limiting example of a composite image 901 made up of 16 sub-images 940*a-d*, 950*a-d*, 960*a-d* and 970*a-d* arranged in a 4×4 array (with 4 rows and 4 columns). In this example, an array of image projectors projects a 2D array of sub-images 940*a-d* (i.e., containing a 2×2 array of sub-images) oriented in a first direction 905 and a second direction 906 (e.g., covering part of the width and part of the length of the build area), and then the 2D array of sub-images 940*a-d* is moved along the first direction 905 to project sub-images 950*a-d* corresponding to a second 2×2 array of sub-images. In this example, the image projectors then move in the first direction 905 and the second direction 906 to project sub-images 960*a-d* corresponding to a third 2×2 array of sub-images, and then move in the first direction 905 to project sub-images 970*a-d* corresponding to a fourth 2×2 array of sub-images. In this example, the 2×2 array of image projectors uses a raster scan to cover the composite image 901.

In other examples, an array of image projectors can project a 2D array of sub-images in an N×M array, where N is the number of sub-images in one direction of the array and M is the number of sub-images in another direction of the array, where N and/or M can be from 1 to 5, or 1 to 10, or 1 to 20, or 1 to 100, or 2, or 5, or 10, or 20, or 100. The array of sub-images can either cover the whole width or length of the build area, or cover a portion of the length or a portion of the width of the build area. In some embodiments, these 2D arrays of sub-images projected from the image projectors can have rows oriented along a first direction and columns oriented along a second direction, and can be moved (i.e., scanned) along either one of the first or second directions (i.e., in a linear scan in one direction), or along both the first and second directions (e.g., in a raster scan a or serpentine scan) within the build area such that the projected sub-images cover the whole build area. Some examples of movements along two directions (e.g., both the width and length of a build area) are raster scans, serpentine scans, or any other type of scan geometry that cover the build area (or portion of the build area needing exposure for a particular layer).

In some embodiments, the number of image projectors (and/or sub-images projected at any particular moment) in the array is from 1 to 5, or 1 to 10, or 1 to 20, or 1 to 100, or 2, or 5, or 10, or 20, or 100 in each dimension. For example, the array size can be 1D, such as 1×1, 1×4, 1×8, 1×20, or 1×100, or 2D and rectangular, such as 2×4, 2×8, 2×20, 4×10, or 4×100, or 2D square, such as 4×4, 5×5, 8×8, 10×10, 30×30, or 100×100. In some embodiments, the array of sub-images can be any one of the sizes listed above and can move (e.g., in synchronization with the image display sub-system).

The examples of PRPSs including moving sub-images described herein can be applied to illumination systems in PRPSs with projection or non-projection based illumination systems including those that contain arrays of light emitting diodes, liquid crystal based projection systems, LCDs, LCOS displays, mercury vapor lamp based projection systems, DLP projectors, discrete lasers, and laser projection systems.

In some embodiments, the movement of the image projectors includes moving the light source of the image projector (e.g., such as an LED or lamp). In some embodiments, the light source moves by translation (e.g., along a plane that is roughly parallel to the plane of the build area). FIG. 10A shows a non-limiting example of a composite image made up of sub-images 1010*a-c*, where the light source 1012 moves by translation in the direction 1005. In some embodiments, the light source moves by translation and the direction of translation (e.g., 1005 in FIG. 10A) is approximately parallel to the plane of the build area. In such cases, each image can be calibrated for position, and other corrections, as described further herein.

In some embodiments, the light source will move by tilting and/or rotating the light source around one or more axes of rotation. FIG. 10B shows a non-limiting example of a composite image made up of sub-images 1020*a-c*, where the light source 1022 moves by rotation in the direction 1006. In some embodiments, the direction of rotation (e.g., 1006 in FIG. 10B) has an axis of rotation that is approximately parallel to the plane of the build area. In cases where the image projectors rotate, the position and other corrections such as warp and skew, as described further herein, can be accounted for.

In some embodiments, the light source for the image projectors will be stationary and the projected sub-images will move through the use of moving optical systems (e.g., moving mirrors, or moving lenses). In some embodiments, the optical systems will move by translation (e.g., along a plane that is roughly parallel to the plane of the build area), or by tilting and/or rotating the optical systems around one or more axes of rotation. FIG. 10C shows a non-limiting example of a composite image made up of sub-images 1030*a-c*, where the light source 1032 is stationary, and a mirror 1034 moves by rotation in the direction 1007 to project the sub-images 1030*a-c*. Alternatively, FIG. 10D shows a non-limiting example of a composite image made up of sub-images 1040*a-c*, where the light source 1042 is stationary, and a lens 1044 moves by rotation in the direction 1008 to project the sub-images 1040*a-c*. In different cases of moving optical systems (e.g., those shown in FIGS. 10C and 10D), each projected image can be calibrated for position, warp and skew, and/or other corrections, as described further herein.

The non-limiting examples in FIGS. 10A-10D contain systems with one moving image projector, or one stationary image projector and one moving optical system (e.g., a mirror or lens). In other embodiments, the PRPSs described herein can contain more than one image projector and or optical system, and the image projectors and/or optical systems move to project a plurality of sub-images onto a build area. In these cases, the multiple image projectors and/or optical systems can all move by translation or rotation. In some embodiments, the PRPS contains sub-systems to enable each image projector and/or sub-image to move independently. In other embodiments, the PRPS contains sub-systems to enable all of the image-projectors and/or sub-images to move as a group. In some embodiments, the image projector(s) and/or optical system(s) can both translate and rotate to project sub-images at different locations within a build area.

In some embodiments, encoders are used to measure the position of a moving component (e.g., image projector or optical system element). For example, magnetic linear encoders can be affixed to image projectors that move by translation and to a stationary chassis of the system, and the position of the image projector with respect to the stationary chassis would be accurately known. Such position feedback can be useful to calibrate the system prior to a print run and/or to monitor the position of the moving component during a print run.

In some embodiments, the movement of an array of image projectors (or optical systems) is synchronized with the display subsystem. For example, the display subsystem can create a print swath corresponding to the motion of each image projector for each layer to be exposed.

FIG. 10E shows a top down view and FIG. 10F shows a perspective view of a non-limiting example of a PRPS 1050 with movable image projectors, in accordance with some embodiments. FIG. 10E shows two image projectors (or image projector assemblies) 1052*a-b*, that are mounted on movable systems 1054*a-b*, which are driven by motors 1056*a-b* and allow the image projectors to move in the X and Y directions (as shown by the coordinate system in the figure), and additional moveable systems 1058*a-b*, which allow the image projectors to rotate about the X and/or Y axes (or around an axis other than X or Y). FIG. 10F additionally shows a movable system 1054*c* and a motor 1056*c*, which allow the image projectors to move in the Z direction (as shown in the coordinate system in the figure), a resin tub 1062 and a build platform 1064 than can be moved (in the Z direction) into and out of a resin pool contained within the resin tub 1062. The additional moveable systems 1058*a-b* are not shown in FIG. 10F, but can be included in some embodiments.

Continuing with FIGS. 10E and 10F, in some embodiments, the image projectors 1052*a-b* contain light emitting diodes, liquid crystal based projection systems, LCDs, LCOS displays, mercury vapor lamp based projection systems, DLP projectors, discrete lasers, or laser projection systems. The example PRPS 1050 in FIGS. 10E and 10F show two image projectors 1052*a-b*, however, similar systems can be used to move more than 2 image projectors, such as from 2 to 20 image projectors. The image projectors (e.g., 1052*a-b* in FIGS. 10E and 10F) can be mounted using any mechanism, for example, using a mechanism that securely mounts the projector to the moveable systems (e.g., 1054*a-c* and/or 1058*a-b* in FIGS. 10E and 10F), and that is capable of maintaining a static position of each projector (e.g., during an exposure, in accordance with some methods).

The movable systems 1054a-c can include belts, chains, guide rails, lead screw drives, or other types of linear drive mechanisms. The motors 1056a-c can include stepper motors, DC brushed or brushless servo-based motors, or a combination thereof, or other types of movement systems capable of working with the moveable systems 1054a-c to move the image projectors. In some embodiments, position feedback is used to accurately move the image projectors a certain distance and/or to a certain location in space. Position feedback can be obtained optically, electrically, magnetically, or using a combination thereof. Some non-limiting examples of position feedback systems are those that include optical encoders, magnetic encoders, and optical array position sensors. The moveable systems 1054a-c can be in locations other than those shown in FIGS. 10E and 10F. For example, the moveable systems 1054a-c need not be on the side of the mounted image projectors; they can be positioned in the middle between the mounted image projectors 1052a-b. In some embodiments, there is more than one motorized rail system in a given axis.

FIGS. 10E and 10F show one example of a PRPS with multiple image projectors that can move along multiple axes. In some embodiments, similar movement systems can be used in PRPSs that project from the top down, rather than bottom up, as shown in FIGS. 10E and 10F. The image projectors can be independently moveable or their movement can be coupled together (e.g., using the same movement system to move multiple image projectors), in different embodiments.

The movement provided by the mechanisms shown in FIGS. 10E and 10F enable each image projector 1052a-b to translate in the X and Y directions as depicted in FIG. 10A, and the additional moveable systems 1058a-b enable each image projector 1052a-b to rotate as depicted in FIG. 10B. In other embodiments, the image projectors are stationary, and a mirror or lens system can translate and/or rotate using similar mechanisms shown in FIGS. 10E and 10F to enable the systems depicted in FIGS. 10C and 10D.

Two categories of moving systems and methods will now be described, one using a step-expose-step configuration and one using a continuous motion configuration. In both of these types of systems, the array of sub-images can be 1D or 2D, and can be moved (i.e., scanned) in one direction or more than one direction to cover the portion of the build area needed for a given layer exposure.

Figure 11:
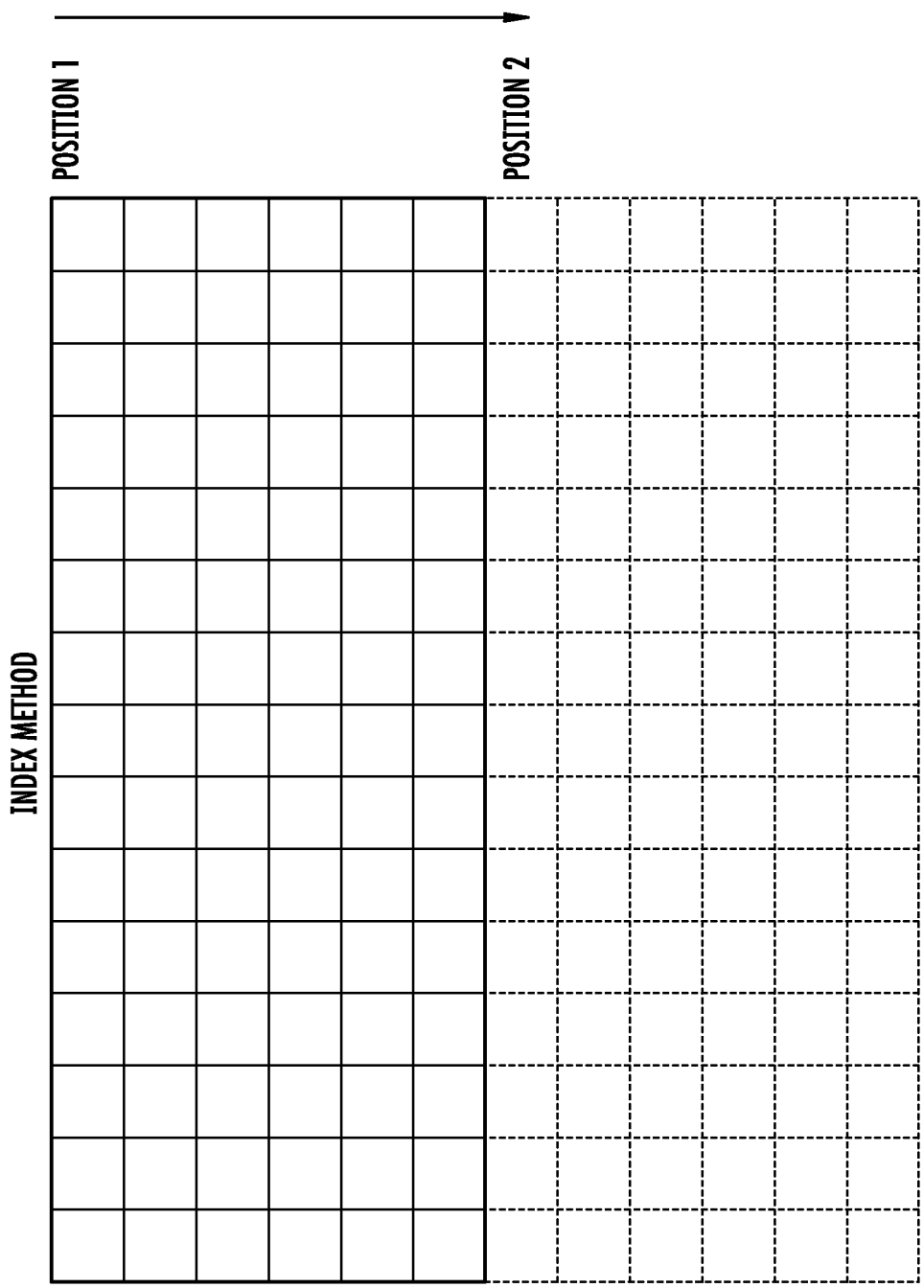
FIGS. 11-13 are simplified schematics of moving sub-images, in accordance with some embodiments.

In some embodiments of image projection systems and methods with arrays of moving image projectors projecting moving arrays of sub-images, step-expose-step systems and methods are used. For example, an array of image projectors can be moved to a first position and then the sub-images of each image projector can be displayed. Then the array can be moved to a second position and a second set of sub-images can be displayed. By repeating this step-expose-step process, the entire build area can be exposed in a piece-wise fashion. The examples shown in FIGS. 10A-10D illustrate different types of movement that can be used to form a composite image from sub-images that are projected at different locations by moving an image projector or optical system using a step-expose-step method. FIG. 11 shows one example of a step-expose-step system and method (i.e., an index method), where a 15×5 pixel sub-image (i.e., each box in FIG. 11 depicts a pixel within a sub-image) of an image projector (e.g., within an array of image projectors) is used to project a 15×5 pixel sub-image at "position 1" (solid lines) within the build area, and then the array of image projectors is moved and a 15×5 pixel sub-image is moved and projected onto "position 2" (dashed lines) within the build area. The sub-images in position 1 and position 2 in this example do not overlap, however, in other embodiments of step-expose-step methods adjacent sub-images will overlap with one another.

Figure 12:
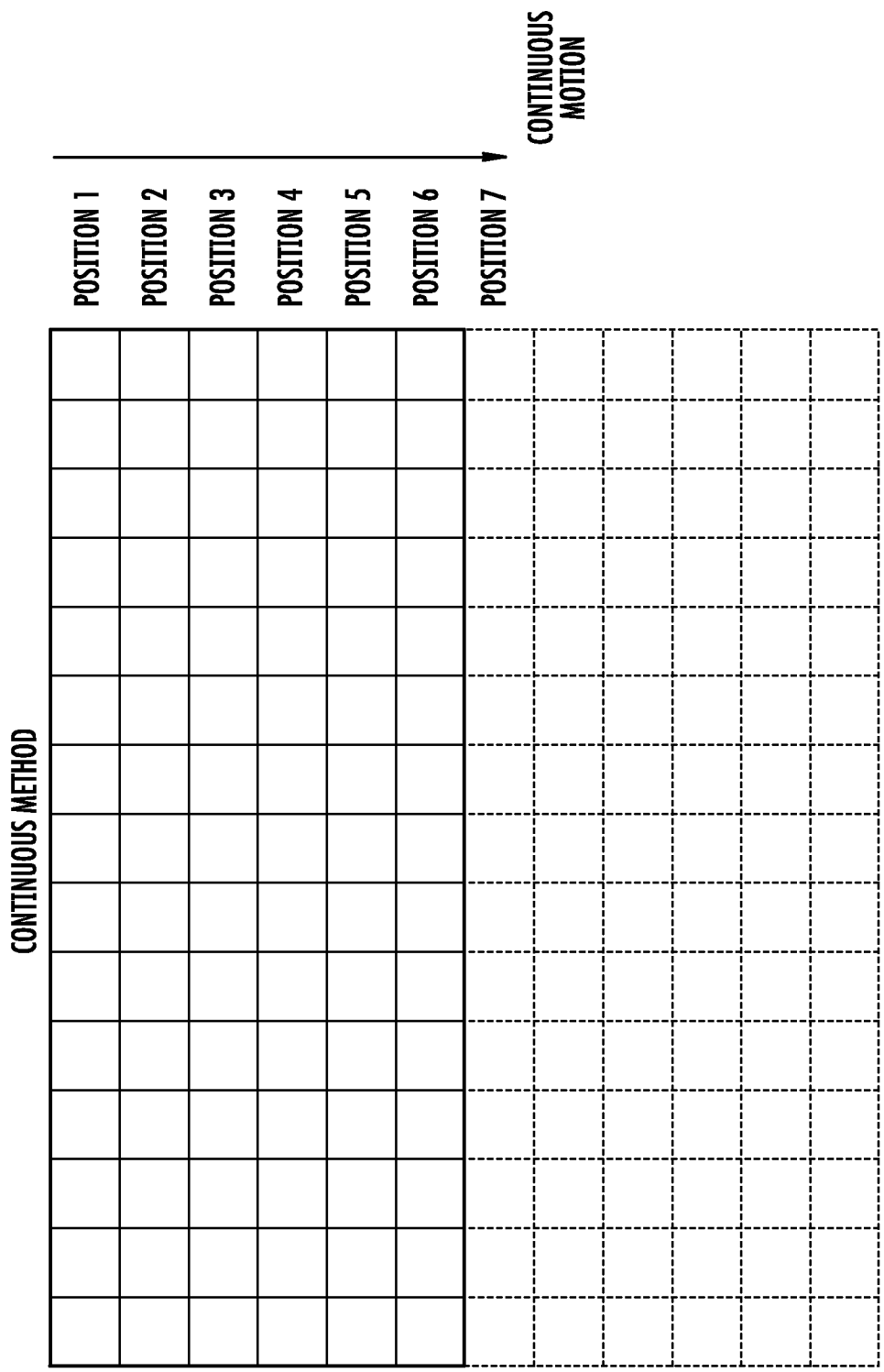

In some embodiments of image projection systems and methods with moving arrays of image projectors projecting moving arrays of sub-images, continuous motion is used. For example, an array of image projectors can be continuously moved across a build area, and the display sub-system can synchronize the projected sub-images with the velocity of the array movement. In this manner the array can move at a constant velocity (in one or more than one direction, e.g., in a linear scan, a raster scan, a serpentine scan, etc.) and the image content is continuously updated to create a moving "exposure aperture" of the full layer image. FIG. 12 shows one example of a continuous movement system and method, where a sub-image of an image projector within an array is used to project a sub-image over "position 1" through "position 7" within the build area (each box in the figure depicts a pixel within a sub-image), and the array is continuously moved along the build area in the direction of "continuous motion". In other words, the trailing edge of the sub-image shown in FIG. 12 will start at "position 1", and then continuously move such that the trailing edge of the sub-image will be located at "position 2", then at "position 3", and so on until the layer exposure is complete. Once the sub-image reaches "position 7" in this example, the trailing edge will be past the point of the leading edge when the image was at "position 1". In such embodiments, at any single instant in time a portion of the composite image (i.e., a sub-image) is projected by each of the image projectors in the array. However, in these embodiments, since the array of sub-images is continuously moving across the build area, the display subsystem will control each image projector to project a "movie" (or animation) of sub-images in which each sub-image effectively moves across the field of view of each of the image projectors in real time (e.g., synchronized with the movement of the array of image projectors). In such embodiments, the exposure time of each pixel is related to the scan speed (i.e., the speed at which the sub-image moves across the build area). In these embodiments, the exposure of a given pixel is also related to the size of the exposure region in the direction of motion of the sub-image. In general, the total energy transfer to a theoretical "point" of resin is related to power times time, and in embodiments with continuously moving sub-images the time factor is comprised of the distance scanned divided by the scan velocity.

In some embodiments, the array of image projectors and sub-images is moved to overcome defects in the image projectors and sub-images (e.g., dead pixels, lens artifacts, etc.) by shifting the sub-images slightly to regions or areas having good pixels or with the most optimal optical properties. In such embodiments, the movement is synchronized with the display subsystem to project the appropriate sub-images across the whole build area (or portion of the build area needing exposure for a particular layer) to create the pattern needed for the part being printed.

Figure 13:
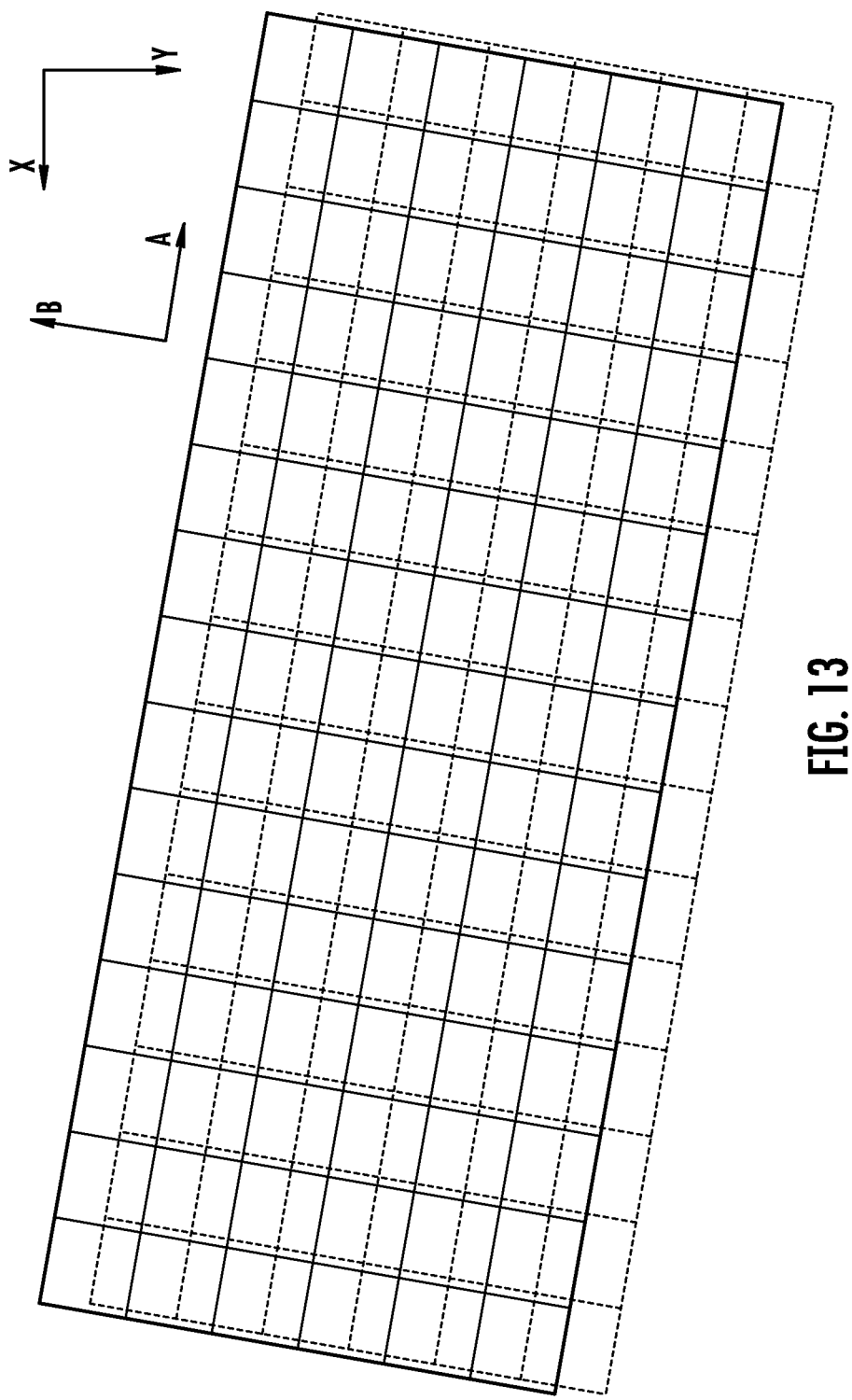

In some embodiments, a moving sub-image (e.g., as described above) is tilted with respect to a scan direction to provide better interpolated resolution in the direction perpendicular to the scan direction. For example, FIG. 13 depicts two instances (in time) of a continuously moving sub-image projected from a continuously moving image projector (or optical system), where the orientation of the sub-image is tilted (or rotated) with respect to the scan direction. The scan direction is in the "Y" direction in the figure, and the first sub-image is shown as solid lines that define the pixels within the sub-image. The dotted lines show a second sub-image after the sub-image moves in the "Y" direction. For example, a 2D array of sub-images can be oriented such that the sub-images are arranged in rows oriented along a first direction and columns oriented along a second direction, and the movement of the image projectors is such that the sub-images move in a third direction that is different from both the first and second directions. FIG. 13 shows an example of a tilted sub-image with rows and columns oriented along two directions "A" and "B", that is moving in a third direction "Y". In this example, the tilted sub-image provides higher resolution in the "X" direction (the direction perpendicular to the scan direction "Y"). The effective resolution in the "Y" direction is also increased due to the tilting, and in some embodiments, is also impacted by the movement parameters of the image projector. For example, in the case of continuous sub-image scanning, the effective resolution in the direction of movement can be governed by the quality of the motion control and movement synchronization with the display sub-system. In some cases, the motion control quality is high enough to provide sub-pixel resolution in the scan direction (e.g., in terms of movement and/or positioning accuracy). In some embodiments, tilting enables the system to have higher granularity in one or more directions of the build area by enabling interpolation between pixels (e.g., within the image display subsystem). In contrast, a non-tilted imaging system would result in granularity defined by the image pixel size in the direction perpendicular to the scan direction.

In some embodiments, an image projection system contains an array of image projectors projecting an array of sub-images, and the orientation of each of the sub-images in the array is tilted with respect to a scan direction to provide better interpolated resolution in the direction perpendicular to the scan direction as described above.

There are a number of devices that can serve as the apparatus for moving the array of image projectors within the image projection system. Some examples include, but are not limited to, motors, pneumatics, gravity-based systems, and linear actuators. The imaging systems described above are not limited to projection DLP based systems. Some examples of imaging systems that can utilize an array of image projectors as described herein include, but are not limited to, DLP based systems, lamp-based projection systems, LCD based systems, and laser-based imaging systems.

In some embodiments, more than one part (or object) can be printed simultaneously. This can be advantageous to more optimally utilize the build area and increase part production rate. In some embodiments, an additive manufacturing system contains an array of image projectors, each of which projects a sub-image onto a build area, and more than one part is printed within the build area during a single print run. For example, an additive manufacturing system can contain an array of 3×3 image projectors, projecting 9 total sub-images onto a build area, and 9 individual parts (i.e., parts that are not physically connected) can be printed within the build area during a single print run. In that case, one image projector projects a set of sub-images, where each sub-image exposes one layer for a single part. In this example, since each individual object is created using a single image projector in the array, the stitching together of the sub-images from the different image projectors in the array is less complex (e.g., edge blending would not be required), or is not required at all.

In some embodiments, more than one object is printed simultaneously and each individual object is printed using a single image projector in the array, as described above. In other embodiments, more than one object is printed simultaneously and more than one image projector is used to print a single object. For example, an additive manufacturing system can contain an array of 2×4 image projectors, projecting 8 total sub-images onto a build area, and 2 individual parts (i.e., parts that are not physically connected) can be printed within the build area during a single print run. In this example, each individual part can be printed using 4 of the image projectors. In this example, each individual object is created using more than one image projector in the array, and the stitching together of the sub-images is somewhat more complex (e.g., edge blending for some of the sub-images would still be required).

In some embodiments, the individual objects (i.e., one or more objects) that are printed simultaneously are approximately identical, while in other embodiments, the individual objects that are printed simultaneously are different from one another. In some embodiments, more than one object is printed simultaneously and the image projectors and/or optical systems in the additive manufacturing system are stationary or are moving, as described further herein.

In some embodiments, the PRPSs described herein further include a calibration fixture containing a plurality of sets of light sensors. In some embodiments, each set of light sensors is associated with one or more sub-images, and the signals from the sets of sensors are fed into one or more microcontrollers to process the information from the sensors and provide the information in a feedback loop to the PRPS to make adjustments to the sub-images (e.g., alignment, position, intensity, warp, edge blending and/or any of the image corrections or adjustments described herein). In some embodiments, the light sensors in each set are placed such that they line up or coincide with positions at or near the corners of the one or more sub-images.

In some embodiments, the calibration fixture can be inserted into the PRPS to capture the illumination from the image projection system at any time (e.g., between print runs, during print runs, once to initially set up the system (e.g., at the PRPS production factory), or periodically for maintenance. In some embodiments, the light sensors used in the calibration fixtures have narrow fields of view, to improve the alignment accuracy provided by the calibration fixture.

Some non-liming examples of some embodiments of the systems and methods described herein follow.

Example 1: Irradiance Mask

In this example, an image projector outputs across its projected area a solid white image where, when measured (e.g., by a calibration fixture described herein), the pixels in the top left corner are 5% less bright (i.e., 5% lower irradiance) than elsewhere in the field of view. An irradiance mask is applied that acts as a "burn filter" (i.e., a filter that decreases or increases the irradiance in a pattern, locally, or uniformly across an image). The irradiance mask, when applied to the solid white image, brings the 100% bright pixels elsewhere in the image down to 95% in order to create a uniform irradiance across the whole image.

Example 2: Reactivity Variations

In this example, a gamma correction is used to remap 0-255 pixel values to the addressable range of reactivity for curing a resin. This maximizes the number of gray-scale levels available which is beneficial to minimize aliasing artifacts from curved or smooth surfaces being produced on an inherently square-pixel based projection system. Furthermore, different resins used in PRPS s generally have different reactivity curves. Gamma correction filters, such as the one described in this example, can be used for each different resin to remove variations and improve part-to-part consistency, which is beneficial to enable PRPSs to operate effectively in industrial manufacturing settings.

Figure 14:
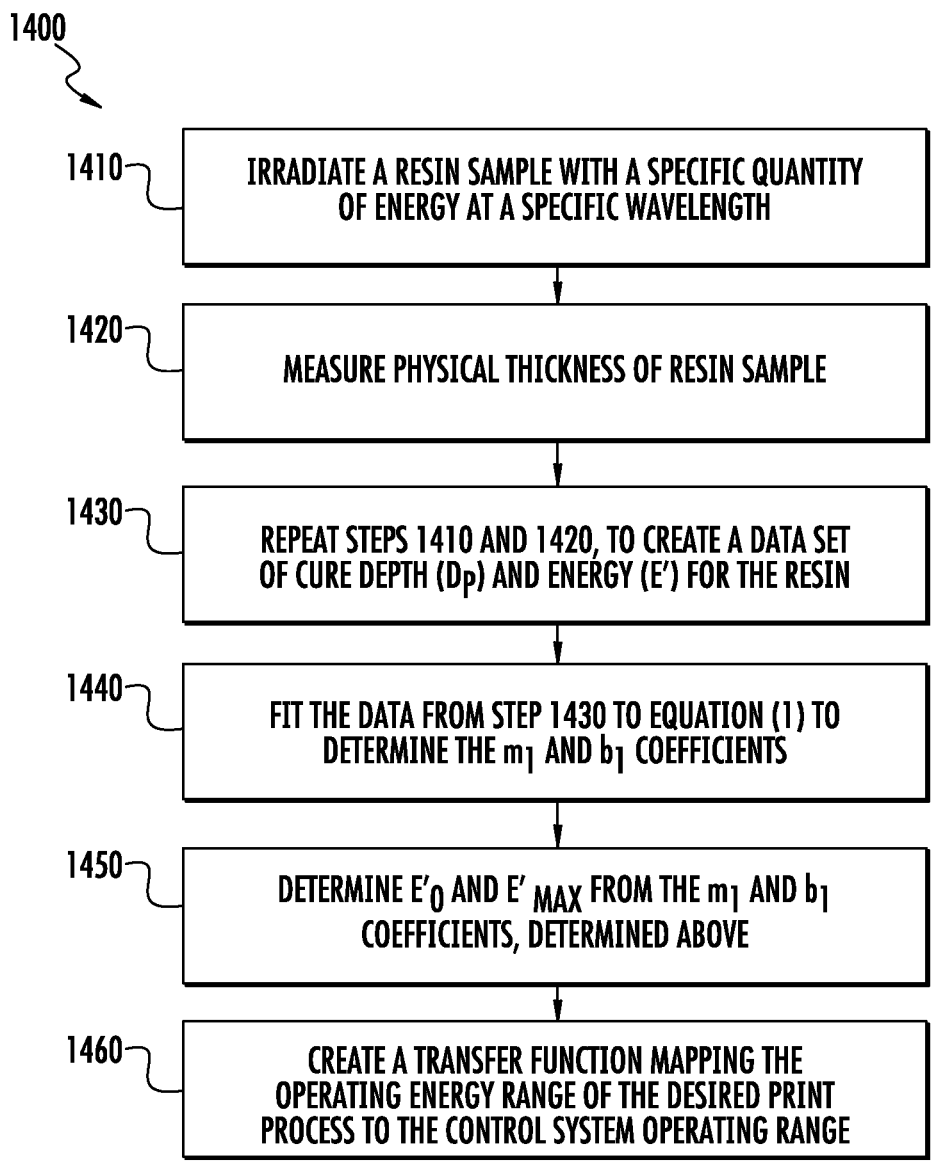
FIG. 14 is a flowchart of a method describing gamma correction, in accordance with some embodiments.

The relationship between the cure depth and the energy per unit area for a non-limiting example resin can be determined using the method 1400 shown in FIG. 14. The method 1400 shown in FIG. 14 describes how the relationship shown in FIGS. 5A-5B and equations (1)-(7) can be determined in accordance with some embodiments.

In step 1410, a sample of resin is placed in a PRPS and the PRPS is commanded to irradiate the resin sample with a specific quantity of energy at a specific wavelength. In step 1420, the sample is then removed from the printer and the physical thickness of cured resin, resulting from step 1410, is measured. Any measurement technique that provides sufficient accuracy may be used to measure the thickness of the cured resin in step 1420. One non-limiting example of a resin thickness measurement method includes the use a micrometer (e.g., mounted on a Starrett stand with granite surface) for making comparative measurements. In such a method, the thickness of a cured resin sample can be measured by lowering a plunger tip of the micrometer under a specified load (or contact force) and allowing the tip to settle for a specific amount of time before taking a thickness reading. Another non-limiting example of a resin thickness measurement method includes the use of a laser measurement device where the laser wavelength is outside the resin curing wavelength window. The result of steps 1410 and 1420 is a single data point of cure depth ($D_p$) and energy (E'). In step 1430, steps 1410 and 1420 are repeated over a desired range of energy doses to create a data set of cure depth ($D_p$) and energy (E').

In step 1440, the data set determined in step 1430 is fit to the relationship of equation (1) to determine the coefficients $m_1$ and $b_1$. For the resin in this example, $m_1$ can equal 40.0 μm/(mJ/cm²), and $b_1$ can equal −105.0 μm (note that the b coefficient in this case is negative, indicating that the y-intercept of the line in FIG. 5A is below the x-axis). The relationship of the actual data to the derived data set can be tested using a least squares regression analysis to compute the correlation coefficient. In some embodiments, the target for the $R^2$ value is 0.95 or better. Having determined the coefficients for the resin in equation (1), a suitable working relationship is available for use in the PRPS for the specific resin tested at the specific wavelength of the energy utilized.

In step 1450, the two specific relationships for $E'_0$ and $E'_{max}$ in equations (4) and (5) are derived from equation (1) as described above, using the $m_1$ and $b_1$ coefficients determined in step 1440. $E'_0$ is a fundamental property of the resin, and $E'_{max}$ is affected by the resin curing behavior and the specifics of the desired print process. For the resin in this example with the $m_1$ and $b_1$ coefficients described above, $E'_0$ is 13.8 mJ/cm². In this non-limiting example, the desired cure thickness is 250 and therefore the resulting value for $E'_{max}$ is 7150 mJ/cm².

The next step 1460 in the gamma adjustment process 1400 is to create a transfer function mapping the operating energy range of the desired print process to the control system operating range. Given a hypothetical input energy quantization range of 0 to 255 to be distributed over a logarithmic energy distribution ranging from $E'_0$ to $E'_{max}$, the resulting energy function is given in equation (6), where $m_2=(255/E'_{max})$ and $b_2=0$.

Figure 15A:
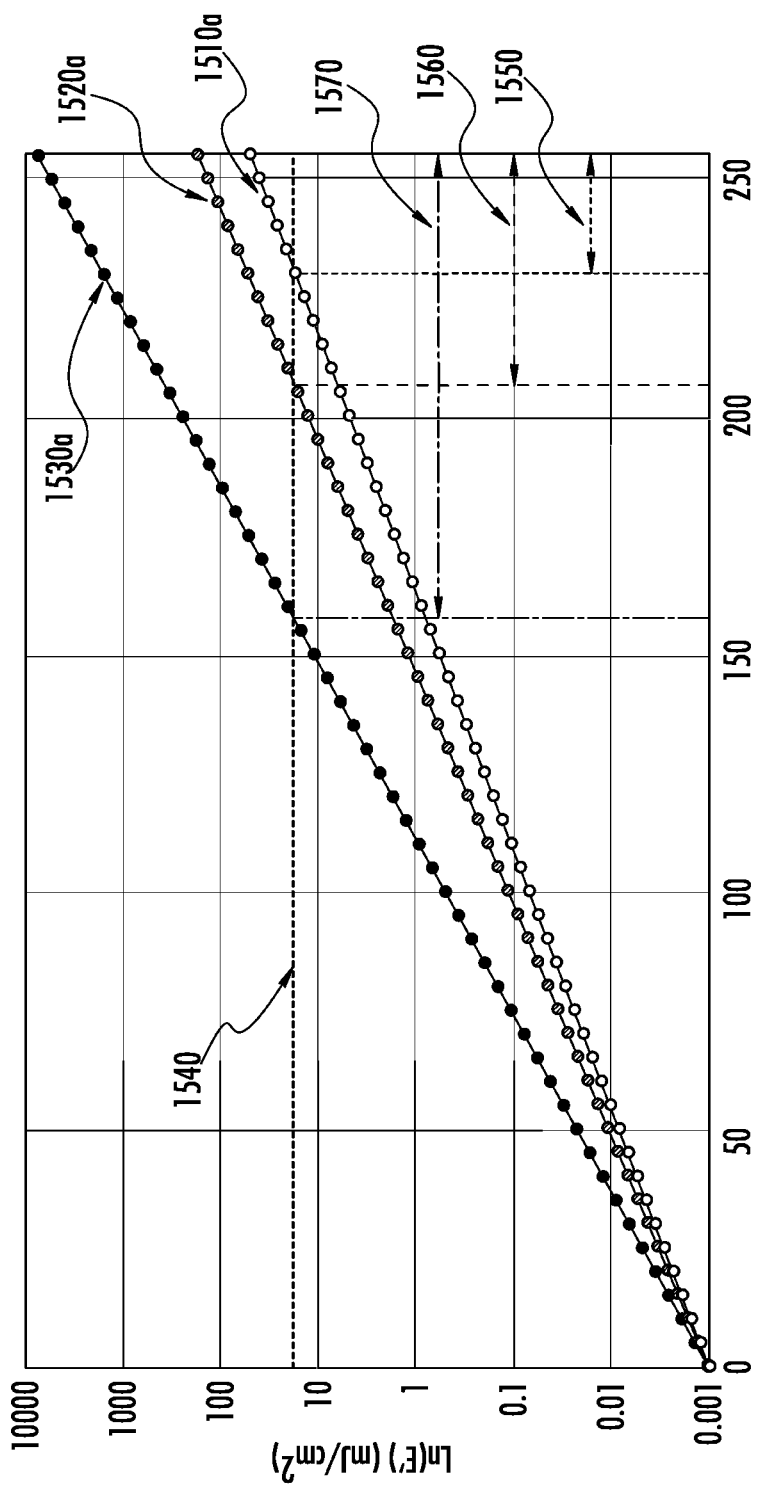
FIG. 15A is a plot showing the relationship between energy per unit area (E') and pixel intensity (L) for an example resin before any gamma correction is applied, in accordance with some embodiments.
Figure 15B:
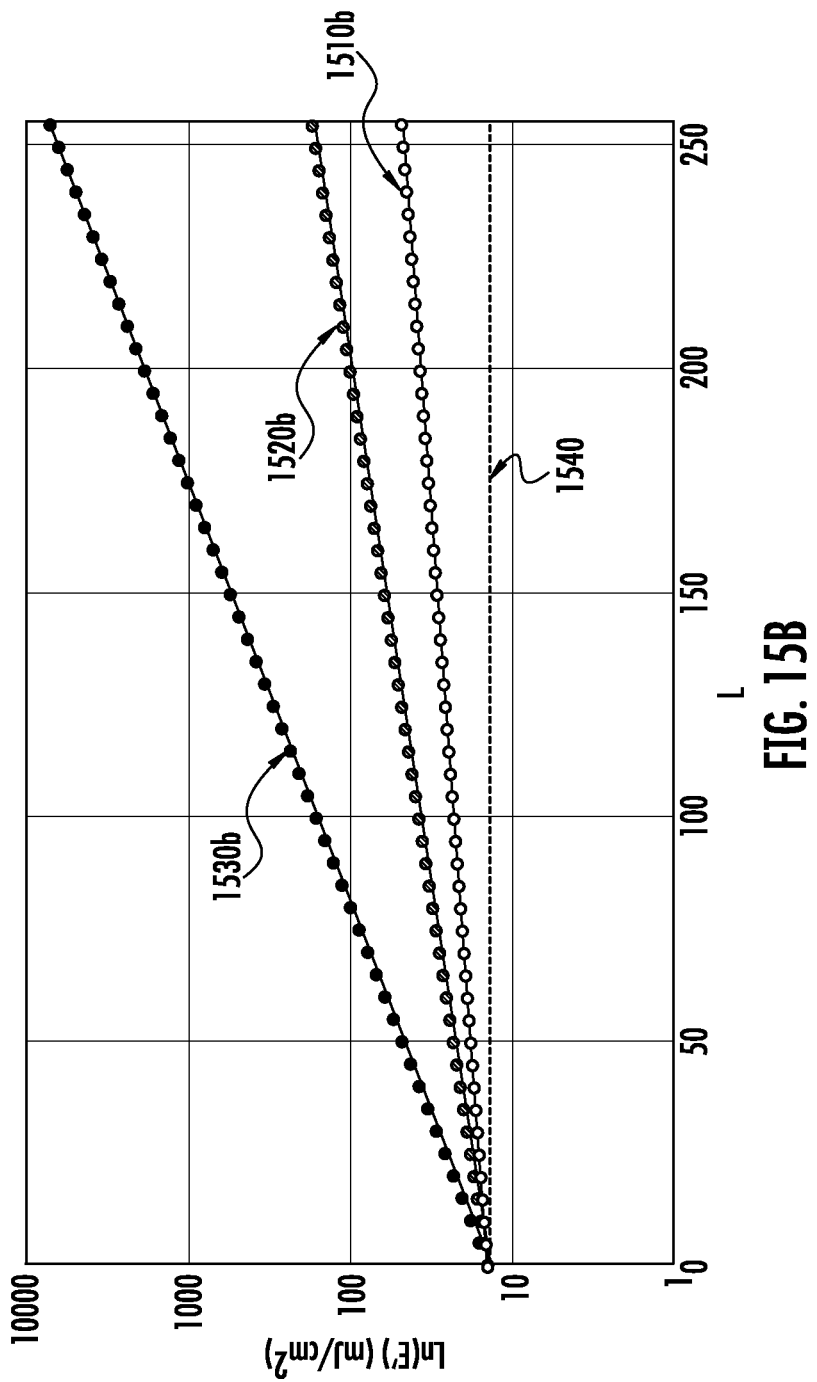
FIG. 15B is a plot showing the relationship between E' and L for an example resin after gamma correction is applied, in accordance with some embodiments.

FIGS. 15A and 15B show relationships between the energy per unit area (E') and the pixel intensity (L). The plots in FIGS. 15A and 15B have ln(E') in units of mJ/cm² on the y-axes and L (with ranges from 0 to 255) on the x-axes. Three curves are shown in each plot. In this example, curves 1510a-b correspond to a layer thickness (i.e., the thickness of each layer in the printed part) of 50 microns, curves 1520a-b correspond to a layer thickness of 100 microns, and curves 1530a-b correspond to a layer thickness of 250 microns. Correspondingly, the curves show that thicker layers require more energy for a particular input value L. The minimum ln(E') 1540 required to produce a cure depth $D_p=0$ is also shown in the figures.

FIG. 15A shows the relationship between E' and L before any gamma correction is applied. The dynamic ranges (i.e., the range of pixel intensities that can be achieved by the resin) before gamma correction are limited, and are shown by ranges 1550, 1560, and 1570, for 50 micron, 100 micron and 250 micron thick layers respectively. Before gamma correction, therefore, the full range of pixel intensities (e.g., 0-255 in this example) cannot be achieved. In other words, the fidelity (or granularity) of pixel intensities L and/or energy densities E' is limited. Furthermore, the thinner layers require less energy to reach a maximum required cure depth, $D_p$, but the minimum ln(E') 1540 required to produce a cure depth $D_p=0$ is similar for thicker and thinner layers. As a result, the dynamic range for thinner layers is generally even smaller than that of thicker layers.

FIG. 15B shows the relationship between E' and L after gamma correction is applied, as described above. The minimum energy per unit area ln(E') 1540 required to produce a minimum cure depth, $D_p=0$, now corresponds to L=0. Additionally, the energy required to achieve a maximum cure depth, $D_{p,max}$, corresponds to L=255. In other words, the above gamma correction methods enable the full dynamic range of pixel values to be achieved (and/or, a higher fidelity of pixel values to be achieved). FIG. 15B also shows that the full dynamic range is achievable for all layer thicknesses in this example.

In some cases, a PRPS contains an illumination source, wherein the output energy power from the illumination source is a function of a power input to the illumination source. It is therefore useful to determine the exposure time ($T_{exp}$) required to produce a given energy per unit area (E') for a given input power to the illumination source. For example, the irradiance (Ir) in equations (2) and (3) can be a function of the input power (pwm) to the illumination source, which can be defined by the following expression $$Ir = C_2*(pwm)^2 + C_1*pwm + C_0 \qquad (10)$$

where $C_0$, $C_1$ and $C_2$ are constants. Equation 10 can then be substituted into equation (3) to determine the exposure time ($T_{exp}$) needed to produce a particular energy per unit area (E') for a given input power (pwm) to the illumination source.

Calibration Systems and Methods

Multiple image projectors and subsystems can be grouped together in an additive manufacturing system, such as a PRPS, to produce larger build areas for 3D printed parts, as described above. Calibrating and blending the multiple image outputs into one composite image can be difficult and inefficient. Manual means can be used to mechanically align and calibrate the image projectors to combine the multiple sub-images together into a single composite image. The calibration systems and methods described herein can be used to calibrate "bottom up" PRPSs (e.g., as shown in FIGS. 1A-1G) or "top down" PRPSs (e.g., as shown in FIGS. 16A-16E). The calibration systems and methods described herein can be used to calibrate a PRPS locally (e.g., at each projector output) and globally (e.g., at the overall extents of the vat area) to ensure, for example, that sufficiently uniform irradiance is achieved while having acceptable edge blends at the seams (or overlapping areas) of projected sub-images. For example, a system using multiple DLP image projectors to project a composite image onto a build area within a resin tub or vat (e.g., in a "bottom up" PRPS, or in a "top down" PRPS) can be calibrated both locally (e.g., at each DLP image projector output) and globally.

Figure 16A:
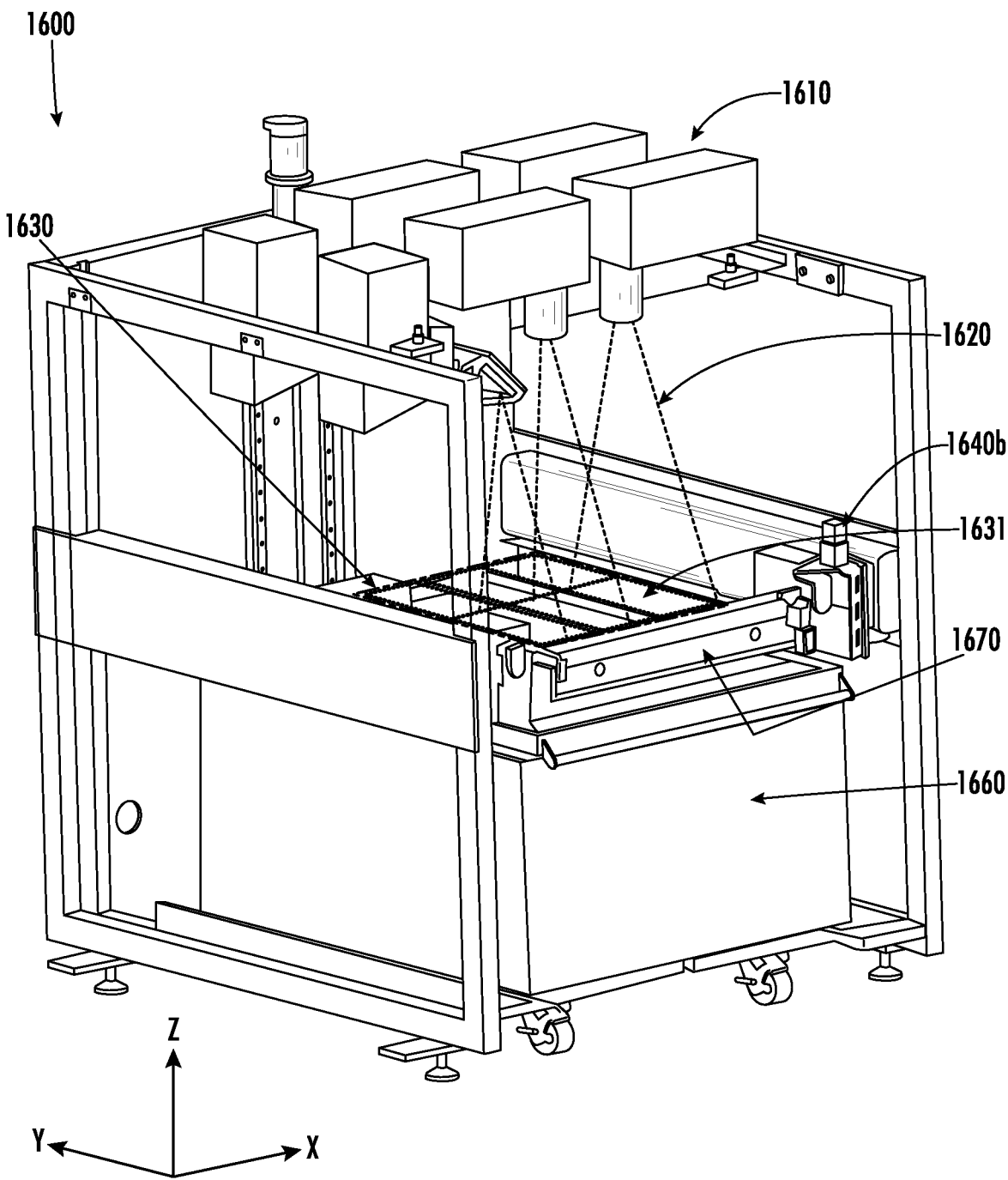
FIGS. 16A-16E show examples of "top down" PRPSs with multiple image projectors (six projectors in these examples) and a calibration fixture with one or more light sensors, in accordance with some embodiments.

"Top down" PRPSs are inverted with respect to the system shown in FIGS. 1A-1G. In such "top down" systems, the illumination source is above the resin pool (the resin within the tub/vat), the print area is at the upper surface of the resin pool, and the print platform moves down within the resin pool between each printed layer. An example of a "top down" PRPS is shown in FIG. 16A. Another type of additive manufacturing system combines a vat-based format with dispensing additional materials onto the vat material. In either the top down or dispensing types of vat-based printing, the 3D printed layers are typically submerged into the vat one layer at a time during the job (or print run). Once the job is complete, the platform can lift the 3D printed part out of the vat for removal. Typically, these printing systems have the imaging/light source at the top of the machine facing down. In other types of "top down" PRPSs, the light sources can be located in another position and/or orientation than those shown (e.g., in FIG. 16A) and mirrors (or fiber optics, lenses, etc.) can be used to direct light from a light source to the top of the resin pool.

The calibration systems and methods described herein can be implemented as calibration systems that are integrated into a PRPS (e.g., as shown in FIG. 16A), or as modular calibration systems (e.g., as shown in FIG. 22A) that can be coupled to a PRPS for calibration and that can be decoupled. The modular calibration fixtures described herein can be "coupled" to a PRPS by mechanically coupling a component of the modular calibration fixture to a component of the PRPS, or by inserting a stand-alone modular calibration fixture (e.g., on a cart with wheels or casters, or on a dedicated table or support frame) into a position such that light sensor(s) of the modular calibration fixture can detect light from the image projectors (e.g., by being in, near, coincident with, or lining up with, a multi-image plane or build area). As such, in some cases, a stand-alone modular calibration fixture can be "coupled" to a PRPS without physical contact between the modular calibration fixture and the PRPS. Additionally, a modular calibration fixture can be coupled to a PRPS electrically, meaning that a wired or wireless electrical connection is established between the modular calibration fixture and the PRPS, which enables communication between the modular calibration fixture and the PRPS. For example, a PRPS can communicate with a modular calibration fixture through wired or wireless electrical couplings to identify that the particular modular calibration fixture be the one to calibrate the PRPS. Integrated and modular calibration systems are described further herein.

The PRPS calibration systems and methods described herein can use manual and/or automated systems to calibrate multiple image projectors of a PRPS, as described herein. Automated PRPS calibration systems include one or more sensors that are coupled to a control system (e.g. that employs a controller, processer, or any logic computing device and combinations thereof) using electrical couplings (e.g., wires or wirelessly). One or more components of the PRPS and/or calibration system can be coupled to the control system (or a controller, or a processor), and the control system (or controller, or processor) can control the one or more components using information from the sensor(s). For example, one or more level sensors or distance sensors can be coupled to one or more leveling motors, through the control system (or controller, or processor), and information from the level sensor(s) or distance sensors can be used to drive the motors to automatically level the calibration system. In another example, one or more light sensors of a calibration system can be coupled to an image display subsystem of the PRPS, and information from the light sensors can be used by the image display subsystem to automatically adjust one or more image projectors of the PRPS. There are trade-offs for using manual versus automated systems. Automated systems may be more expensive than systems that require manual operations, however, manually adjusting the mechanical parameters (e.g., focus, position, overlap, intensity, irradiance, etc.) of multiple image projectors to calibrate them may be more laborious, time consuming, and less accurate than automated means.

The PRPS calibration systems and methods described herein utilize one or more light sensors (e.g., UV light sensors capable of detecting light with UV wavelengths emitted by the image projectors, cameras, image sensors, or other types of light sensors capable of detecting light emitted by the image projectors) to manually or automatically calibrate one or more imaging sources, for example for irradiance leveling, warp/skew correction, and/or edge blending between sub-images. In some cases, the light sensors of the systems and methods described herein are image sensors (or cameras) that detect an image including multiple pixels. In other cases, the light sensors of the systems and methods described herein are photodetectors (or photosensors, or photodiodes) that detect the intensity of light and do not detect an image. In some cases, the light sensor(s) are coupled to motion systems built into the calibration system so that one or more light sensors can detect light from the one or more image projectors at more than one location. In some cases, the light sensor(s) can be placed at positions that line up with or are coincident with the sub-images in a composite image. The light sensor(s) can be placed just above (or below) the focal plane of the image projectors (or build area), or can be placed at one or more locations in the focal plane of the image projectors (or build area). The light sensor(s) can be placed such that they face one or more of the image projectors (or a bounce mirror that redirects light from an image projector).

A light sensor can be considered to "line up" with a position in the build plane when the light sensor position is on a direct line (or optical path) connecting a light source (e.g., an image projector or a bounce mirror) and a position within the build plane (or multi-image plane) in an orientation where it can detect light from the source. A light sensor can line up with a position in the build plane, in which it can be co-planar with the build plane, be above the build plane (e.g., closer to the source in a top down PRPS), or be below the build plane (e.g., farther away from the source in the top down PRPS). In other words, the direct line connecting the source and the build plane can extend from the source to past the build plane, and a light sensor can line up with a position in the build plane where the light sensor is located between the build plane and the source, or where the build plane is between the source and the light sensor. A light source would not be considered to line up with a position in the build plane if the light must first bounce off of a calibration surface (e.g., a calibration plate, or a calibration feature) before being detected by the light sensor, since in such a situation the light sensor would not be on a direct line (or optical path) connecting a light source (e.g., an image projector or a bounce mirror) and a position within the build plane (or multi-image plane). In some embodiments, a controller, processor and/or control system performs calculations to associate a light sensor position with a position in the build plane that lines up with the light sensor using geometry and known positions of the source and the light sensor. In some cases where the intensity of the detected light is used to calibrate the PRPS, a controller, processor and/or control system can calculate an adjusted intensity using geometry and known positions of the source and the light sensor, since the light intensity from the source will decrease with distance away from the source.

In some embodiments, a set of measurements is taken by one or more light sensors of a calibration system in a measurement plane. The measurement plane can be co-planar with the build plane, not co-planar with the build plane, parallel to the build plane, or not parallel with the build plane. In cases where the measurement plane is not parallel with the build plane, the measurement surface can be above the build area, below the build area, or both above and below the build area at different points on the measurement plane. In some embodiments, a set of measurements is taken by one or more light sensors of a calibration system in a measurement surface that is not a plane. The measurement surface can be above the build area, below the build area, or both above and below the build area at different points on the measurement surface.

The light sensor(s) of the calibration systems described herein can also be placed such that they detect light from an image projector (or a bounce mirror, filter, lens, fiber optic, or other optical component that redirects, filters, or focuses light from an image projector) without the light reflecting off of a calibration plate or calibration feature. In such cases, the calibration systems and methods described herein enable calibration of one or more image projectors of a PRPS without the use of a calibration plate (e.g., a reflective plate, or a plate with fiducial patterns, images, and/or markings used to calibrate the projectors), calibration feature (e.g., a reflective feature, or fiducial patterns, images, and/or markings used to calibrate the projectors), or formed feature (e.g., a fiducial pattern, image, and/or marking created by the PRPS and used to calibrate the projectors). Systems that calibrate image projectors using light reflected from a calibration plate (or other calibration feature) generally need to take into account coordinate transformations between the image projectors, the calibration plate (or feature), and/or the light sensors. Mechanical adjustments (e.g., to the calibration plate (or feature) and/or light sensors) may also be needed to ensure a proper reflectance angle from light reflected from the calibration plate (or feature). In some cases, fewer (or no) such coordinate transformations and/or mechanical adjustments are needed in the calibration systems and methods described herein. Systems that calibrate image projectors using light reflected from a calibration plate (or other calibration feature) also generally suffer from losses due to imperfect reflection, while, in some cases, the calibration systems and methods described herein do not use light reflected from a calibration plate (or feature) and therefore do not suffer from such reflectance losses.

In some embodiments, the light sensor(s) of the calibration systems described herein can be camera(s) that are configured to capture one or more images of a sub-image projected from an image projector of a PRPS. In some cases, the cameras can be configured to directly measure the light from the image projector without the light reflecting from a calibration plate or calibration feature. For example, optics (e.g., mirrors and lenses) can be used such that a camera can image an entire sub-image or an entire composite image at once, and information from the image captured by the camera can be used to calibrate the image projector(s). In another example, a camera can be movable, and can be moved across a multi-image plane to measure the sub-images using multiple captured images, and then the information from the camera can be used to calibrate the image projector(s). In another example, one or more cameras can be positioned to image a calibration plate (e.g., a reflective plate, or a plate with fiducial patterns, images, and/or markings used to calibrate the projectors), calibration feature (e.g., a reflective feature, or fiducial patterns, images, and/or markings used to calibrate the projectors), or formed feature (e.g., a fiducial pattern, image, and/or marking created by the PRPS and used to calibrate the projectors) and then the information from the camera can be used to calibrate the image projector(s).

In some embodiments, the PRPS calibration systems and methods described herein can detect unfocussed sub-images, predict hardware failure of the imaging system, and/or detect mechanical misalignment (or tolerancing issues) of the image projectors (or other components of the PRPS), which can result in defects in the final 3D part geometry if not corrected. The ability to detect these issues enables the PRPS to compensate for them to produce a focused, sufficiently uniform, and sufficiently accurate composite image at the focal plane (or within the build area) of the image projector(s), which in turn results in the successful and sufficiently accurate production of large-scale 3D printed parts.

In some embodiments, the PRPS calibration systems and methods described herein enable sub-images from multiple independent projectors to be stitched together without accurate prior knowledge of the positions of the image projectors. For example, if one or more projectors is misaligned from its intended (or designed, or pre-determined) position, one or more light sensors (e.g., light sensors that can move within an area of a calibration fixture) can be used to directly determine the position of the sub-image(s) from the projector(s). A display subsystem coupled to the light sensor(s) and the image projectors (as described herein) can receive a signal from the light sensor(s), process the signal containing information from the light sensor(s), and then send instructions to the image projector(s) to compensate for the different actual position of the sub-image(s) compared to the intended position of the sub-image(s). Such misalignments can occur in PRPSs due to tolerance stickups that cause accumulation of errors in positions between various elements (e.g., between the image projector(s) and the build area within the vat). In other examples, a parameter (e.g., position, size (or amount of zoom), intensity, intensity distribution, irradiance, irradiance distribution, focus, edge-blending parameter, skew, warp, gamma, contrast ratio, etc.) of one or more sub-images is sensed by the light sensor(s) of the calibration fixture and the display subsystem can then process information about one or more of those parameters and send instructions to the image projector(s) to compensate for the different actual parameter(s) of the sub-image(s) compared to the intended parameter(s) of the sub-image(s).

In some embodiments, the PRPS calibration systems and methods described herein can be used to calibrate multiple image projectors or other imaging devices (e.g., LCD Screens, or LED Screens) of the PRPS.

In some embodiments, the PRPS calibration systems and methods described herein can enable the image projector(s) to maintain their alignment by calibrating the PRPS at various time intervals (e.g., once per day, or before every print run, once per week, once per month, etc.).

In some embodiments, the PRPS calibration systems and methods described herein can enable a calibration of a projector after it has been replaced (e.g., due to an image projector failure).

In some embodiments, the PRPS calibration systems and methods described herein can be used to detect a projector failure or predict a projector that is near the end of its life, to determine if and/or when a projector is ready to be replaced.

In some cases, the calibration system (including the calibration fixture with light sensor(s)) is built-in to the PRPS. In some cases, the calibration fixture modular. In some cases, the calibration fixture is part of another system that is part of the PRPS (e.g., a recoater assembly that sweeps across the vat in a vat based DLP printing system).

In some cases, the calibration fixture includes light sensors coupled to a mobile carriage (or other system that enables the light sensors to move) that scans across one or more sub-image(s) that form a composite image. The calibration system can then collect data sensed by the light sensor(s) at different positions (e.g., within a focal plane or build area, or adjacent to a focal plane or build area) to optimize the image projector(s) and composite image formed by the image projector(s) of the PRPSs described herein.

A calibration method for a PRPS can include using a motion system that features light sensors (e.g., UV light sensors) aimed at one or more imaging sources (or aimed at a resin vat, in some embodiments) to analyze and calibrate the PRPS (or other 3D printing system or additive manufacturing system).

The process of sweeping (or scanning, or moving) the light sensor cluster across the seams (or overlap regions) of the sub-images can be repeated (e.g., in swaths along a direction) to characterize the UV intensity (or irradiance) change throughout the build area (e.g., over the seams between sub-images in a composite image). The display subsystem can also use information from the light sensors to adjust position(s) of sub-images to optimize edge blends at the seams, especially in the case of a composite image formed from overlapping sub-images. The display subsystem can also use this change in UV intensity (or irradiance) to map the variation of irradiance from projector to projector across the entire multi-image plane (or composite image). Once mapped, the irradiance can be adjusted or compensated (e.g., on a per image projector basis) to achieve a uniform irradiance across "stitches" (or seams, or overlap regions) and across the entire multi-image plane (or composite image) in general. The multi-image plane is the plane at which the composite image is projected onto the resin (or into a region of the resin) to react it and form a layer of an object. The sub-image from each of the projectors can be focused on the multi-image plane, aligned to the multi-image plane, and otherwise corrected using the calibration systems and methods described herein. Calibrating image projectors (including normalizing the irradiance between projectors) in situ (e.g., using a calibration system that is built into the PRPS) for a PRPS with two or more image projectors is advantageous in that it enables replacement of projectors in the field. For example, in some cases an image projector can be replaced and the calibration systems and methods decsribed herein can alleviate the need for laborious mechanical adjustments to achieve optimized edge blending and uniform irradiance of the composite image.

The PRPS calibration systems and methods described herein allow for the system to directly scrutinize the projectors, and the overlap (and blends) of the projectors and projected sub-images. In systems where the light sensors are on a moving stage, they may sweep across the blend (or overlap region) from one projected sub-image to another. In such cases, the light sensor(s) (e.g., UV light sensor(s)) can ride on an X-Y cartesian system that is positioned at the focal plane (i.e., at a focal distance away from the projectors), or along a plane that lines up with or is coincident with a build area. The light sensor cluster can have one or more light sensors with a mask including a small aperture hole (e.g., with a diameter of 10 microns, or less than 10 microns, or 500 microns, or less than 500 microns, or from 1 micron to 100 microns) to limit the amount and/or acceptance angle of the light (e.g., UV light) into the light sensor(s).

In some cases, the UV light sensor(s) of a PRPS calibration system is/are swept across a "white-screen" of projected sub-images along a direction, and a change in UV intensity (or irradiance) as a function of position (or time) is captured. The "white screen" is produced by each of the image projectors in the PRPS attempting to project a uniform image, wherein uniform content is provided to each image projector attempting to project a uniform image of sufficient intensity to be detected by a light sensor of the calibration fixture. In some cases, the uniform image has a bright intensity (e.g., greater than 50% of maximum irradiance, or greater than 90% of maximum irradiance). In other cases, test patterns can be used instead of white screens, depending on what attributes of the PRPS are being calibrated. The information gathered by the light sensors of the calibration system can then be interpreted by a processor (e.g., the image display subsystem, or a dedicated processor of the calibration system that interfaces with the PRPS) and be used to correct any nonuniformities of the projected sub-images. For example, information from the light sensors in regions where the sub-images overlap, or over multiple sub-images where irradiance from one projector to the other is different, can be used to correct the edge-blending parameters between sub-images and calibrate the global intensity between sub-images in the composite image.

The PRPS calibration systems and methods described herein can also measure, characterize, and/or monitor contrast ratio for one or more image projectors of the system. For example, in DLP projection systems, the contrast ratio performance of the DLP image projector impacts the degree of residual curing of unintended projected areas. The contrast ratio is dependent on the dark state of pixels (projected from the image projectors), which can be described as the "whiteness of the black image," or the residual UV light that gets through when pixels are supposed to be off. The PRPS calibration systems and methods described herein make it possible to map the differences in contrast ratio between projectors, for example, by sweeping the light sensor cluster across the sub-image projection zones when they are projecting a black (or lowest intensity or irradiance) image, and sweeping the light sensor cluster across the sub-image projection zones when they are projecting a white (or highest intensity or irradiance) image. This can especially be done over the seams (or overlap regions) of the sub-images. The contrast ratio information can be interpreted by a processor (e.g., the image display subsystem, or a dedicated processor of the calibration system that interfaces with the PRPS) and be used to correct various nonuniformities of the projected sub-images. In some cases, once the contrast ratio variation is mapped, it can be used to determine where to best position the 3D part to be printed on the build tray to avoid seams (or overlap regions) having high contrast ratio deviations (e.g., that have not been corrected). The contrast ratio map can also be monitored over the life of the PRPS to determine or predict potential failures of the imaging sources.

The light sensor(s) of the calibration systems and methods described herein can also be oriented to face the resin vat (instead of facing the image projector(s)), and can be used to collect information for PRPS systems. For example, in PRPS systems that include a recoater system one or more light sensor(s) on the recoater system that face the top surface of the resin in the vat can be used to collect useful data during standard recoating moves when printing. One or more light sensors facing the resin vat can be used to perform a scan (or a "quick-scan") for debris, or detect unusual UV light anomalies when UV light energy is not supposed to exist (e.g., when stray sunlight comes in from a seam of the PRPS, or when a door of the PRPS is ajar). One or more light sensors that are sensitive to UV and/or other wavelengths can also be faced towards the resin vat to detect anomalies on the top resin surface (e.g., detection of excess bubbles, broken part pieces, bugs, etc.)

The light sensor(s) of the calibration systems and methods described herein can also be used to monitor a state of a PRPS. For example, if a door to the machine was opened or closed, the light sensors can detect a change (e.g., a change in the total amount of light detected, or a change in light detected by one or more light sensors positioned nearer to the door compared to others positioned farther from the door) and a processor can use that information to determine if the door opening is an "unexpected state" (e.g., if the opened door exposed the PRPS to UV light during a print run or during a calibration operation). Such information could be fed back to a user interface of the PRPS to alert an operator or technician (e.g., that a print job or calibration operation may be compromised).

The calibration systems and methods described herein can also contain movement sensors (e.g., accelerometers, distance sensors, velocity sensors, or other types of sensors that can detect movement and/or that a component is moving or has moved) on the moving components (e.g., on the sensor cluster and/or carriage) to enable further closed-loop control on motion parameters of the moving components. Information from the movement sensors can be used to establish the accuracy and repeatability of a movement of a component (e.g., a light sensor) of the calibration system. Such sensed information can be used to monitor (and/or control) a calibration routine (or other critical routines described herein), and improve the accuracy of the calibration routine, thereby improving the quality and accuracy of 3D printed parts from the PRPS. For example, closed-loop position feedback control, closed-loop velocity feedback control, and other closed-loop motion control systems (e.g., utilizing PID loop motion control, etc.) can be used to control the calibration systems and methods described herein. For example, closed-loop feedback control can be used in subsystems within the calibration system that utilize pneumatic pressure. For example, closed-loop feedback control can be used to control pressure when pressure is used to move pneumatic stages for leveling, carriage motion control, or for moving sensors to predetermined positions (e.g., via actuators). The use of closed-loop feedback control on pressure subsystems can help control the motion of actuators, position of valves, flow rates, and other parameters (e.g., motion parameters) within the calibration systems. Some examples of motion parameters that can be adjusted using closed-loop feedback control are acceleration of an actuator, speed of an actuator, exhaust flow of an actuator, and others. In some cases, pressure can be monitored to determine if facility house air pressure is adequate for a calibration system. If the house air pressure is inadequate, then an alarm message can be displayed (and/or sent to user(s)) and/or the calibration system can stop a process (e.g., a calibration routine) in response. Closed-loop control systems for PRPSs that can be used to control the calibration systems and methods described herein are further described in U.S. Pat. No. 10,647,055, which is incorporated herein by reference in its entirety.

The one or more light sensors of the calibration systems and methods described herein can be one or more light sensors that detect an intensity of illumination and no spatial information, and/or can be one or more cameras that provide intensity and spatial information of the detected light. The calibration systems and methods described herein can also utilize computer vision to analyze the detected information. In some cases, the one or more light sensors are one or more cameras that are positioned at the bottom (or near (or at) the surface of the resin in the vat) or are positioned at the top (or "ceiling") of the PRPS. The one or more light sensors (or cameras) can be used to correlate the field of view of the light sensors (or cameras) with the illumination sources and/or sub-images of the composite image in a calibration routine.

The light sensor(s) of the PRPS calibration systems can also be manually placed (e.g., in a fixed position, or be manually moved to different positions) instead of being automatically moved (or scanned). The light sensor(s) can also be manually placed and manually read, in some cases. The light sensor(s) can also be manually placed and manually read, and then the information can be used to manually calibrate the image projectors, in some cases. In some cases, manual processes or a mixture of manual and automated processes can be done to achieve PRPS calibration using the systems described herein. However, there are trade-offs between manual and automatic calibration systems and methods.

The calibration systems and methods described herein can also be used in alternative additive manufacturing systems that combine a vat-based format with dispensing of additional materials onto the vat material that fills the vat. For example, the vat material can be a resin base material absent of photoinitiator, and the additional material deposited on the surface of the vat material (e.g., using inkjet printing, thermal inkjet-based technology, piezo-based jetting technology, or using syringe-type pumps to dispense the additional material) can be the photoinitiator. The entire vat can then be exposed to UV light and only the regions with the deposited photoinitiator will polymerize. The UV light, therefore, can be a blanket illumination (that exposes the whole surface of the vat at once), a page-wide illuminator (e.g., that is scanned across the vat to cover the whole vat area), or an illumination source that moves in two (or more) dimensions to scan across the vat area. Other types of vat material and/or deposited material can also be used, such as depositing a second composition on a first composition of vat material where polymerization components for formation of a layer of a part to be created are separated from each other, and where at least one of the polymerization components is in the first composition or the second composition. Such systems and methods including vat-based additive manufacturing with dispensed material are further described in U.S. Pat. No. 11,110,650, which is incorporated herein by reference in its entirety.

The calibration systems and methods described herein can be used to calibrate the light source(s) for the alternative additive manufacturing systems that combine a vat-based format with dispensing of additional materials described herein (e.g., using inkjet printing, thermal inkjet-based technology, piezo-based jetting technology, or using syringe-type pumps to dispense the additional material). The light sensor(s) of the calibration plate can be used to calibrate an illumination source (e.g., a "global illuminator," a page-wide illumination source, or a moving illumination source, as described herein) that is configured to illuminate the materials in the vat (e.g., positioned above the vat). The light sensor(s) can be aimed at the illumination source (or aimed at a bounce mirror, filter, lens, or other optical component that directs, filters, or focuses the illumination from the source) and be swept across the vat area to examine the uniformity of the illumination source across the entire build area. If non-uniform, the illumination source may be corrected to compensate for the non-uniformity to maintain a uniform source of light across the entire build area, ultimately resulting in uniform curing across the part which translates into better part accuracy. In other cases, e.g., if compensation is not available or not used, then the part to be printed can be positioned in areas or regions that exhibit more uniform irradiance.

Furthermore, the calibration systems and methods described herein can be used to align/calibrate nozzles or droplet positions in the alternative additive manufacturing systems that combine a vat-based format with dispensing of additional materials described herein. In such cases, the light sensors can be directed towards the surface of the resin, and detect light from (or image) the additional materials. For example, the additional deposited material can be a marker, and the marker can be illuminated with a wavelength of light that does not cause the resin to react (e.g., polymerize) but that does cause the marker to fluoresce. The light sensor(s) can be aimed towards the marker (i.e., towards the vat) and scanned across the vat area to analyze the deposited marker alignment (i.e., the position, amount, and/or type of marker that was deposited). The data captured by the light sensor(s) can then be used to compensate or correct for any misalignment in the dispensing head (e.g., containing nozzle jets), or trajectory and/or dispense position issues of the dispensed material (e.g., droplets). The data captured can also be used to determine when nozzles are not functioning properly (e.g., if a nozzle has failed, or to monitor the results of a nozzle health check). In an example, the dispensed (e.g., jetted) marker material can be a material that lacks photo-initiator such that it does not cure but rather fluoresces when exposed to UV light. In some cases, the marker material can also contain any color dye or other material (i.e., any type of "alignment agent") that also lacks photo-initiator when exposed to UV light.

Additionally, the calibration systems and methods described herein can be used to calibrate one or more laser light sources for laser-based stereolithography (SLA) additive manufacturing systems. In laser-based SLA additive manufacturing systems, correction of laser galvanometer image distortion is accomplished through a calibration process mapping actual imaging locations to theoretical locations. This usually involves a calibration template covering the full build area of the printer to calculate differences between actual and theoretical (or intended) locations. For example, such a calibration template can be used to correct for parabolic curve errors associated with galvanometers that control mirrors used in laser-based illumination systems. Calibrating additive manufacturing systems using calibration plates (or calibration marks), however, can have several drawbacks (as described herein) compared to calibration using the calibration systems and methods described herein.

The calibration systems and methods described herein can include one or more light sensors (e.g., lining up with a build area, or located coincident with a build area) that are pointed directly at the laser light source(s), or at a bounce mirror that redirects light from a laser to the build area, or at a lens that focuses light from the laser onto the build area, of a laser-based SLA additive manufacturing system. The light sensors can detect the light (e.g., using scanning, or other systems and methods described herein) and then use the detected information to calibrate one or more properties (e.g., intensity, location, focus, laser spot shape or other properties) of the light from the laser light sources.

Examples of Photoreactive 3D Printing System (PRPS) Calibration Systems and Methods FIGS. 16A-16E show examples of "top down" PRPSs with multiple image projectors (six projectors in these examples) and a calibration fixture with one or more light sensors. The light sensor(s) in calibration fixtures of these PRPSs are positioned such that they detect light directly emitted from the image projectors (or a bounce mirror, filter, lens or other optical component that redirects, filters, or focuses light from an image projector to the build plane), rather than being positioned to detect light reflected off of a calibration surface (e.g., calibration plate, calibration feature, or other surface that lines up with, is coincident with, or is adjacent to, the build area). In some cases, the light sensor(s) in the calibration fixtures collect light from the image projectors before the light reaches the build plane.

FIG. 16A shows an example of a PRPS 1600 with 6 image projectors 1610, in accordance with some embodiments. The projection paths (e.g., projection path 1620) of some of the image projectors is shown incident on a multi-image plane 1630 (or composite image plane). The multi-image plane is made up of sub-images, such as sub-image 1631 shown. The sensor(s) (shown in FIGS. 16B-16D) of a calibration fixture are positioned at (or near, or adjacent to, or above, or below) the multi-image plane 1630 to detect light (e.g., UV light) from the image projectors 1610. Two Z motors 1640*a* and 1640*b* (shown in FIG. 16B) can change the position of the sensors of the calibration fixture in the z-direction, for example to move the sensor(s) to be at (or near, or adjacent to, or above, or below) the multi-image plane 1630. In other cases, three or four Z motors can be used for height (z-direction) movement. A vat 1660 holding the resin is also shown. The build area is within the resin in the vat 1660, as described herein. The light sensor(s) of the calibration fixture are positioned to line up with, or be coincident with, the build plane, such that the light detected by the light sensors can be processed using an image display subsystem that provides information to the image projectors (e.g., using a processor that is part of the image display subsystem) to adjust one or more parameters of an image projector and/or a sub-image from an image projector to calibrate the PRPS. For example, one or more mechanical parameters (e.g., focus, position, zoom, overlap, intensity, etc.) of one or more image projectors, and/or one or more parameters (e.g., position, size (or amount of zoom), intensity, intensity distribution, irradiance, irradiance distribution, focus, edge-blending parameter, skew, warp, gamma, contrast ratio, etc.) of one or more sub-images can be adjusted to calibrate the PRPS. Any sub-image parameter described herein can be detected and adjusted using the PRPS calibration systems described herein.

Figure 16B:
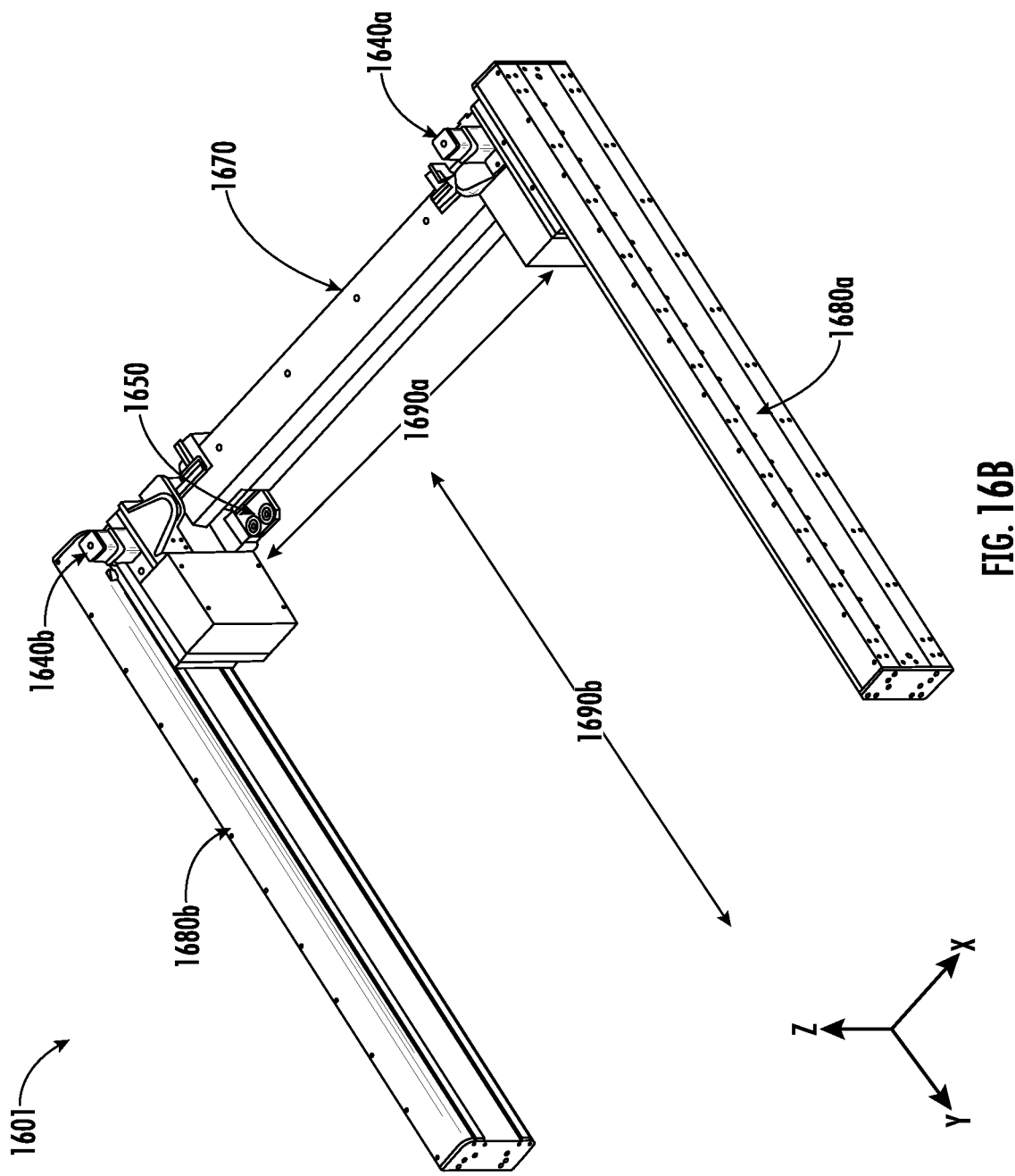

FIG. 16B shows an example of a recoater system that is also a calibration fixture 1601 for a PRPS. Some components in FIG. 16B are the same as those shown in FIG. 16A. The calibration fixture 1601 includes a recoater blade assembly 1670 with a sensor cluster 1650, in accordance with some embodiments. Recoater systems without calibration fixtures are typically used in recoating processes that ensure an approximately uniform thickness of resin is deposited above the previously exposed layer before the following layer is exposed. The recoating process can be accomplished through various methods, but commonly consists of a blade sweeping (or scanning) along one axis of the printable (or build) area. The intended result is a consistent resin level across the entire resin vat with the previously exposed layer a distance of one layer thickness below the resin level. Deviation in the resin thickness above the previously printed layer before the following layer exposure can result in print defects, and a recoater can reduce the occurrence and/or severity of such defects. In this example, the calibration fixture 1601 includes a recoater blade assembly 1670 that includes a sensor cluster 1650 (e.g., single or multiple UV light sensors) on a carriage that can be moved in the X, Y, and Z axes (as shown). FIG. 16B shows the sensor cluster 1650 that can be moved along the "sensor motion" direction 1690a (in the +/−X directions), and that the carriage can be moved along the "recoater motion" direction 1690b (in the +/−Y directions), such that the sensor cluster 1650 can be swept across the multi-image plane 1630 shown in FIG. 16A. The carriage can also be leveled and moved along the Z-direction using Z motors 1640a and 1640b, for example, to move the sensor(s) into and out of the focal plane of the image projectors (or build area of the PRPS). The carriage (and sensor cluster 1650 coupled to the carriage) can move in the sensor motion direction 1690a (e.g., using an X motor, that is a linear motor embedded in the recoater blade assembly and not visible in FIG. 16B), and the carriage can move along the recoater direction 1690b (e.g., using one or more Y motors, embedded in Y linear stage 1680a and/or Y' linear stage 1680b and not visible in FIG. 16B). The Z motors can also level the carriage (and sensor cluster 1650) and move the carriage in the Z-direction.

In this example, the sensor cluster 1650 is aimed at the imaging sources and can be swept across the entire (or a portion of the) imaging plane (i.e., multi-image plane 1630, or composite image plane, or build area) to determine information pertaining to focus, alignment and/or edge-blending between sub-images, irradiance uniformity, and other parameters of the sub-images described herein (e.g., warp and/or skew). The sensor(s) of the sensor cluster can be coupled to the display subsystem, which can use the collected data to calibrate, optimize focus, perform irradiance correction, and/or adjust any parameter of the sub-images described herein, to optimize the accuracy and quality of a 3D printed part produced by the system.

Figure 16C:
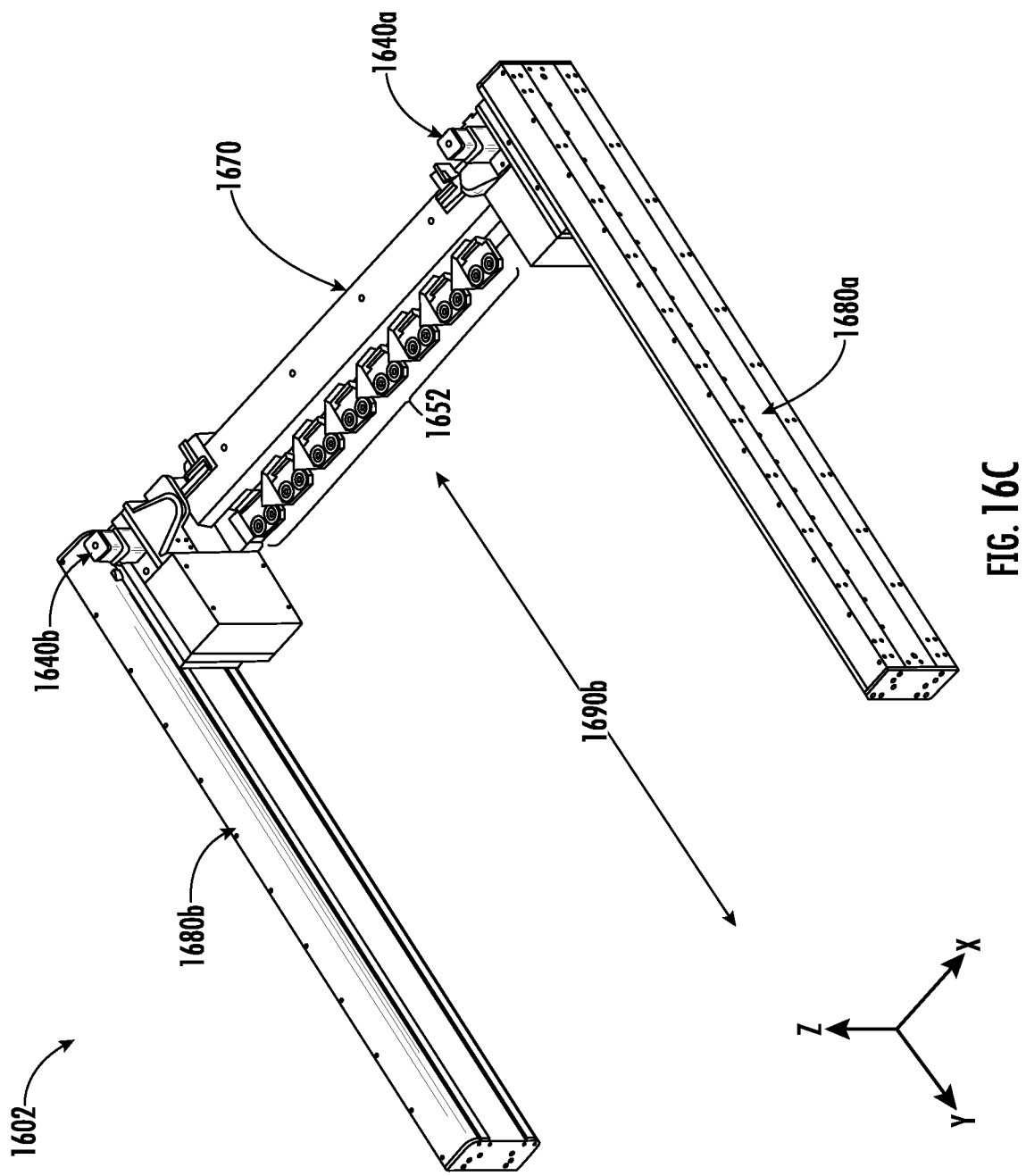

FIG. 16C shows an example of a recoater system that is also a calibration fixture 1602 with a plurality of light sensors 1652 distributed along the X axis, in accordance with some embodiments. Some components in FIG. 16C are the same as those shown in FIGS. 16A and 16B. In this case, plurality of light sensors 1652 are positioned across the X-axis such that X-axis motion of the sensors is not required. Instead, the recoater moves in the +/−Y direction to allow the sensors to analyze the composite image, such as the border regions of the sub-images.

In some embodiments, the sensor cluster can include a plurality of sensors distributed along the X- and/or Y-directions and some movement in the X- and/or Y-directions is still used to scan the plurality of sensors across an area of the PRPS (e.g., the focal plane or build area).

In some embodiments, the PRPS can include more than one sensor cluster, each of which contains one or more light sensors. Each of the sensor clusters can scan across an area of the PRPS (e.g., the focal plane or build area), either in concert (e.g., using a shared movement system) or independently (e.g., where each sensor cluster is coupled to a movement system such that each sensor cluster can be moved independently of the others).

Figure 16D:
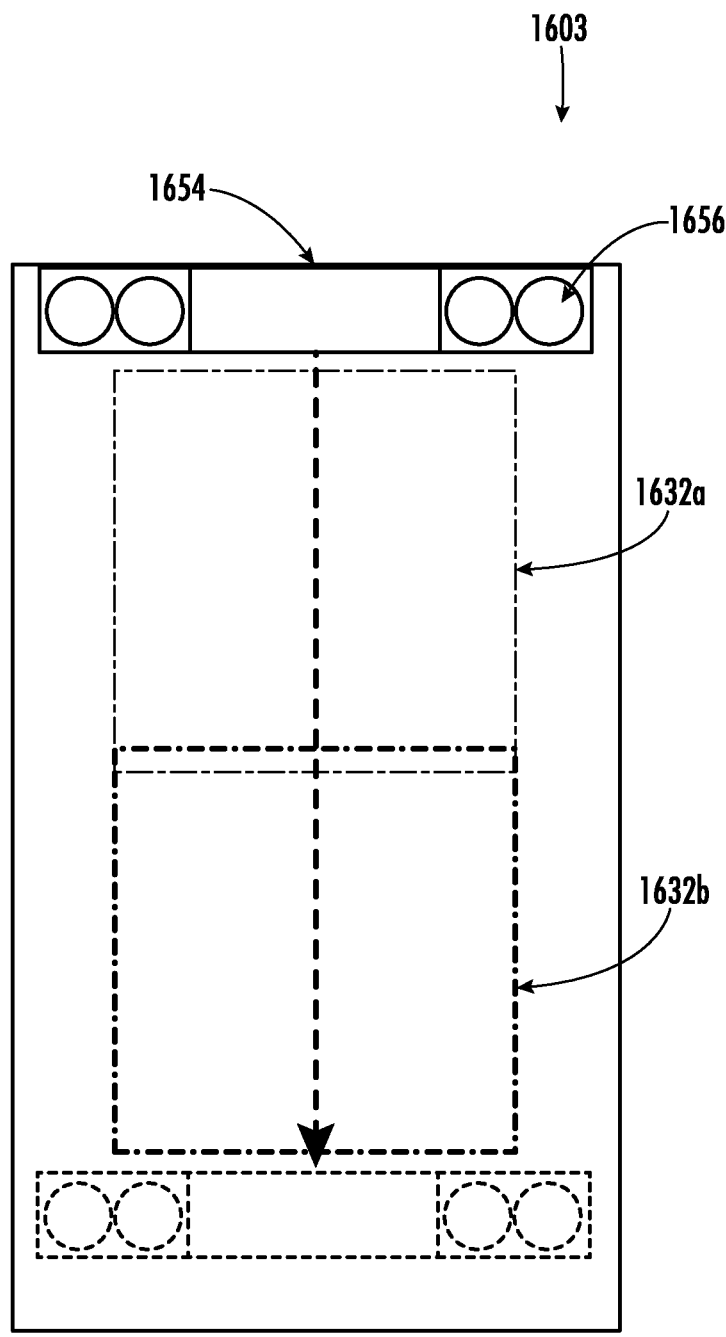

FIG. 16D shows another example of a calibration fixture 1603 for a PRPS with 4 light sensors distributed along a sensor bar 1654 in a single axis, in accordance with some embodiments. The calibration fixture 1603 in this example can be used to calibrate a system with 2 image projectors (e.g., projecting overlapping sub-images (sub-image 1 1632a and sub-image 2 1632b in FIG. 16D)) that require stitching into a composite image. Sub-image 1 1632a includes the first and the third row of corners, and sub-image 2 1632b has the second and fourth rows of corners. In this case, 4 light sensors 1656 are placed on the sensor bar 1654. The current example shows light sensors 1656 placed towards the ends of sensor bar 1654 to detect light near the corners. In other embodiments, light sensors 1656 can be distributed along sensor bar 1654 in other ways, such as evenly, or clustered at other locations (e.g., depending on the configuration of the PRPS being calibrated). The sensor bar 1654 can be moved (e.g., using motors), as indicated by the arrow, to the first row of corners of the two sub-images, then to the second row of corners, followed by the third row of corners, and lastly the fourth row of corners. FIG. 16D depicts the single axis motion of the sensor bar moving across two projected sub-images that form a composite image. The sensors can also be scanned across the rows of corners to produce intensity (or irradiance) versus position information for each of the sub-images (e.g., the locations of the corners of the sub-images), as described further herein.

Figure 16E:
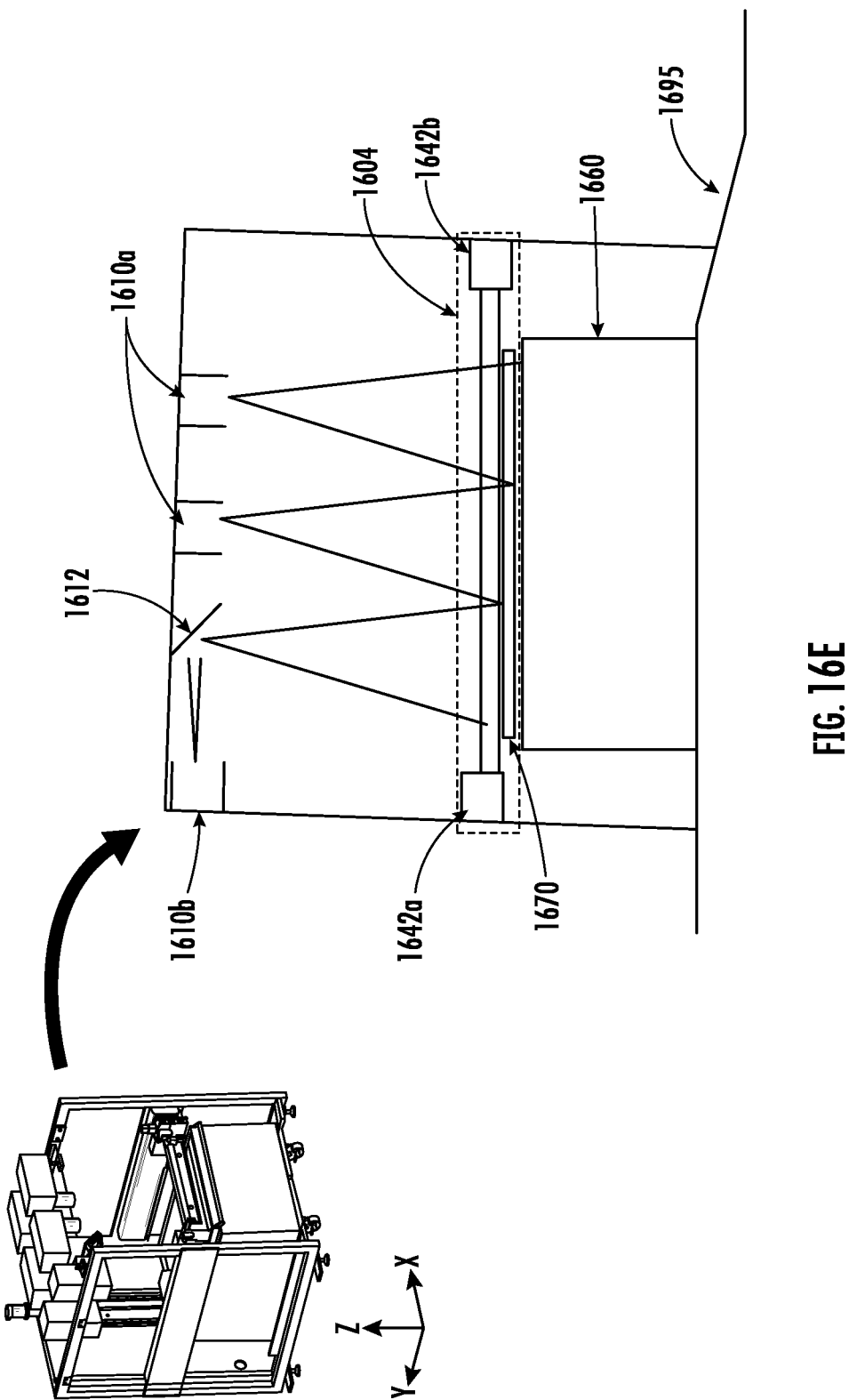

FIG. 16E shows a case where one or more components of the PRPS are not mechanically level. In this case, the floor 1695 that the vat 1660 sits on is not level, which causes some components of the PRPS (including image projectors 1610a and 1610b and the recoater system with the calibration fixture 1604) that are intended to be level with the vat 1660 resin surface to be tilted relative to the rest of the 3D printer frame due to lack of levelness with the floor 1695. As a result, the plane along which the recoater blade assembly 1670 (and sensor(s) of the recoater system with the calibration fixture 1604) moves is misaligned with the plane of the vat 1660 resin surface. The Z-direction adjustability of the recoater system with the calibration fixture 1604 (e.g., using linear stages and Z motors 1642a-b, which correspond to Z motors 1640a-b and Y linear stages 1680a-b in FIGS. 16B and 16C) allows for calibration in not just a 2D plane, but also in a 3D plane since the sensor cluster can move around a 3D space to maintain levelness with the top surface of the resin (or to maintain a constant distance from the multi-image plane). In some cases, any of the sensors can be at an angle relative to the 3D printer frame in order to maintain an angle (or plane of movement) that is level with the vat 1660 (or multi-image plane, e.g., 1630 in FIG. 16A). In some embodiments, the multi-image plane is level with the surface of the resin, which is approximately level with "true level" (i.e., level as determined by gravity).

FIG. 16A shows six image projectors 1610. Some of the image projectors (1610 in FIG. 16A and 1610a in FIG. 16E) (the "top projectors") are aimed directly at the vat, while some of the image projectors (1610 in FIG. 16A and 1610b in FIG. 16E) (the "side projectors") use a bounce mirror 1612 to redirect the light from the projector to the vat 1660. For example, in the PRPS shown in FIG. 16E, there can be six image projectors, four of which are top image projectors 1610a that are aimed directly at the vat, and two of which are side image projectors 1610b that each use a bounce mirror (e.g., bounce mirror 1612) to redirect the light to the vat, similar to the configuration shown in FIG. 16A. In other cases, a PRPS can have more or fewer than six image projectors, each of which can be oriented as top projectors or side projectors (using bounce mirrors), and calibration systems and methods described herein can be used to calibrate the PRPS. The light sensor(s) in these examples are therefore aimed at (or are facing) the image projectors 1610a-b for the case of the "top projectors" and are aimed at (or are facing) the bounce mirror 1612 for the case of the "side projectors." In both cases, the sensor(s) are aimed at the image projectors 1610a or a bounce mirror 1612 that redirects light from an image projector 1610b to the vat 1660 (or the multi-image plane, or the build plane), rather than being positioned to detect light reflected off of a calibration surface (e.g., calibration plate, calibration feature, or other surface that lines up with, is coincident with, or is adjacent to, the build area) or a calibration structure formed by the PRPS. Since the one or more light sensors are aimed directly at the source of the projected light, and no calibration plate is needed, there are fewer components that need aligning to perform a calibration procedure compared to methods that use calibration plates.

The PRPS calibration systems and methods described herein can also calibrate global irradiance across the composite image, for example due to the focal imaging plane of the projectors not being perfectly parallel to the resin top surface. Again, the vat resin surface could be tilted relative to the rest of the 3D printer, projectors included, based on how level the floor is. This results in some projectors being physically closer to the top surface of the resin than others. For example, FIG. 16E depicts the right most projectors 1610 being physically closer to the top surface of the resin than the left ones. In this case, the sensor cluster can capture a full global map of irradiance across the composite image (or a portion thereof) and the display subsystem can use the captured information to correct for such intensity (or irradiance) differences and misalignments. For example, the right-most projector sub-image may be brighter than the others (and/or misaligned with others, and/or out of focus compared to others) due to the global imaging plane not being perfectly parallel to the resin top surface (i.e., distance between projectors and resin top surface may be different from projector to projector). The sensor cluster can be swept across the global imaging plane (or a portion thereof) as part of a calibration routine to detect for such irradiance differences (an initial irradiance map can be created) which can then be corrected (by the display subsystem) to maintain uniform irradiance across the entire top surface of the resin. This type of irradiance check or calibration can be done over the life of the PRPS (e.g., as the LED life of the imaging sources degrade over time, which can occur at different rates of degradation).

Additionally, in some cases, the PRPS calibration systems and methods described herein can also calibrate levelness, and/or distance between one or more projectors and the vat. In some cases, the levelness of a PRPS can be calibrated by measuring the intensity (or irradiance) of light from one or more image projectors of the PRPS. For example, if the intensity (or irradiance) from one image projector is brighter than other image projectors (or brighter compared to a predetermined value, or brighter than a previously measured value), then that can be an indicator that that projector is closer to the vat than other projectors (or closer to the vat than expected). In some cases, the intensity or irradiance (and other properties, e.g., size) of the sub-image from that projector can be corrected/calibrated based on the measurements using the PRPS calibration systems and methods described herein. Some systems may also be equipped with leveling mechanisms (e.g., controlled using motors) that can adjust the height and/or tilt angle of the vat and/or the image projector(s) to correct and/or calibrate the heights between the image projector(s) and the vat, and/or that can adjust the tilt angles between the focal imaging plane of the projectors and the resin top surface.

The above are just some examples of the functionality provided by having the sensor cluster/light sensors on a motion system. The light sensors of the calibration system shown in FIGS. 16B-16D can also be inverted to look down towards the top surface of the resin vat to collect information in conjunction with the alternative additive manufacturing systems that combine a vat-based format with dispensing of additional materials described herein, such as in a multi-jet vat based system where a material is dispensed via jetting on the surface of resin in the vat. In some such systems, a display subsystem may not exist and the light sensors can be used to calibrate, align, and detect issues with the material dispensing (e.g., jetting) process rather than the illumination system. Systems and methods including vat-based additive manufacturing with dispensed material are further described in U.S. Pat. No. 11,110,650.

FIG. 17A shows a plot of detected UV light intensity (or irradiance) versus position as a sensor of the calibration fixture is swept in a direction across an overlap region between two adjacent sub-images. In this situation, the positions of the adjacent sub-images (or the amount (or width) of overlap) can be determined based on the positions at which the UV intensity transitions from a "low" to a "high" intensity, and from a "high" to a "low" intensity state as indicated on the graph. This amount of overlap can then be used to set boundary conditions for edge blending correction (e.g., as described with respect to FIGS. 2B and 4C). Once the initial edge blending routine is complete, it can then be rechecked by re-running the sensor cluster across the seam (or overlap region) within the previously acquired boundaries to look for additional low-high-low states of UV Energy. This process can be repeated until such "low-high-low" states are eliminated (or minimized, or sufficiently reduced below a threshold). In some cases, "low" and "high" intensity thresholds can be used to define "low" and "high" intensity states.

FIG. 17B shows an example of UV light intensity (or irradiance) versus position that was collected using a calibration fixture on a PRPS before and after edge blending correction. The plot 1710 before edge-blending correction shows pronounced pattern of "low-high-low" intensity states, and the plot 1720 after edge-blending correction shows a greatly reduced (approximately eliminated) "low-high-low" intensity state pattern in the overlap region. For example, a threshold for the "low" intensity state in this example could be defined as less than 2.25E-6 (arbitrary intensity units) and a threshold for the "high" intensity state in this example could be defined as greater than 2.25E-6 (arbitrary intensity units). Using such threshold definitions, the plot after edge-blending correction does not have any "high" intensity states.

There are many different ways of moving the sensor system, some examples of which are shown in FIGS. 18A-18F and 19A-19B and are described below.

The present calibration fixtures can include a mechanical movement system with a gantry that moves within an X-Y cartesian system, or any motion system (X-Y, Rotational, Polar, etc.) that allows the fixture to move the light sensor(s) across the composite image, sub-images, and/or blend regions (or overlap regions) between sub-images. The sensors can also reside on air-actuated pneumatic or vacuum movement systems that allow similar movement of the sensors to acquire the necessary data and achieve the same calibration goals. As another example, the sensors can be mounted on a system that initially aims the sensors towards the imaging sources (i.e. projectors), and then inverts the sensors (e.g., pneumatically) such that they face the resin for other data capture routines and analytics associated with the resin top surface (e.g. scanning for debris, or scanning for nozzle mis-alignment in the alternative additive manufacturing systems that combine a vat-based format with dispensing of additional materials described herein, such as in multi-jet vat based systems).

FIGS. 18A-18F depict some light sensor motion examples including "X-Y Sweep Motion," "Y-X Sweep Motion," "Array Y Motion," "Y Retrace Motion," "X Retrace Motion" and "Array X Motion" that can be executed to acquire the necessary data to calibrate one or more properties (as described herein) of sub-images in a composite image projected onto a multi-image plane 1801. The composite image comprises 6 sub-images in the examples shown in FIGS. 18A-18F. The dotted lines in FIGS. 18A-18D depict a movement path of one or more light sensors 1810 in plan view (e.g., when looking down at the vat), and FIGS. 18E and 18F depict a movement path of a linear array of light sensors 1820 in a plan view. The ellipses indicate that the movement patterns are repreated over the area of the multi-image plane 1801 in FIGS. 18A-18F. The light sensor motions shown in FIGS. 18A-18F can be approximately in the same plane as the multi-image plane, or can be above or below the multi-image plane. FIGS. 18A-18D show one or more light sensors 1810 moving in two directions (e.g., "X" and "Y") to approximately cover the whole area of multi-image plane 1801. FIGS. 18E and 18F shows examples where the linear array of light sensors 1820 approximately covers one dimension of the multi-image plane 1801, and therefore only one direction of movement is needed to approximately cover the whole area of multi-image plane 1801. Such light sensor motions can be used for both vat based multi-image projection systems (e.g., "top down" or "bottom up" PRPSs described herein) and alternative additive manufacturing systems that combine a vat-based format with dispensing of additional materials, such as in a multi-jet vat based system (described in U.S. Pat. No. 11,110,650).

Many types of motion or movement system can be employed to move the sensors of the calibration fixture to detect light from the image projector(s) in the systems and methods described herein. For example, movement systems can include motors, pneumatic systems, hydraulic systems, belts, chains, cables, guide rails, gears, lead screw drives, linear stages, magnetic systems, electro-magnetic systems, gravity assist systems, pressure-based systems, vacuum-based systems, systems that use thermal expansion, or other types of linear or rotational drive mechanisms to achieve the motions of the calibration systems and methods described herein.

The PRPS calibration systems and methods described herein can be configured to move the sensor(s) in the Z-direction as well. For example, in a vat based system, enough resin can be removed to allow the sensor(s) (e.g., mounted on a recoater system) to be moved down in the negative Z-direction such that the sensor(s) are positioned at the theoretical focal plane (or focal distance, or throw distance, or build area) of the projectors. Movement in the +/−Z-direction can allow the sensors to collect data at the appropriate focused distance away from the projectors, as described herein.

Figure 19A:
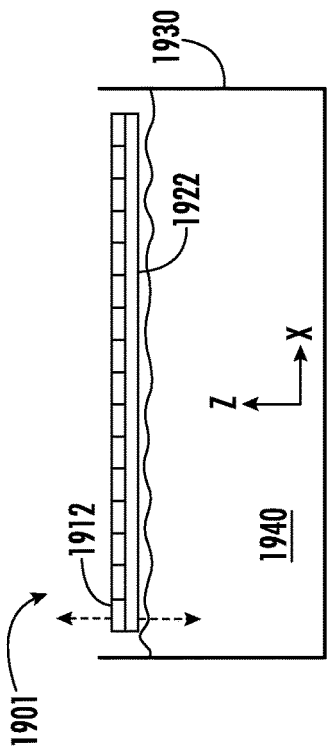
FIGS. 19A-19B show examples of calibration fixtures with movement in the Z-direction, in accordance with some embodiments.
Figure 19B:
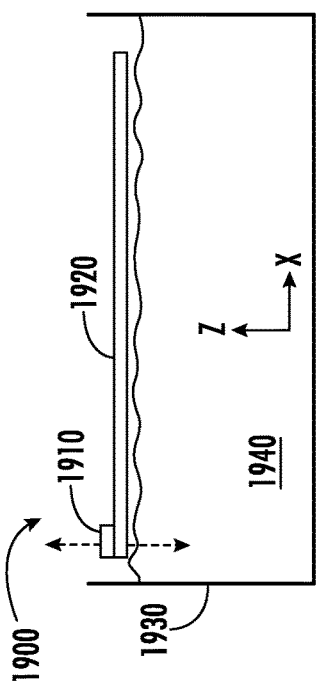

FIGS. 19A-19B show examples of calibration fixtures with movement in the Z-direction. FIG. 19A shows a system 1900 with a sensor cluster 1910 (including a light sensor) above a vat 1930 with resin 1940. The sensor cluster 1910 is coupled to a calibration mechanical assembly 1920, and the sensor cluster 1910 moves in the +/−Z-direction, and that optionally also moves in the +/−X direction. The calibration mechanical assembly 1920 can be a calibration plate, recoater assembly, or bar (e.g., that is configured to move in the +/−Y-direction (into/out of the page, not shown). FIG. 19B shows a system 1901 with a light sensor array 1912 above a vat 1930 with resin 1940, where the light sensor array 1912 is coupled to a calibration plate 1922, and the light sensor array 1912 moves in the +/−Z-direction. In this example, the light sensors of the light sensor array 1912 are distributed along the X-direction such that no +/−X-direction movement of the light sensors is needed. The sensor cluster 1910 and light sensor array 1912 in FIGS. 19A and 19B, respectively, may further be moved in the +/−Y-direction (into/out of the page, not shown) as described above.

The PRPS calibration systems and methods described herein can also detect whether one or more imaging source (image projector) is in focus. In some cases, a narrow width fixed line projected by the imaging system(s) can be swept across a light sensor (optionally featuring a small "pin-hole" aperture) at a constant velocity. In other cases, the light sensor can be swept across a stationary projected narrow line at a constant velocity. The intensity (or irradiance) of the light can be captured as a function of position (or time) and if a gradual (or wide) transition exists, then it can be inferred that the projector is out of focus. Conversely, if the intensity (or irradiance) vs. time shows a sharp peak (or sharp transitions), it can be inferred that the projector is in focus. If out of focus, the system can run an automatic routine (e.g., using the calibration fixture and display subsystem of the PRPS) to adjust focus until the sharpest peak or transition occurs.

Figure 20:
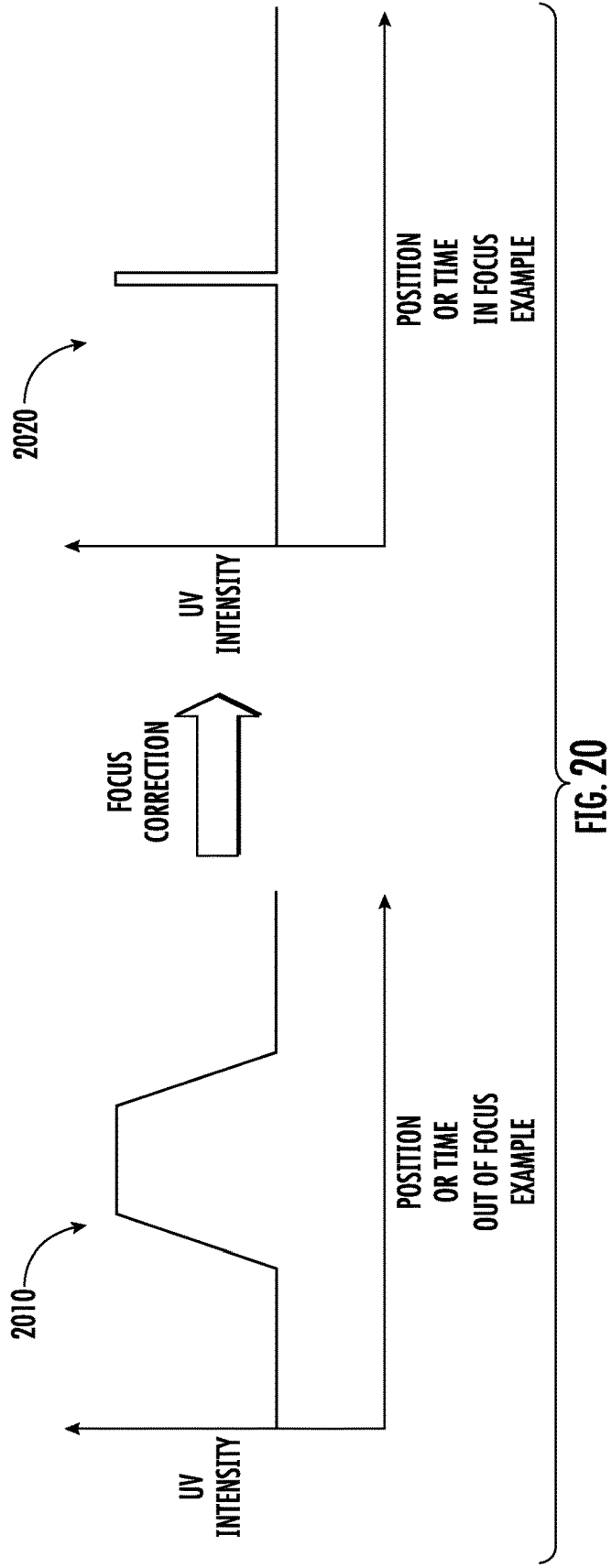
FIG. 20 shows an example of UV intensity (or irradiance) vs. position (or time) produced by a light sensor, in accordance with some embodiments.

FIG. 20 shows an example of UV intensity (or irradiance) vs. position (or time) for the calibration routies described above. The left plot 2010 shows an example of a gradual transition indicative of the image being out of focus, and the right plot 2020 shows an example of a sharp peak indicative of a focused image.

Focus correction can also be performed by moving the light sensors in the Z-direction (optionally in the X- and/or Y-directions as well) to map out the light intensity from one or more image projectors in a 3D space. Such maps of light intensity over 3D space can be interpreted by a processor (e.g., the display subsystem) and then used to correct the focus of one or more image projectors.

Focus correction (e.g., as described above) can be advantageous especially if projector lenses physically shift (or are jarred, or become misaligned) during shipping or get defocused accidentally during installation and/or commissioning. The PRPS calibration systems and methods described herein can automatically perform a calibration procedure to check for changes in focus of the image projector(s) and correct for such situations.

The PRPS calibration systems and methods described herein with focus correction can also be used in situations in which intentional blurring is desired to control surface finishes on the parts for better surface quality. In this case, the projector or projectors can be purposely defocused and calibrated in a defocused state (e.g., using geometric correction or the approach described herein for proper edge blending/stitching), to produce a desired blurred image for certain characteristics. The PRPS calibration systems and methods described herein can also pre-characterize and calibrate to both focused and defocused states and enable the PRPS to switch between both modes during printing. Switching between these two modes of focus and intentional defocus can be used to produce customized features in parts (e.g., a part that has a human grip point can be focused in that area and later defocused in another area for desired surface roughness/smoothness or finish aesthetics).

Modular Calibration Fixture

In some cases, a calibration fixture for a PRPS can be integrated into a modular calibration system that is separate from the PRPS. The modular calibration system can be coupled to the PRPS for calibrating the PRPS image projectors and then removed and used to calibrate a different PRPS. This can be advantageous in situations where a user has many PRPSs operating in the same facility because the cost of the modular calibration system can be shared across many PRPSs. Such modular calibration systems can couple with a display subsystem of a PRPS, and the display subsystem can interpret data from the modular calibration system and use the collected data to calibrate the PRPS image projectors. In some cases, the modular calibration system can have one or more dedicated processors (or controllers) to control and/or interpret data from the light sensors (and other sensors of the system). The dedicated processor(s) can interface with the display subsystem to calibrate the image projectors of a PRPS.

In some cases, a modular calibration system includes light sensors (and optionally motion systems) that form a "self-contained" calibration fixture that can be coupled to (or inserted into, or adapted to, or rolled into) a PRPS. Modular calibration fixtures can be mobile, for example, using wheels or casters. In some cases, a modular calibration fixture can be moved using a robot, for example, to deliver the modular calibration fixture to a PRPS needing calibration and/or to couple the modular calibration fixture to the PRPS. In some cases, the moving of the modular calibration fixture by a robot can be automated (e.g., using a controller, processor, or control system). The robot to move the modular calibration fixture can be integrated into the modular calibration fixture or be a separate unit that can interface with the modular calibration.

The modular calibration system can calibrate composite image content displayed by PRPSs with multiple image projectors. The modular calibration system is modular in that it can be coupled to (or installed, or inserted, or adapted to, or rolled into) a PRPS that does not have an integrated calibration system. Modular calibration systems can be advantageous because they provide a means of calibrating multi-image projector-based 3D printers without burdening all of the printers with costly motion and sensor systems. Instead, the motion and sensor calibration fixtures are modular (e.g., in a self-contained system, or on a mobile "cart") that can be moved from PRPS to PRPS as required.

In some cases, a modular calibration system can be rolled in as a cart into a PRPS with multiple image projectors (e.g., in a position where a VAT would be during a normal printing run). Once the calibration fixture cart has been rolled in and fixed (e.g., locking wheels, or lowering feet, etc.), it can then be aligned, leveled, and/or positioned relative to the rest of the PRPS such that the light sensors (e.g., light sensors capable of reading UV and/or other wavelengths) of the calibration fixture are at the appropriate position(s) with respect to the multi-image projection system of the PRPS. Once leveling and positioning is complete, calibration routines (e.g., those described herein) can be performed. In some cases, the PRPS and the modular calibration fixture can contain mechanical stops that interface with one another to align the calibration fixture relative to the PRPS when installed.

Figure 21:
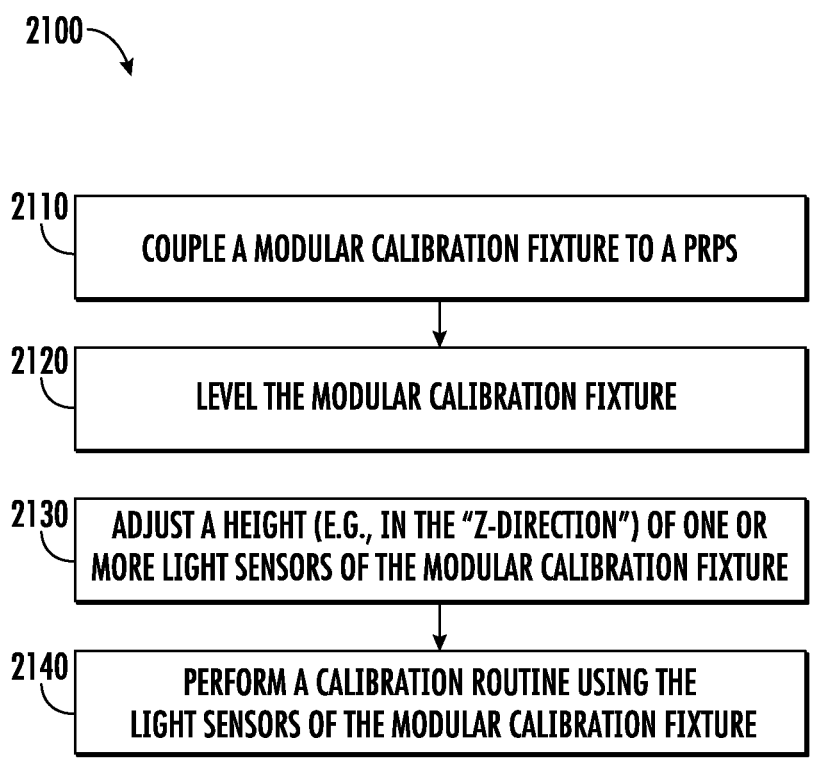
FIG. 21 shows a flowchart for an example calibration process using a modular calibtration fixture, in accordance with some embodiments.

FIG. 21 shows a flowchart for an example calibration process 2100 using a modular calibration fixture. FIGS. 22A-22H show examples of PRPSs with modular calibration fixtures. The calibration process 2100 can be performed using systems, such as those shown in FIGS. 22A-22H, or modular calibration fixtures similar to those shown in FIGS. 22A-22H that have been modified to calibrate image projectors in bottom up PRPSs.

In step 2110, a modular calibration fixture (e.g., on a cart) is coupled to (or inserted into) a PRPS. Coupling the calibration fixture to the PRPS can also include laterally aligning (e.g., in the x- and y-directions as shown in FIG. 22A) light sensors of the calibration fixture with the PRPS, as described herein. The lateral alignment of the light sensors with the PRPS can be approximate or precise, as described herein. In step 2120, the calibration fixture is leveled (e.g., with respect to the VAT and/or to gravity). In step 2130, a height (e.g., in the z-direction as shown in FIG. 22A) of one or more light sensors of the calibration fixture are adjusted. In step 2140, a calibration routine is performed using the light sensors of the calibration fixture to adjust one or more parameters of a sub-image projected by an image projector of the two or more image projectors. In some cases, the height adjustment in step 2130 can be performed before the leveling in step 2120.

The leveling and adjusting steps 2120 and 2130 of calibration process 2100 can be achieved using motors and movement sensors (e.g. examples of movement sensors are accelerometers, a high accuracy gyroscope, etc.) to achieve parallel planarity (i.e., parallelism) between the light sensor(s) of the calibration fixture and the (theoretical) resin top surface plane, which can be dependent on both gravity and the levelness of the floor. The movement sensors may be mounted on the calibration system (e.g., on a sensor cluster optionally also including light sensors, or on a carriage system) and provide information to a controller or a processor of a control system to automatically level the calibration fixture in step 2120. For example, a modular calibration system can include the calibration fixture and a dedicated processor coupled to movement sensor and motors of the calibration fixture to perform automatic leveling in step 2120. Some or all of the steps in method 2100 can be performed manually or using automated systems. For example, the leveling and adjusting steps 2120 and 2130 of calibration process 2100 can be achieved by manual processes where manually read level sensors are used along with manually adjustable components to manually level the calibration fixture in step 2120. For example, bubble levels may be built into the calibration fixture (or other components of the calibration system) to aid in manual leveling in step 2120. In step 2130, the height of the light sensors of the calibration fixture can be raised or lowered (in the Z-direction) based on feedback from distance sensors or displacement sensors to position the light sensors at the correct height (e.g., a theoretical imaging plane, or a top surface of the resin). Such distance sensors (or displacement sensors) and motors can be coupled to a controller or a processor of a control system and used to automatically achieve parallel planarity (i.e., parallelism) between the light sensors of the calibration fixture and a multi-image plane (or with the image projectors of the PRPS, or with a top plate of the PRPS upon which the image projectors are mounted).

In some cases, the modular calibration fixtures described herein include a controller (e.g., a processor, a computer, ARM device controller, etc.) to receive signals from sensors, interpret signals from sensors, and/or communicate with a PRPS. The controller can also command motions to the various motor subsystems of the modular calibration fixture, for example, to level, adjust the height, and/or control the movement of light sensors of the modular calibration fixture. The controller can also communicate with the host PRPS to adjust the display subsystem image content (e.g., calibrate the image projectors and/or correct the projected sub-images). The controller can also support a graphics user interface (e.g., touchscreen, tactile buttons, LED lamps, etc.) to enable communication and interactions with a user (e.g., display or change setup configuration, display report status, display data or any other source of information helpful to the user, etc.). The modular calibration fixtures described herein can also include a user interface (not shown) such as a display with touchscreen, LED lamps, buttons, switches, etc.

FIG. 22A shows an example of a modular calibration fixture 2201 coupled to a PRPS 2200. PRPS 2200 includes a top plate 2210, to which one or more image projectors (six in this example) are mounted. The PRPS 2200 in this example is a "top down" PRPS and is similar to PRPS 1600 shown in FIG. 16A. In the example shown in FIG. 22A, modular calibration system 2201 includes a calibration plate 2220, with a carriage assembly 2230. One or more light sensors 2240 are coupled to the carriage assembly 2230, and the calibration plate 2220 is coupled to leveling motors 2250 (or height adjustment motors). The carriage assembly 2230 enables the light sensors 2240 to move in the X- and Y-directions, and the leveling motors 2250 enable movement in the Z-direction, such that the light sensors 2240 can achieve parallel planarity with a component of the PRPS (e.g., the top plate 2210, or the surface of resin (not shown) within a VAT of the PRPS 2200). Carriage assembly 2230, is therefore coupled to calibration plate 2220 (e.g., using linear stage motor(s), linear motor(s), or other mechanical assemblies) in such a way that the carriage assembly can move, in order to move light sensors 2240 (e.g., in the X-Y plane). Leveling motors 2250 can be used to level the calibration plate 2220 with respect to the floor, and/or with respect to the top plate 2210. Distance sensors 2260 are also coupled to the calibration plate 2220 (through the carriage assembly 2230) in this example, to detect distances from the calibration plate to the top plate 2210, and enable the light sensors to be moved to the correct height for calibration. In some cases, a global level distance sensor (not shown) that is part of the PRPS can be used to set the height (in the Z-direction) of the calibration plate 2220 (e.g., after it has been leveled), instead of (or in addition to) the distance sensors 2260.

Figure 22B:
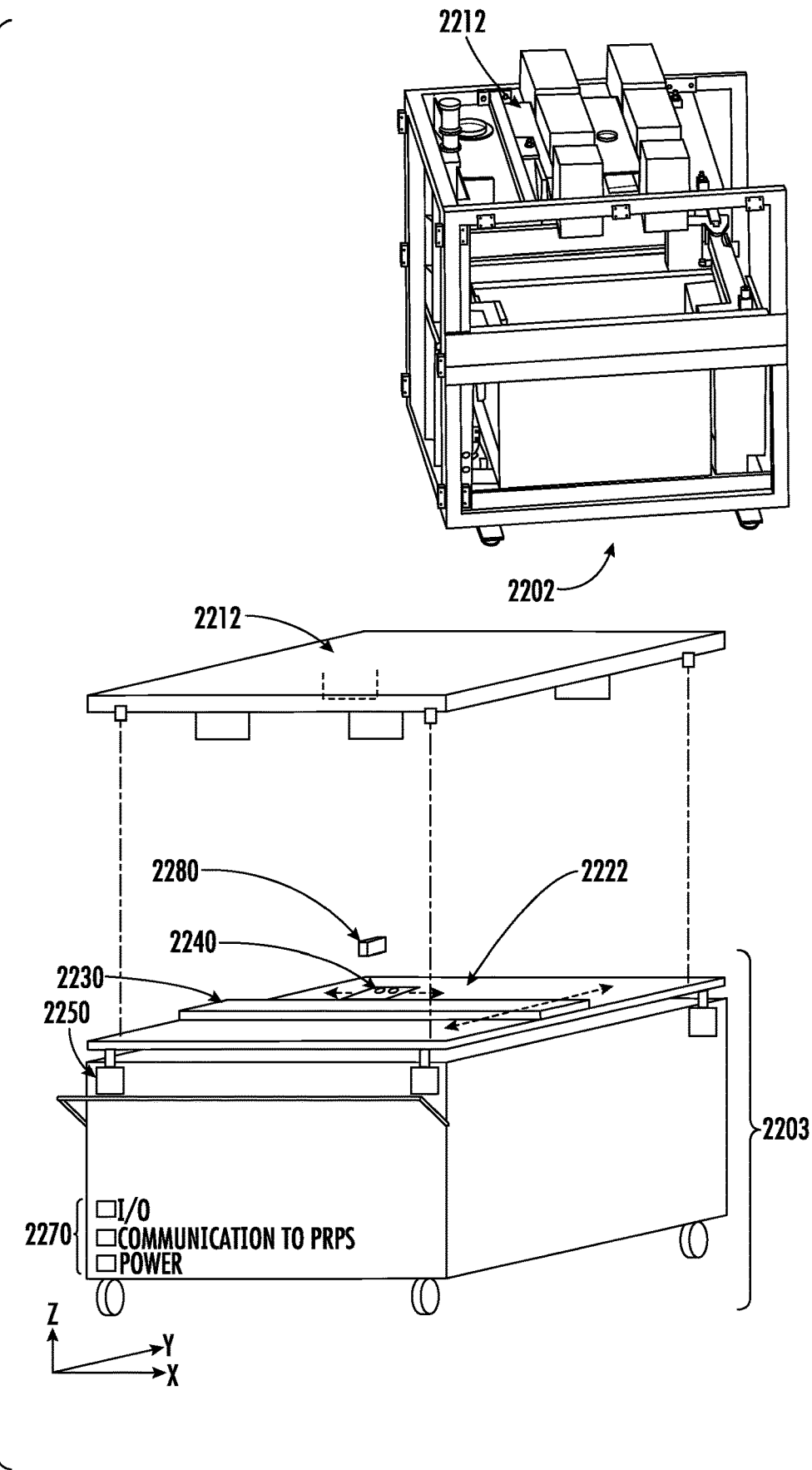
Figure 22C:
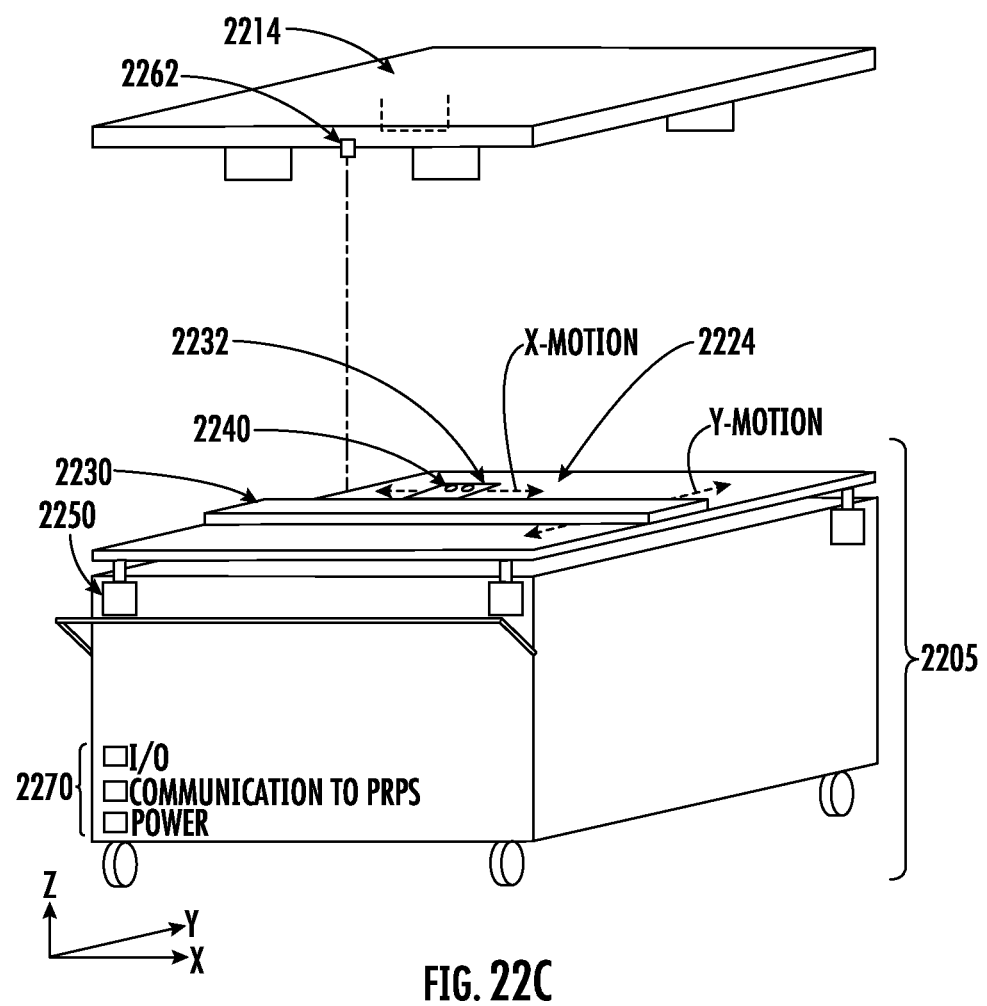

The modular calibration fixture 2201 also has a light sensor carriage (e.g., 2232 as shown in FIG. 22C). The light sensors 2240 are coupled to the light sensor carriage, which is in turn coupled to the carriage assembly 2230. As shown in FIG. 22C, light sensor carriage 2232 enables the light sensors 2240 to move in the "X-motion" direction. Similar light sensor carriages are also present on the modular calibration fixtures shown in FIGS. 22B and 22D-22H. Furthermore, the carriage assembly 2230 in FIGS. 22A-22H enables the light sensors 2240 (and the light sensor carriage 2232) to move in the "Y-Motion" direction. For example, Y motors (e.g., similar to linear motor Y1 2254a and linear motor Y2 2254b in FIG. 22H, not shown in FIG. 22A) can be used to move carriage assembly 2230 in the Y direction. Additionally, a linear motor configured to move the light sensors 2240 in the X direction can be located within carriage assembly 2230, which is not visible in FIG. 22A. There are a number of ways to enable the carriage assembly to move in the Y direction, such as by using screw drive motor stages, belt driven motor stages, linear motors, pneumatics, magnetic means, or other mechanical systems, not shown in FIG. 22A.

The modular calibration fixture can also include electrical connections 2270, such as input/output "I/O" (e.g., to control the motors and other components of the modular calibration fixture 2201, and to receive data from sensors of the modular calibration fixture 2201), "Communication to PRPS" (e.g., to send information from the modular calibration fixture 2201 to the PRPS to adjust settings of the image projectors), and electrical power "power" connections. In some cases, one or more components of the modular calibration fixture may move using pneumatics, and pneumatic connections (not shown) are also included.

In the case shown in FIG. 22A, the motors and distance sensor hardware all reside in the modular calibration fixture, which includes a cart 2290 (with wheels, or casters) in this example. In other cases, the calibration system can be integrated with the PRPS, as described herein. In other cases, a portion of the hardware can be contained in the modular calibration system (e.g., including a cart 2290), and remaining portions can reside in the PRPS.

Figure 22D:
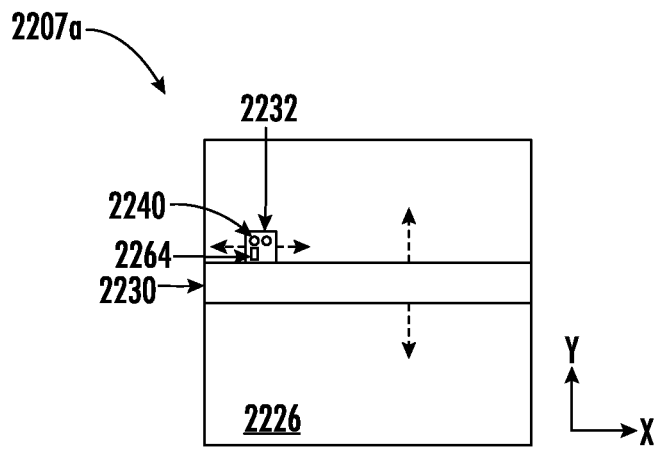
Figure 22E:
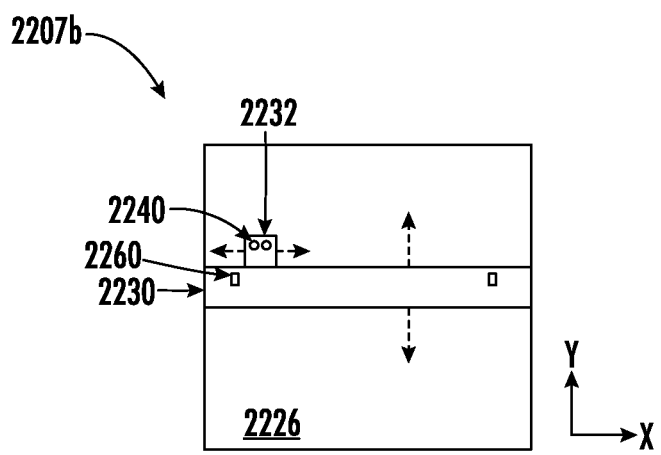
Figure 22F:
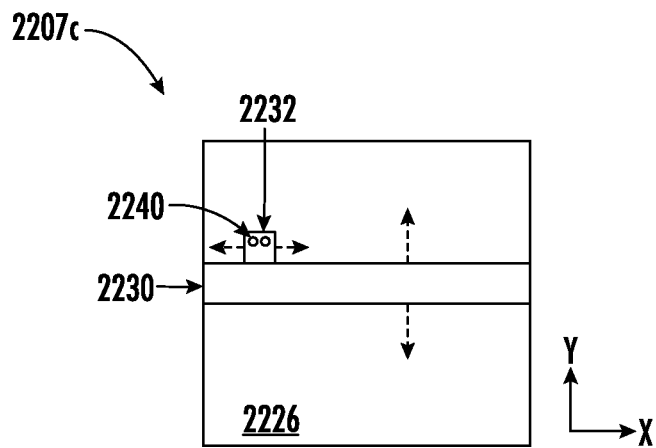
Figure 22G:
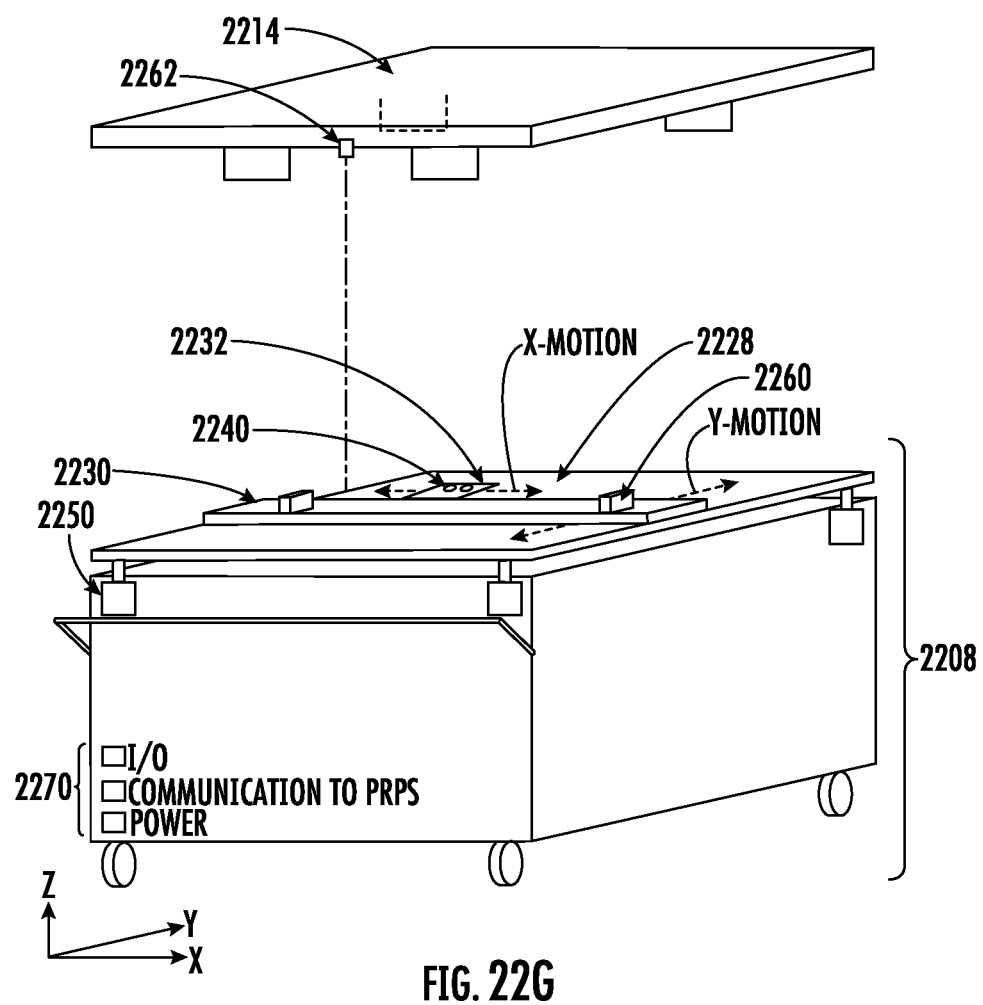
Figure 22H:
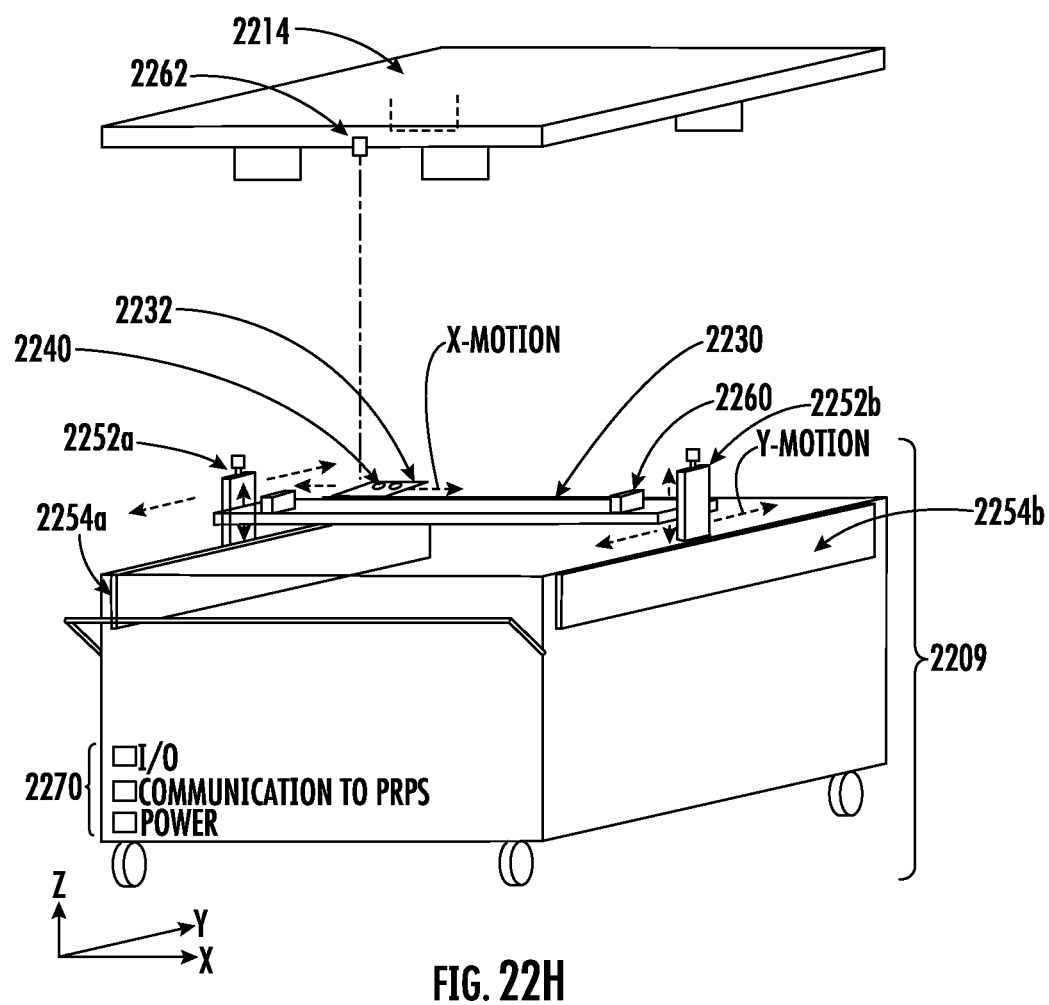

In some embodiments of the modular calibration fixtures and PRPSs shown in FIGS. 22A-22H, planarity between the calibration plate of the modular calibration fixture and the top plate of the PRPS can be achieved using a control system capable of driving height (Z-direction) adjustment motors (e.g., three motors) positioned at points (e.g., three points) in the calibration fixture to level the fixture based on displacement and/or distance sensor readings. The displacement and/or distance sensors can be coupled to the calibration fixture, for example, as shown in FIGS. 22A and 22D-22E. In other cases, the displacement and/or distance sensors can be coupled to the top plate of the PRPS near the image projectors, for example, as shown in FIGS. 22B and 22C (distance sensors 2262). The displacement and/or distance sensors can be coupled to any location on the PRPS and/or calibration fixture that enables a distance between the PRPS and the calibration fixture to be measured. In some cases, the displacement and/or distance sensors can be coupled to the calibration plate, and to the top plate of the PRPS near the image projectors, for example, as shown in FIGS. 22G and 22H. Some examples of the displacement and/or distance sensors are laser displacement sensors, ultrasonic sensors, depth sensors, time of flight sensors, or combinations thereof. In some cases, feedback from the distance sensors can be fed into the calibration fixture control system to drive the height (Z-direction) adjustment motors until the desired levelness and/or planarity of the calibration fixture is achieved. The communication between the control system of the PRPS and the calibration fixture can be implemented via ethernet network or other communication means (e.g. USB, Serial, optical, or other differential or single-ended signaling methods/protocols, etc.) to enable the feedback between sensors and components that are controlled and/or calibrated using information from the sensors.

In some embodiments, the calibration fixture can achieve levelness using one or more vessels containing a liquid that is detectable by distance sensors. In such cases, the liquid interface can be used as a reference for leveling purposes. For example, a calibration fixture can contain a shallow vessel with a floating calibration plate, or the vessel can provide one or more liquid surfaces as reference point(s) for distance sensor(s). In such cases, a 3-point motor system may not be needed as the liquid would naturally maintain its level with respect to gravity. In some cases, the liquid can be in certain pockets of the calibration fixture that are positioned in areas where distance measurements would be taken from distance sensors positioned above the calibration fixture. The pockets are linked by a tube (or tubes) so that the liquid can flow between the pockets and levelness across the calibration system can be maintained. In some such cases, a 3-point motor system can be used to mechanically align the calibration fixture with the level position measured by the liquid in the pockets. In some cases, the 3-point motor system can level the light sensors using information from liquid heights within different pockets (e.g., obtained using distance sensors, or liquid level sensors within the pockets).

FIG. 22B shows an example of a modular calibration fixture 2203 coupled to a PRPS 2202, similar to the example shown in FIG. 22A. In this example, the distance sensors 2262 are coupled to the top plate 2212 of PRPS 2202 rather than to the modular calibration fixture. The distance sensors 2262 in this example measure the distance from top plate 2212 to calibration plate 2222, and provide that information to leveling motors 2250 of modular calibration fixture 2203 to achieve parallel planarity between the light sensors 2240 and a component of the PRPS (e.g., the top plate 2212, or the surface of resin (not shown) within a VAT of the PRPS 2202).

As described above, light sensors on the calibration fixtures can be positioned at a multi-image plane (or a theoretical top surface of resin within the VAT, which would be a "focal distance" (or "throw distance") away from the multi-image projectors sitting above the fixture). In some cases, the calibration fixture can use a "global level" sensor 2280 (or other displacement and/or distance sensor) that is already included in the PRPS to achieve such position, for example as shown in FIG. 22B. For example, the calibration fixture can have its own plate or tab or some other mechanical object that can be sensed by the global level sensor 2280 of the PRPS to provide feedback on the distance between light sensors 2240 and top plate 2212, or on the levelness of light sensors 2240 (relative to the multi-image plane, or to the top surface of the resin). A motion control system can either raise or lower the calibration fixture using leveling motors 2250 based on the distance reading of such global sensor (e.g., using one or more processors of the calibration fixture and/or PRPS, as described herein).

In some cases, multiple distance sensors 2262 can be mounted on top plate 2212 in order to measure the distance between the top plate 2214 and the calibration plate 2222 at multiple locations (i.e., the locations of the sensors), as shown in FIG. 22B.

FIG. 22C shows an example of a modular calibration fixture 2205 coupled to a top plate 2214 of a PRPS, similar to the example shown in FIG. 22B. In this example, however, there is only one distance sensor 2262.

There are many ways to place distance sensors throughout the calibration fixture and/or the PRPS (e.g., the top plate) to achieve the same goal, namely the goal of moving the UV light sensors to appropriate locations to calibrate a PRPS (e.g., a PRPS with multiple image projectors).

FIGS. 22D-22F show plan views of examples of portions of modular calibration fixtures 2207a-c. Light sensors 2240 are coupled to light sensor carriage 2232, which is coupled to calibration plate 2226 through carriage assembly 2230.

Mobile calibration fixture 2207a in FIG. 22D includes a single distance sensor 2264 coupled to the light sensor carriage 2232. Such a system with a single distance senor 2264 advantageously has a low cost (since only one sensor is used) and the single sensor can be moved across approximately the entire X-Y area of the multi-image plane (or calibration plane). However, single distance sensor systems can be slower than systems with multiple distance sensors, since it would take some time to collect enough data readings from a single sensor to level the calibration fixture (e.g., by moving the single distance sensor to multiple points (e.g., 3 points), and/or by building a matrix of distance readings across an X-Y area).

Mobile calibration fixture 2207b in FIG. 22E includes more than one distance sensor 2260 coupled to the carriage assembly 2230. There are two distance sensors 2260 in this example, but there can be three (e.g., as in FIG. 22B), or more than three distance sensors in other cases. In such an arrangement, there can be a more than two distance sensors 2260 arranged in a linear array and coupled to the carriage assembly 2230. Such a system with multiple distance senors 2260 can be faster than systems with a single distance sensor, since it is possible to quickly ascertain the amount of parallelism between calibration plate 2226 and the top plate with a single Y sweep of the carriage assembly. However, such a system would need two or more distance sensors 2260, and therefore can be more costly than single sensor systems.

Mobile calibration fixture 2207c in FIG. 22F includes light sensors 2240 but no distance sensors, however, there can be distance sensors on the PRPS that it couples to.

FIG. 22G shows an example of a modular calibration fixture 2208 coupled to a top plate 2214 of a PRPS, similar to the example shown in FIG. 22B. In this example, however, there is a distance sensor 2262 coupled to the top plate 2214, and also distance sensors 2260 coupled to the carriage assembly 2230 of the calibration fixture 2208.

FIG. 22H shows an example of a modular calibration fixture 2209 coupled to a top plate 2214 of a PRPS, similar to the example shown in FIG. 22G. In this example, however, there are linear motors providing movement in the Y-direction and there is no calibration plate. In this example, Z1 motor stage 2252a and Z2 motor stage 2252b are coupled to linear motor Y1 2254a and linear motor Y2 2254b. Z1 motor stage 2252a and Z2 motor stage 2252b are also coupled to carriage assembly 2230. In this example, light sensor carriage 2232 is coupled to carriage assembly 2230, which is itself a linear motor and enables light sensor carriage 2232 to move in the X-direction. Using these motors, the light sensors 2240 can be leveled and height adjusted with respect to the PRPS, as described for other examples herein.

Once a mobile calibration fixture is coupled to a PRPS, and the calibration fixture is leveled and height adjusted, such as in steps 2110, 2120, and 2130 of method 2100 in FIG. 21, then a calibration routine can be performed, such as in step 2140 of method 2100. The same calibration techniques as described herein with respect to other calibration fixtures (e.g., those integrated into a PRPS) can be employed to calibrate the composite image produced by a plurality of projectors of a PRPS coupled to a modular calibration fixture. In short, the light sensors are used to measure projected irradiance energy to detect areas of interest (e.g., regions of overlap, non-overlap, corners, etc.) which gets fed-back into the display subsystem of the PRPS for image content correction. In some cases, the modular calibration fixture is electrically coupled to the PRPS and optionally has a dedicated controller, processor and/or control system. The electrical couplings for such feedback communication can be established over ethernet or other signaling means (e.g. USB, serial, optical, or other differential or single-ended signaling methods/protocols, etc.) between the PRPS and the modular calibration fixture control system. The same techniques regarding sensor arrangements, sensor motions, and other aspects of calibration discussed with respect to other systems (e.g., calibration fixtures integrated with a PRPS) can apply to modular calibration fixtures as well, where the calibration fixture is now modular in the sense that it can be coupled with and removed from the PRPS as required. That is, every PRPS system does not need to bear the cost burden or complexity burden of having an integrated calibration system built in to the PRPS.

In some embodiments, a calibration fixture for a PRPS can have one or more light sensors that are static (i.e., do not move), and light can be projected from one or more image projectors of a PRPS onto the static light sensor(s) to calibrate the PRPS. In some cases, the image projector(s) can project a series of moving binary/grey code patterns to establish a mathematical relationship between image content position vs. light sensor position. In a binary/grey code search example, one or more stationary light sensors can reside in a known fixed position and be used to detect iterations of white screen image content that is halved on successive iterations until a narrow swath (e.g., half of a half of half, etc.) of content aligns with the sensor position. Such a search procedure (or code, or algorithm) can be repeated for both column (Y) and row (X) instances of the projected white screen content to hone in on an exact X-Y pixel coordinate of where the sensor sits.

Figure 23:
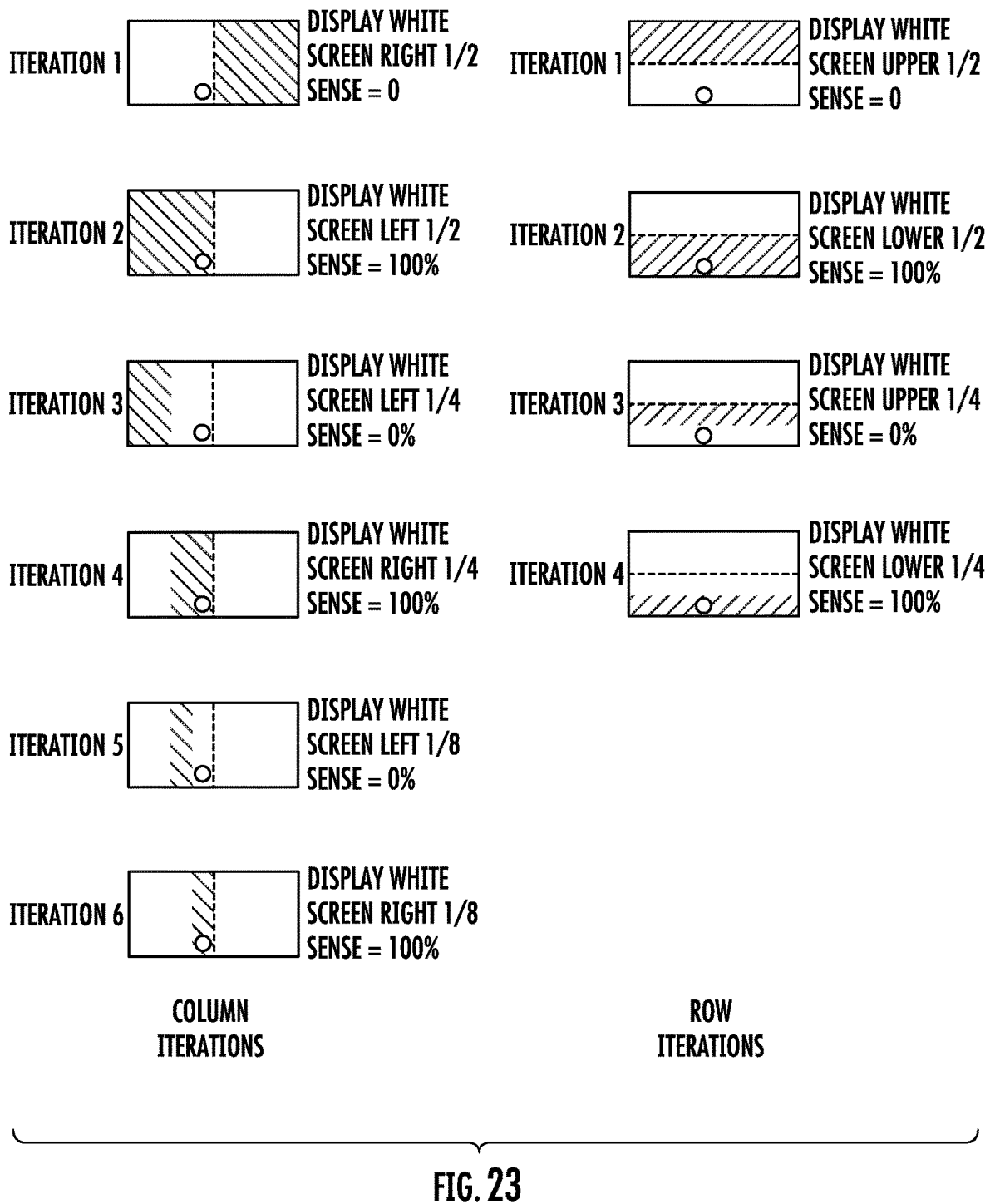
FIG. 23 shows a simplified example of successive column iterations and row iterations of a binary/grey code search method, in accordance with some embodiments.

FIG. 23 shows a simplified example of successive column iterations and row iterations of a binary/grey code search method. When the light is shining on the light sensor, then it detects (or senses) a high value of irradiance (e.g., 100% in this example), and when the light is not shining on the light sensor, then it detects (or senses) a low value of irradiance (e.g., 0% in this example). In this example it takes six iterations of halving the white image content to arrive at a vertical column pixel location that aligns with the sensor location. And, it takes four iterations to arrive at a horizontal row pixel location that aligns with the sensor location. With this information, one can establish a mathematical relationship between the displayed image content position and the sensor position which can later be used for image correction.

In some cases, a process can transition from a binary/grey code search method to a "line scan method," once a region of interest has been identified by the binary/grey code search method, to determine the exact location of the vertical pixel column that aligns with the sensor location. In a "line scan method," the display subsystem projects a narrow line and sweeps it across the sensor region of interest. The result is a Gaussian response curve of intensity versus position, where the peak indicates alignment between a column of pixel(s) (i.e., the illuminated line) and the sensor position. The process can be performed along the vertical and horizontal directions to determine the alignment between vertical and horizontal lines of pixels and the sensor position. Again, this information allows one to establish a relationship between the displayed image content position and sensor position which can later be used for image correction.

Many types of motion or movement systems can be employed to move the sensors of the modular calibration fixture to detect light from the image projector(s) in the systems and methods described herein. For example, movement systems (e.g., for the Z motors, carriage assembly and/or light sensor carriage) can include motors, pneumatic systems, hydraulic systems, belts, chains, cables, guide rails, gears, lead screw drives, linear stages, magnetic systems, electro-magnetic systems, gravity assist systems, pressure-based systems, vacuum-based systems, systems that use thermal expansion, or other types of linear or rotational drive mechanisms to achieve the motions of the calibration systems and methods described herein. For example, instead of electric motors, pneumatic components (e.g. cylinders, manifolds, etc.) or magnetic systems can be used to move components of a modular calibration fixture, such as adjusting the height and/or level of the calibration plate.

There are also a number of options of where to place distance sensors and how many to use. The above examples only show some of the options for distance sensor positions. For example, distance sensors can be placed on the carriage assembly, a single sensor can be placed next to the UV light sensors, an array of distance sensors can be lined up across the entire carriage assembly, or other distance sensor configurations may be used that detect the distance between a component (e.g., a top plate, an image projector, or a bounce mirror) of the PRPS and the calibration fixture.

The modular calibration system can be installed in a number of ways. For example, the modular calibration fixture can be powered separately from the PRPS. In this case, the modular calibration fixture has a dedicated power supply, and does not consume power from the host PRPS. There is a communication path between the modular calibration fixture and the PRPS (e.g., to perform a calibration routine) which can be any type of electrical communication interface (e.g., Ethernet, Ethernet/IP Trademark, USB, Serial, etc.). In some cases, the modular calibration fixture can have wheels (e.g., the modular calibration fixture can be a cart with wheels or caster wheels) and it can be rolled into the host PRPS. Once positioned, then the wheels can be locked. In some cases, the modular calibration fixture may include feet and not wheels, in which case proper handling and transport equipment may need to be employed. In yet further cases, wheels of a modular calibration fixture can come equipped with feet that can be lowered once the cart has been appropriately positioned.

In some cases, the accuracy of the initial placement (e.g., in step 2110 of method 2100 in FIG. 21) of the modular calibration fixture with respect to the PRPS is not critical. For example, the sensing and control mechanisms of the modular calibration fixtures described herein can enable the modular calibration fixture to move sensors to locations that are required (e.g., to the corner of an image) to calibrate the PRPS, even when the initial placement of the modular calibration fixture with respect to the PRPS is not accurately known. The sensing and control mechanisms are therefore used to position the light sensors in the correct locations for calibration, rather than using mechanical systems to enable accurate positioning (lateral alignment, leveling, and height adjustment) of the modular calibration fixture with the PRPS.

In some cases, instead of a cart, the modular calibration fixtures described herein can be a fixture that couples (e.g., hangs or latches to) an existing component of the PRPS. The appropriate connections (e.g., electrical power, communication, and/or pneumatics) are then made after the fixture has been appropriately coupled (e.g., mounted, latched, or adapted).

In some examples shown, three leveling motors 2250 are used to level a modular calibration fixture (e.g., using a 3-point servo system). More or fewer than three leveling motors can be used to level a modular calibration system, in different examples. For instance, four leveling motors 2250 can be used to level a modular calibration fixture. In some cases, two leveling motors 2250 can be used, wherein one corner or section of a calibration plate is static, and the two motors adjust the levelness of the calibration plate. In some cases, one leveling motor 2250 can be used, wherein two corners or sections of a calibration plate are static, and the one motor adjusts the levelness of the calibration plate. These alternate systems and methods can achieve the same goal as the 3-point servo system method to adjust planarity of the modular calibration fixture (albeit with less degrees of freedom, when only one or two leveling motors are used).

Figure 24A:
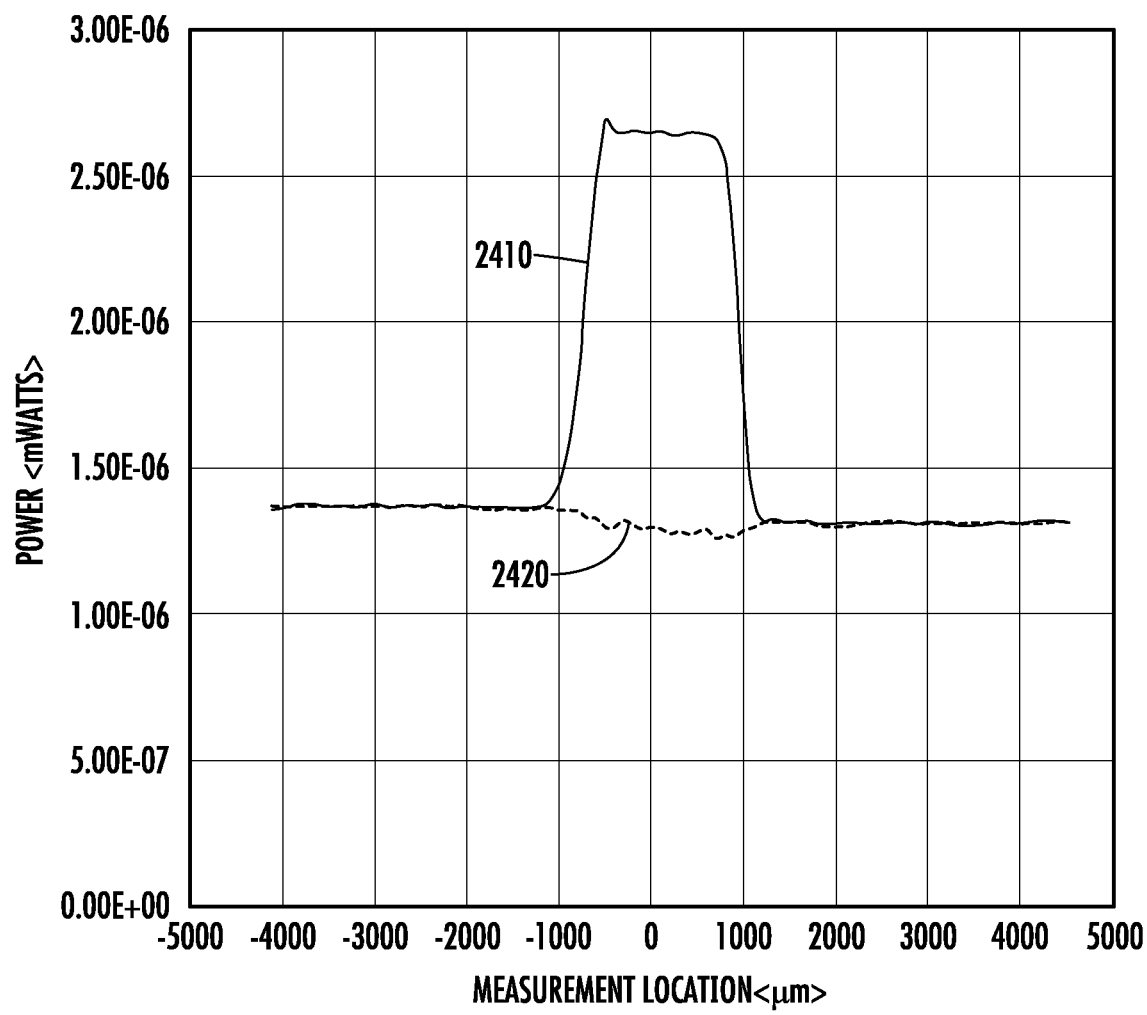
FIGS. 24A-24B show examples of light sensor data that can be used to calibrate a PRPS, in accordance with some embodiments.
Figure 24B:
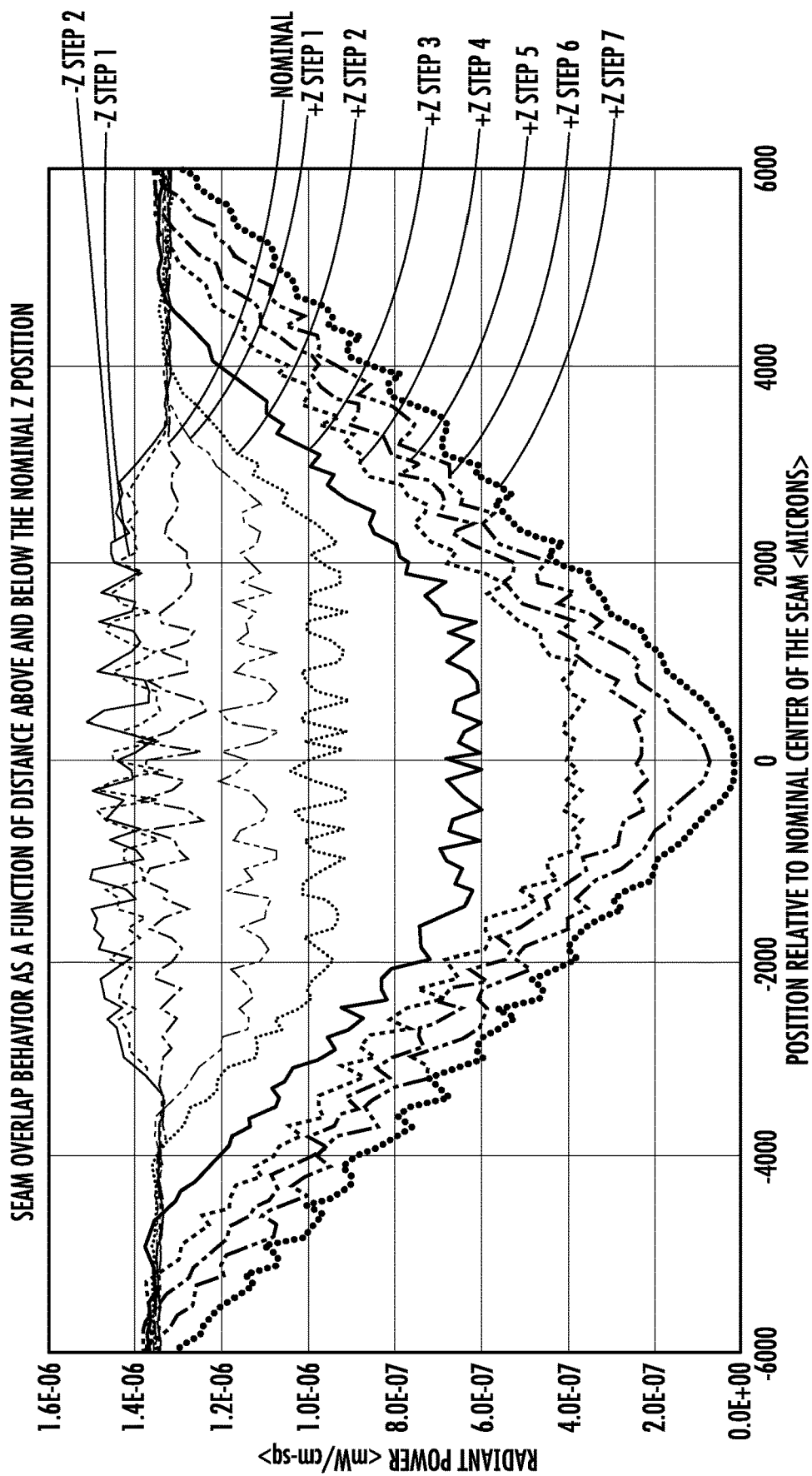

FIGS. 24A-24B show examples of light sensor data (or information, or readings) that can be used to calibrate a PRPS. The power readings (e.g., measurements 2410 and 2420) in FIGS. 24A-24B were obtained by moving a light sensor in a linear path across an overlap of adjacent sub-images in a composite image (i.e., across a seam in the composite image, or an edge-blending correction) and recording the light intensity received by the light sensor at different positions along the movement path.

FIG. 24A shows a plot of power (in milliwatts) versus position ("Measurement Location," in microns) measurements 2410 before an edge-blending correction, and power versus position measurements 2420 after the edge-blending correction. The measurement location on the x-axis in the plot in FIG. 24A has been normalized to the nominal center of the seam. A comparison of measurements 2410 and measurements 2420 shows that an effective edge-blending correction has been made, since the high intensity across the seam has been made more uniform (or the high intensity region at the seam has been approximately eliminated).

FIG. 24B shows a plot of various power density (in mW/cm$^2$) versus position ("Position relative to the Nominal Center of the Seam," in microns) measurements taken after an edge-blending correction was performed. In this example, data encompassing an overlap between two sub-images was recorded using a light sensor positioned at the multi-image plane, and then the edge-blending correction was performed. After the edge-blending correction, holding all other independent variables constant, the Z position (or height) of the light sensor was incremented in both the positive and negative Z directions and the energy collection trace was repeated for each unique Z position. The position on the x-axis in the plot in FIG. 24B has been normalized to the nominal center of the seam. The various power density versus position data in FIG. 24B were taken at different heights (i.e., in the Z-direction as described above) relative to a nominal multi-image plane (e.g., theoretical or assumed multi-image plane height(s)) ranging from below the nominal multi-image plane (e.g., "−Z step 1," "−Z step 2") to above the nominal multi-image plane (e.g., "+Z step 1," "+Z step 2," etc.).

The data in FIG. 24B shows that the height (or Z-position) of the sensor affects the performance of the calibration system, in this case, the performance of an edge-blending correction. The application of the edge-blending correction homogenizes the energy level when spatially transitioning from one sub-image through an overlap region into the adjacent sub-image. This correction is most effective at the Z position where the calibration data was collected; it becomes less effective with increasing, positive or negative, Z displacement from the data collection plane. For display subsystems projecting energy in the negative Z direction, when the light sensor is positioned at a height below a nominal multi-image plane height, the apparent overlap, at that Z position, increases allowing for an apparent positive discontinuity (or change in intensity) in the energy across the boundary (or energy in an overlap region that is high compared to regions adjacent to the overlap region). When the light sensor is positioned at a height above a nominal multi-image plane height, the apparent overlap, at that Z position, tends to decrease allowing for an apparent negative discontinuity (or change in intensity) in the energy across the boundary (or energy in an overlap region that is low compared to regions adjacent to the overlap region). Thus, closely matching the calibration Z position to the actual multi-image plane height can allow for the maximum effectiveness of the edge-blending correction. Alternatively, a Z position mapping, such as the one shown in FIG. 24B, can be used to determine edge-blending correction as a function of Z distance from the nominal multi-image plane. Such a Z position mapping can allow the calibration Z position to vary, and/or for the calibration system to experimentally determine an optimal Z position for edge-blending correction. It can also allow more freedom in the calibration apparatus design, since the Z position does not need to be determined (or known) before the edge-blending correction is done (using Z position mapping).

Calibration systems that are the same as or similar to those described herein can be used to calibrate any type of multi-projection system with two or more image projectors projecting sub-images to form a composite image, for example, in stereolithography systems with multiple image projectors (e.g., for processing semiconductor devices), or for large scale projection systems using multiple image projectors (e.g., at cinema theaters, planetariums, amusement park attractions, etc.).

Calibration Fixture Systems and Methods

Figure 25A:
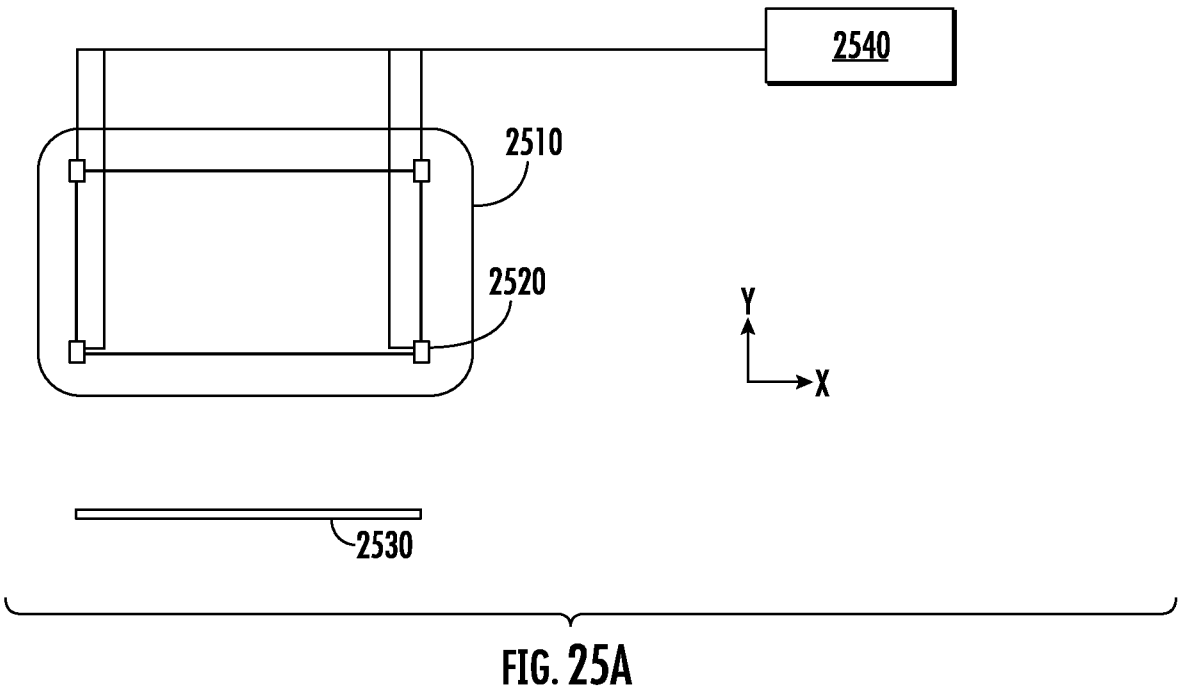
FIGS. 25A and 25B show examples of calibration fixtures for projected images in a PRPS, in accordance with some embodiments.
Figure 25B:
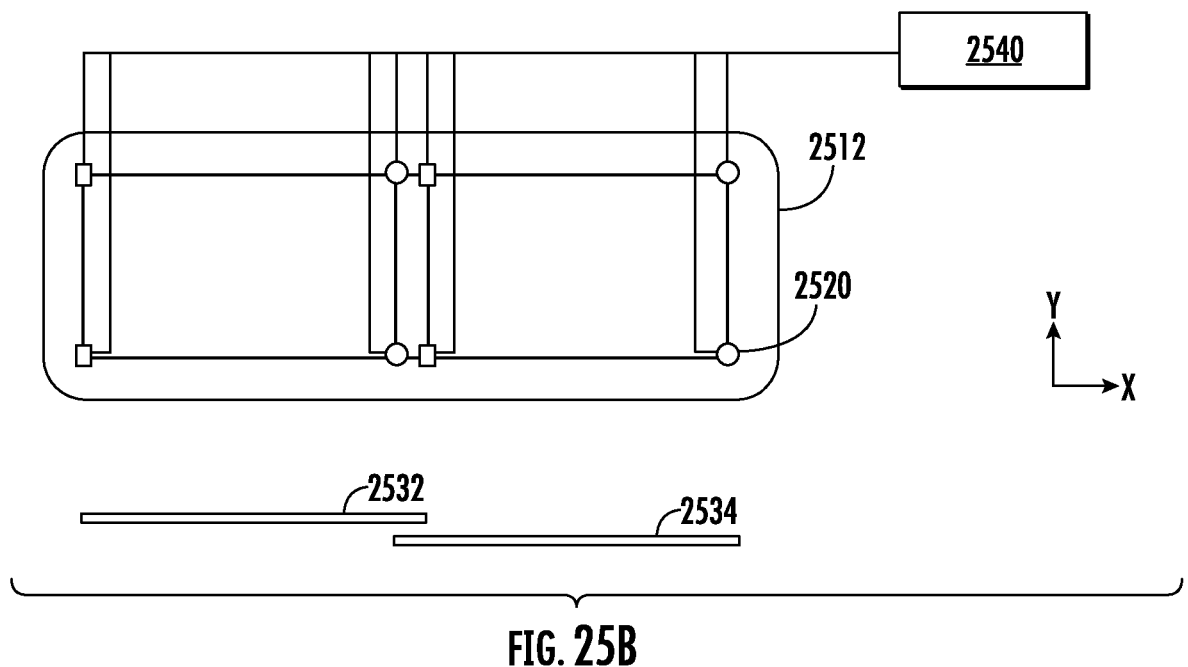

FIGS. 25A and 25B show examples of calibration fixtures for projected images in a PRPS. The calibration fixtures in FIGS. 25A-25B can be integrated into a PRPS, or can be modular calibration fixtures that are used with a PRPS (e.g., in method 2100 in FIG. 21).

FIG. 25A shows a calibration fixture 2510 for calibrating a single image that is projected from image projector 2530, which is represented as a line showing the approximate position of the image from the image projector 2530 in the "X-direction" (but not related to the position of the projected image in the "Y-direction"). Four light sensors 2520 are mounted onto the calibration fixture 2510. For example, the four light sensors can align approximately with, or be close to, corners of a projected image.

FIG. 25B shows a calibration fixture 2512 for calibrating two sub-images from two image projectors 2532 and 2534, which are represented as lines showing the approximate positions of the sub-images from image projectors 2532 and 2534 in the "X-direction" (but not related to the position of the projected sub-images in the "Y-direction"). Eight light sensors 2520 are mounted onto the calibration fixture 2512.

For example, four of the light sensors can align approximately with, or be close to, corners of one of the projected sub-images, while the other four light sensors can align approximately with, or be close to, corners of the other projected sub-image. In cases with more than two image projectors, the calibration fixture can include 4 sensors per sub-image to calibrate, in an arrangement such as that shown in FIG. 24B (e.g., in a linear array or matrix array of sets of four light sensors mounted to a calibration plate).

FIG. 25B shows an example of a composite image with an array of two overlapping sub-images. Arrays of sub-images in a composite image can be aligned using a calibration fixture with two sets of four light sensors (i.e., one set of four light sensors per sub-image) using the method described above for each image projector (i.e., adjusting one image projector at a time). In addition to calibrating the adjustment of the position and warp (or skew) of each sub-image, the calibration fixtures and methods described above can also be used to provide information for calibrating the edge blending between overlapping sub-images. The example shown in FIG. 25B is a 1×2 array of sub-images, and the same concepts can apply to arrays with larger dimensions (e.g., 2×2, 4×4, 4×8, 5×5, 5×10, 8×8, or larger than 8×8).

In some embodiments, the calibration fixture 2510 or 2512 is integrated into a "top down" or a "bottom up" PRPS, as described herein. In some embodiments, the calibration fixture 2510 or 2512 is part of a modular calibration system that can be inserted into the PRPS (e.g., inserted to capture the illumination from image projectors, between or during print runs) and when inserted, the light sensors form known positions (e.g., corner positions) of an ideal image location within the PRPS. In some cases the light sensors are aligned with known positions within the PRPS, and in other cases, the light sensors are approximately aligned with known positions but are not placed at precisely determined positions. For example, light sensors of a calibration fixture can be part of a modular system that is inserted into a PRPS with a lateral (parallel with the build plane) position accuracy that is less than 5 cm, or less than 1 cm, or less than 0.1 cm. For example, the light sensor can be optically aligned between the projector and the position of a corner pixel of an ideal image in the plane of the build area (or the multi-image plane). In some embodiments, the light sensors used in the calibration fixtures 2510 and 2512 have narrow fields of view, to improve the alignment accuracy provided by the calibration fixture 2510 and 2512.

Figure 26A:
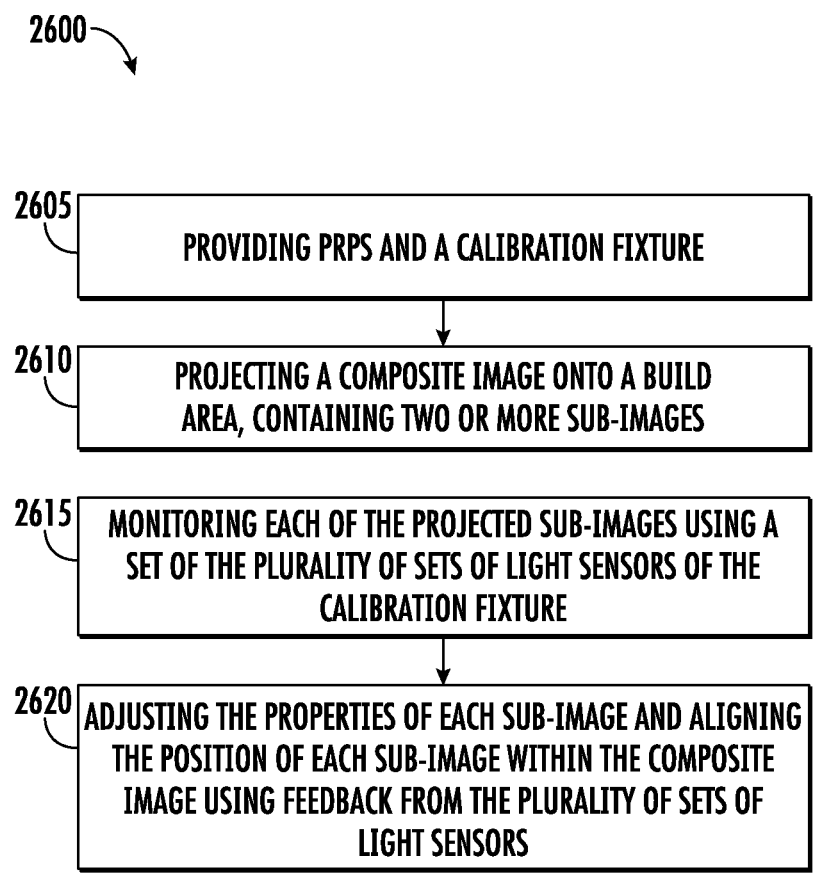
FIG. 26A is a flowchart of a method for adjusting a projected image using a calibration fixture, in accordance with some embodiments.

FIG. 26A is a flowchart of a method 2600 for adjusting a projected image using a calibration fixture, in accordance with some embodiments. In step 2605, a PRPS (or an additive manufacturing system) and a calibration fixture are provided. In some cases, the PRPS contains the calibration fixture (or the calibration fixture is integrated with the PRPS). In other cases, the calibration fixture is modular and can be coupled to a PRPS for calibration and can also be decoupled from the PRPS. In some embodiments, the PRPS contains: an image projection system comprising a plurality of image projectors; an image display subsystem; and a calibration fixture comprising a plurality of (e.g., N) sets of light sensors (e.g., N sets of four light sensors, where N may correspond to the number of image projectors). In step 2610, a composite image made up of two or more sub-images is projected onto a build area using the image projection system. In some embodiments, the image projection system is controlled by the image display subsystem using digital light processing. In some embodiments, the composite image comprises a plurality of sub-images arranged in an array, and each sub-image is projected onto a portion of the build area using one of the plurality of image projectors. In step 2615, each of the projected sub-images is monitored using a set of the plurality of sets of light sensors (e.g., using four light sensors in each set). In step 2620, the properties of each sub-image are adjusted and the position of each sub-image within the composite image is aligned using feedback from the plurality of sets of light sensors in the calibration fixture. Some or all of the steps in method 2600 can be performed manually or using automated systems. For example, the monitoring and adjusting steps 2615 and 2620 of calibration process 2600 can be achieved by manual processes where manually read light sensors are used in step 2615 along with image projectors that allow the sub-image to be manually adjusted in step 2620.

Figure 26B:
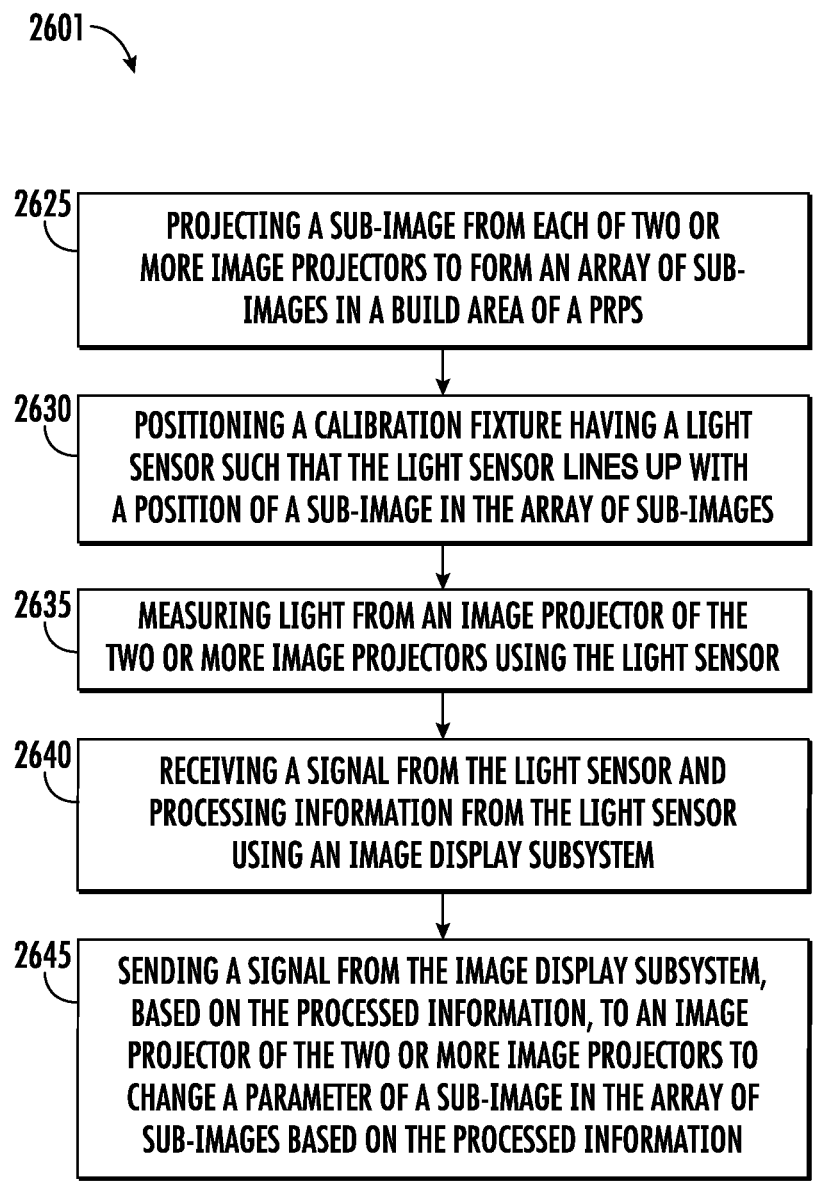
FIG. 26B is a flowchart of a method for adjusting a projected image using a calibration fixture, in accordance with some embodiments.

FIG. 26B is a flowchart of a method 2601 for adjusting a projected image using a calibration fixture, in accordance with some embodiments. For example, method 2601 could be performed by the integrated or modular calibration fixtures shown in FIGS. 16A-16E and 22A-22H. In step 2625, a sub-image is projected from each of two or more image projectors to form an array of sub-images in a build area of a PRPS. The two or more image projectors can be controlled by an image display subsystem of the PRPS. In step 2630, a calibration fixture is positioned having a light sensor such that the light sensor lines up with or coincides with a position of the one or more of the sub-images. In step 2635, light from an image projector of the two or more image projectors is measured using the light sensor. In step 2640, a signal from the light sensor is received, and information from the light sensor is processed using the image display subsystem. In step 2645, a signal is sent from the image display subsystem, based on the processed information, to an image projector of the two or more image projectors to change a parameter of a sub-image in the array of sub-images based on the processed information. Some or all of the steps in method 2601 can be performed manually or using automated systems. For example, the calibration fixture can be manually positioned in step 2630, and then other steps (e.g., 2635, 2640 and 2645) can be performed manually or using automated system (e.g., a control system and/or the image display susbsystem).

Figure 26C:
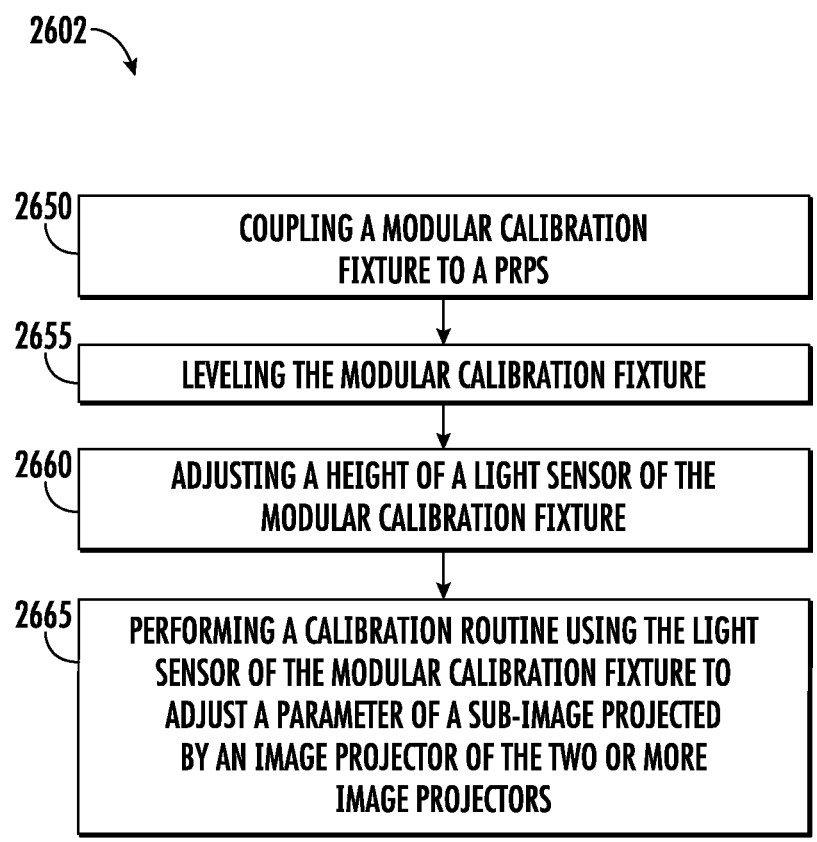
FIG. 26C is a flowchart of a method for adjusting a projected image using a modular calibration fixture, in accordance with some embodiments.

FIG. 26C is a flowchart of a method 2602 for adjusting a projected image using a modular calibration fixture, in accordance with some embodiments. For example, method 2602 could be performed by the modular calibration fixtures shown in FIGS. 22A-22H. In step 2650, a modular calibration fixture is coupled to a PRPS. In step 2655, the modular calibration fixture is leveled. In step 2660, a height of a light sensor of the modular calibration fixture is adjusted. In step 2665, a calibration routine is performed using the light sensor of the modular calibration fixture to adjust a parameter of a sub-image projected by an image projector of the two or more image projectors. Some or all of the steps in method 2602 can be performed manually or using automated systems. For example, the leveling and adjusting steps 2655 and 2660 of calibration process 2602 can be achieved by manual processes, for example, where manually read level sensors are used along with manually adjustable components to manually level the calibration fixture in step 2655. For example, bubble levels may be built into the calibration fixture (or other components of the calibration system) to aid in manual leveling in step 2655.

In some embodiments, a method for adjusting a projected image using a calibration fixture is as follows. A build area is provided with an uncorrected FOV of an image projector, where the FOV contains an X direction and a Y direction perpendicular to each other. The calibration plate is placed into the uncorrected FOV in such a way that the light sensors are between a projector and a known position of an ideal image from the projector in the plane of the build area. The calibration plate can be positioned such that all light sensors, or a minimum number of light sensors (e.g., one movable light sensor, or four stationary light sensors) are within the FOV. The calibration plate is placed into the uncorrected FOV as described above, and a 1 pixel wide vertical line is projected and scanned across the FOV in the X direction to address the complete X range. Then the calibration plate is placed into the uncorrected FOV as described above, and a 1 pixel wide horizontal line is projected and scanned across the FOV in the Y direction to address the complete Y range.

Figure 27B:
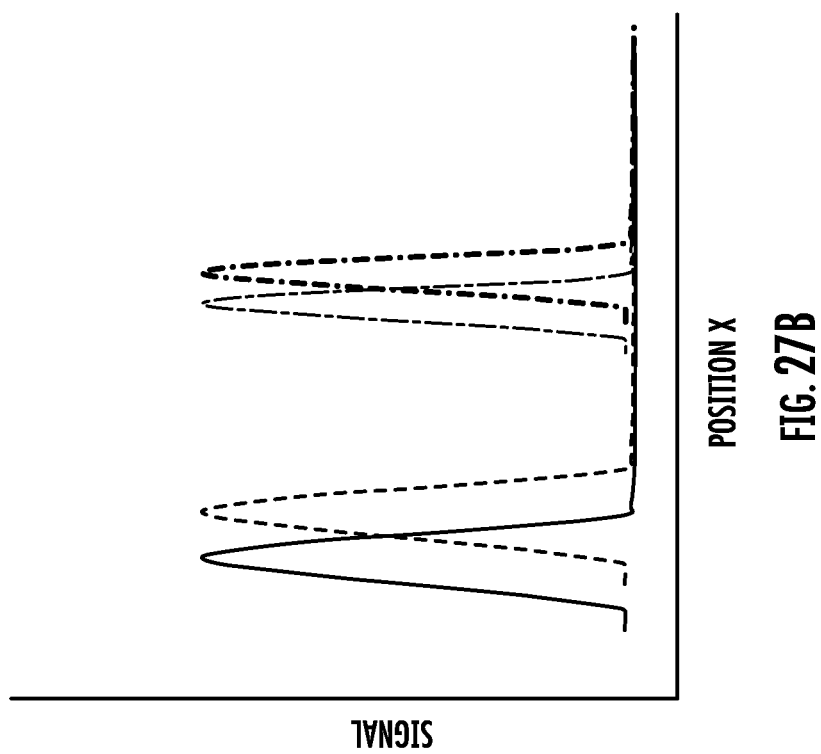
FIG. 27B shows an example of light sensor data from a vertical line scanned in the X direction of the example shown in FIG. 27A, in accordance with some embodiments.
Figure 27A:
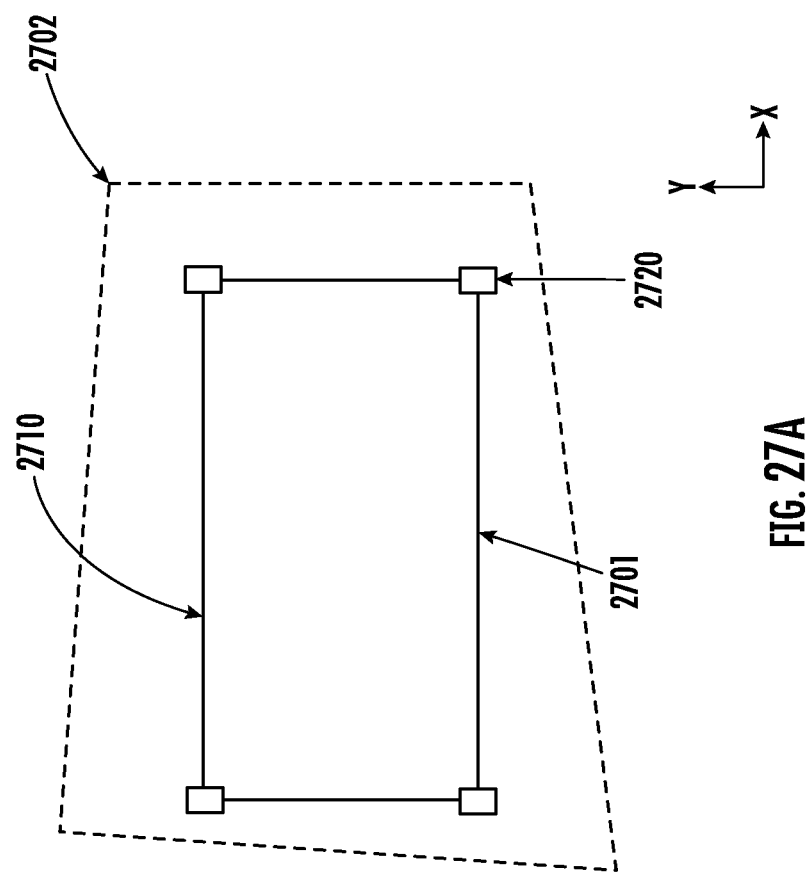
FIG. 27A shows an example of a calibration plate, an uncorrected field of view (FOV) and an expected FOV, in accordance with some embodiments.

FIG. 27A shows an example of a calibration plate 2710, an uncorrected FOV 2702 ("actual projector FOV") and an expected FOV 2701. The expected FOV 2701 corresponds to an image that is aligned with an ideal image. The projector can perform a binary/grey code search (or other search algorithm) to determine the location of the sensors, and then use that information to correct the properties (e.g., warp and skew) and position of the sub-image. During the vertical and horizontal line scans of a binary/grey code search, for example, all four light sensor values are recorded for each bar position. An example of such a scan is shown in the graph in FIG. 27B. In this example, the uncorrected FOV includes some skew, and as a result in the scan of a vertical line along the X direction, all four light sensors have different peaks (as shown in the graph in FIG. 27B). By combining the results of the X direction and Y direction scans, the peaks for each light sensor position can be calculated for the uncorrected FOV. This information, along with the known geometries of the image projector and the build area (or multi-image plane), and the position of the calibration plate with respect to both, enables the display subsystem to adjust the image (e.g., using DLP) such that the corners of the projected image are aligned with the corners of the ideal image in the plane of the build area. In other words, this direct approach enables efficient projector calibration by directly transforming the pixel coordinate space into the imaging plane in the real world.

In other embodiments, instead of the simple linear scanning method described above, an alternative approach can be used in which grey-code horizontal and vertical stripes are displayed. The linear scanning approach can take a few seconds, or more, and this alternative approach allows a binary search of the entire coordinate space in a given dimension much faster than addressing each pixel by indexing a line.

In other embodiments, an image is scanned across one or more stationary light sensors to calibrate a PRPS. The image can be a line (e.g., that is one pixel wide), as described above, or a pattern, or any image that provides information about the intended location of a projected feature and the location of the light sensor detecting the moving image.

In some embodiments, a PRPS includes an image projection system containing an array of sub-images (e.g., in 1D or 2D) that are moved or indexed during the exposure of a layer and/or between the exposures of subsequent layers, and the PRPS further includes a calibration system that can calibrate one or more different sub-image locations projected from one or more of the image projectors in the system. In some embodiments, the calibration fixture contains a plurality of light sensors mounted onto one or more fixtures, and the fixtures align the light sensors in such a way that they can detect the light projected from the image projectors when the sub-images are moved (i.e., when the sub-images are in one or more locations along their movement path). In some embodiments, the calibration fixture contains one or more sub-fixtures with light sensors, and the sub-fixtures (and light sensors) move to detect the light projected from the image projectors when the sub-images are moved.

In some embodiments, the calibration of the moving images is done prior to a print run. In some embodiments, each moving image is calibrated using one or more calibration fixtures, using similar systems and methods as those described herein for calibrating stationary sub-images. In other embodiments, some of the moving images are calibrated using one or more calibration fixtures, and some of the images are calibrated numerically using geometrical relationships (and are not calibrated using a calibration fixture).

In some embodiments, continuously moving sub-images are calibrated using one or more calibration fixtures, using similar systems and methods as those described herein for calibrating stationary sub-images. In the case of moving sub-images, the calibration can be done using a set of light sensors located along the path of the scanned region. The calibration of continuously moving sub-images can be done using a projected pattern defining a layer of an object to be printed or using projected test patterns.

In addition to calibrating the position, warp, skew, and other corrections described herein, moving sub-images need to be calibrated with the image display subsystem so that each sub-image projects the appropriate pattern to expose a particular region of a particular layer of an object to be printed. Step-wise and continuously moving sub-images will each require synchronization with the display subsystem in order to project sub-images (over time) that are required to print a layer of the one or more objects being printed.

Figure 28:
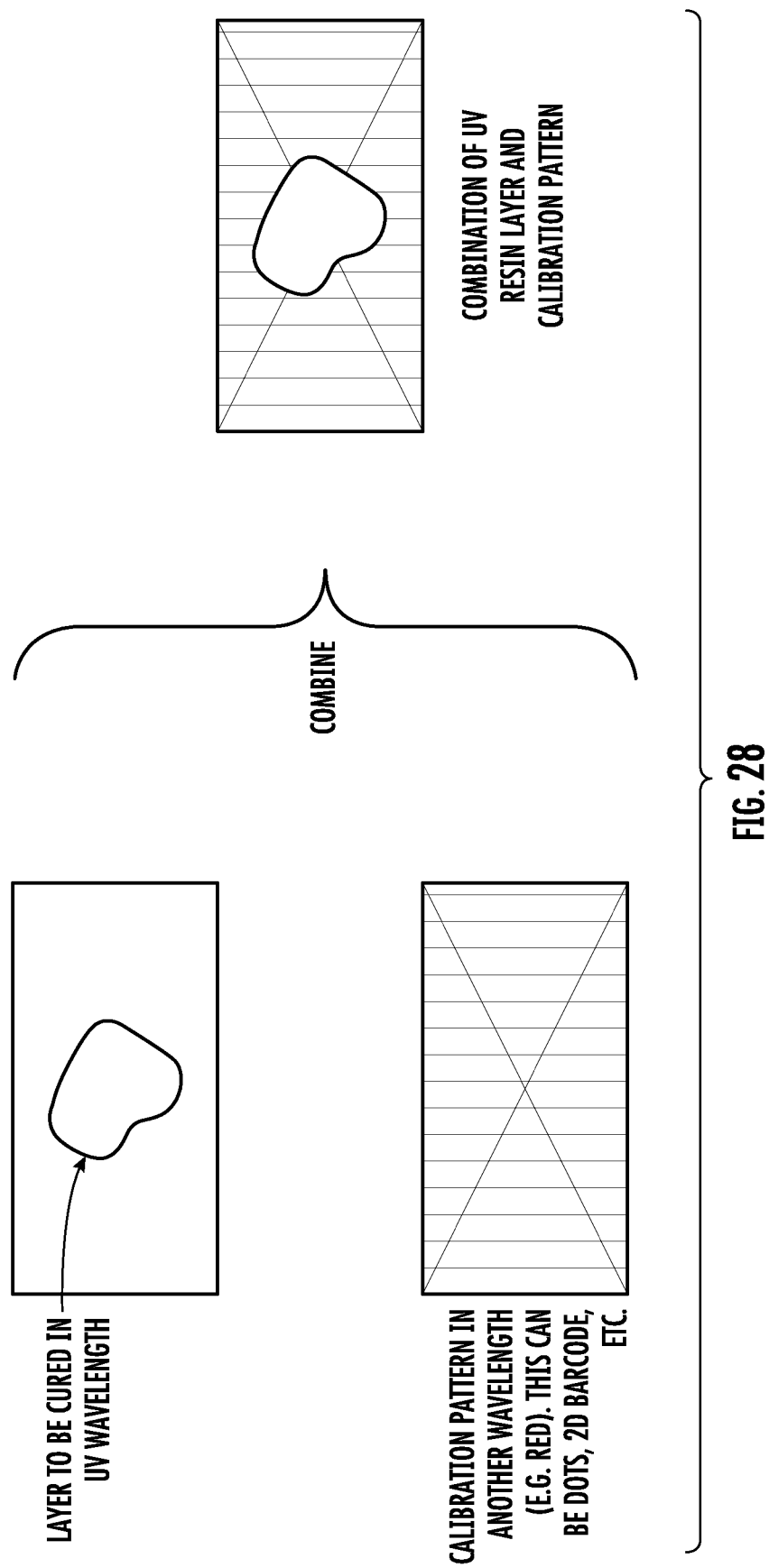
FIG. 28 shows an example of a multi-wavelength image in a PRPS, in accordance with some embodiments.

In some embodiments, an image projector in a PRPS contains a multi-wavelength source, with one or more wavelengths for reacting the resin, and one or more wavelengths that do not react the resin and are used for calibration. FIG. 28 shows an example of a multi-wavelength image in a PRPS. In the example shown in the figure, a layer is to be cured using a UV wavelength image, and a calibration pattern is present in the image in another wavelength. For example, the calibration image can be a pattern of dots, a 2D barcode, or a pattern of lines (as shown in the figure). The left side of the figure shows the image created by each wavelength separately, and the right side of the figure shows the combined image with both wavelengths.

In some embodiments, a calibration fixture is used to adjust a projected image in a PRPS by inserting a calibration plate between print runs, adjusting the image, removing the calibration plate after the adjustment is complete, and then performing a print run. In other embodiments, a calibration fixture is used to adjust a projected image in a PRPS during a print run. In some such embodiments, the light sensors of the calibration plate can be positioned such that they can detect light from known positions in the FOV of one (or more than one) projectors without interfering with the projected image in the plane of the build area.

Figure 29:
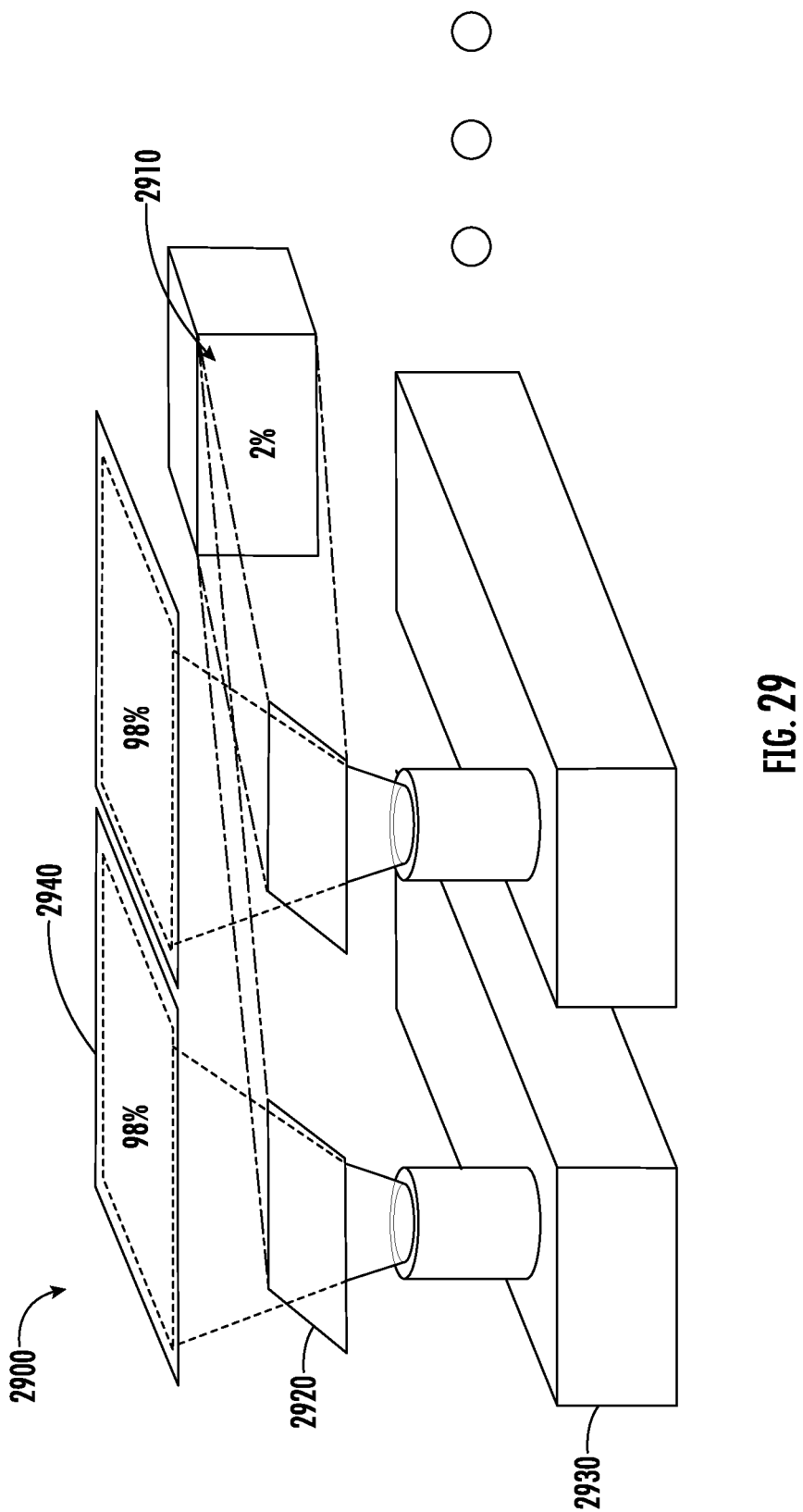
FIG. 29 shows an example of a PRPS with a calibration fixture that can be used to adjust a projected image during a print run, in accordance with some embodiments.

One possible configuration of a PRPS with a calibration fixture 2910 that can be used to adjust a projected image 2940 during a print run is shown in FIG. 29. In some embodiments, the system in FIG. 29 uses a partially reflective mirror 2920 to allow most of the light (e.g., 98%) to pass through and react the resin in the build area, and reflect a small percentage (e.g., 2%) of the light to a calibration fixture 2910 away from the build area. The position of the light sensors in the calibration plate can be mapped to positions in the FOV in the plane of the build area for each projector 2930, which enables information from the calibration fixture 2910 to be used to adjust the image 2940. In some such embodiments, the calibration fixture 2910 contains an imaging camera to detect a projected image and the detected image is used to adjust the image (or composite image, or sub-image). In the example shown in FIG. 29, light from multiple image projectors 2930 is reflected onto a single calibration fixture 2910. In other embodiments, each image projector 2930 has a partially reflective mirror 2920 and a dedicated calibration fixture (e.g., with light sensors, or imaging cameras) so that the sub-image from each projector 2930 can be adjusted using information from the dedicated calibration fixture.

In other embodiments, the system in FIG. 29 uses multi-wavelength sources and wavelength specific mirrors (not shown). The wavelength specific mirrors are transmissive to the wavelengths used to react the resin, to allow the light to pass through and react the resin in the build area, while being reflective to the wavelengths of calibration patterns. In some such embodiments, the multiple projectors in the image projection system can use different calibration patterns from each other, which enables adjustment of all of the sub-images simultaneously during a print run.

The calibration processes described herein (e.g., calibration processes 2100 in FIGS. 21, and 2600-2602 in FIGS. 26A-26C) can be performed using bottom up PRPS systems, where one or more image projectors are facing up and project images (or sub-images) through the bottom of a resin vat. Examples of bottom up PRPS systems are shown in FIGS. 1A-1G, 10A-10F and 30-32.

Figure 30:
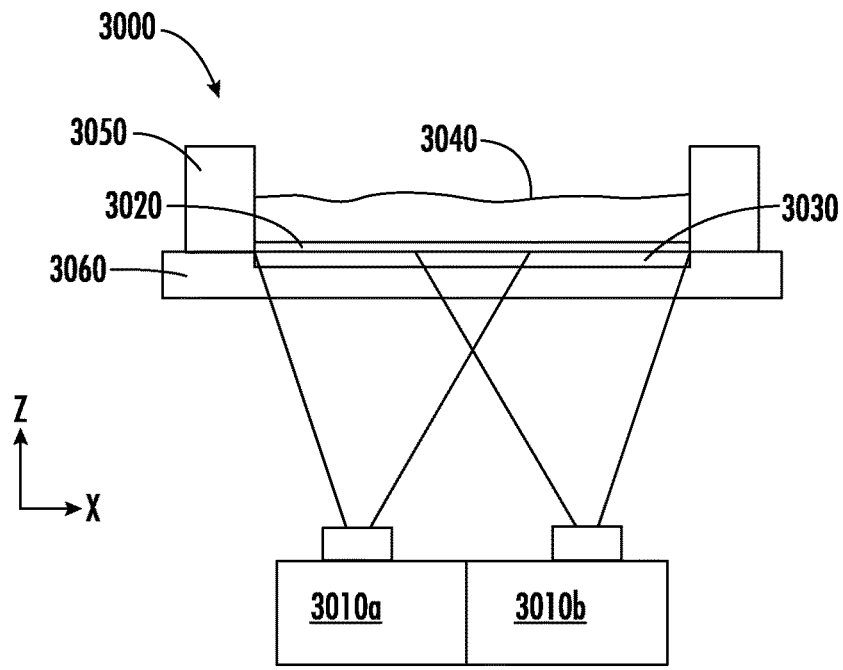
FIG. 30 shows a front view of an example of a "double wide" bottom up PRPS with two image projectors and facing up (i.e., in the positive Z-direction), in accordance with some embodiments.

FIG. 30 shows a front view of an example of a "double wide" bottom up PRPS 3000 with two image projectors 3010a and 3010b facing up (i.e., in the positive Z-direction). The image projectors 3010a-b project sub-images through membrane 3020 and optional glass plate 3030, and into resin 3040 of a resin vat 3050. The membrane 3020 forms the bottom of the resin vat 3050, as described herein. Resin vat 3050 can also be referred to as a resin tub. PRPS mechanics 3060 can include a membrane tension system to apply a tension to the membrane 3020 (as described herein) and other mechanics (e.g., a chassis to support the resin 3040 and the resin vat 3050).

Figure 31:
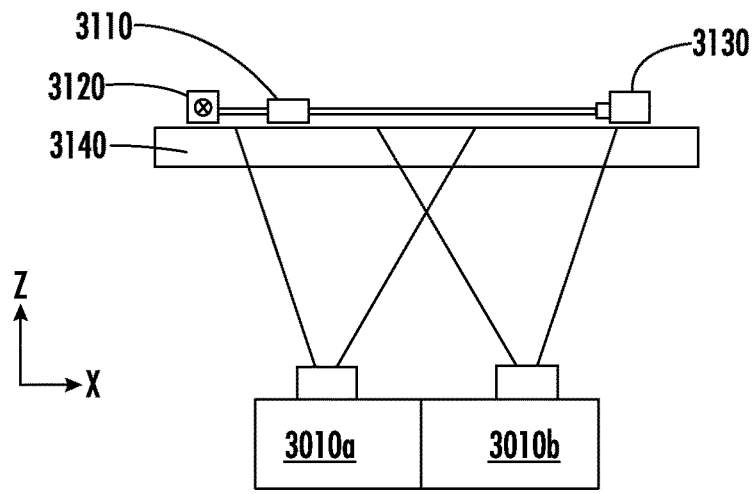
FIG. 31 shows a front view of the bottom up PRPS in FIG. 30 with some of the components temporarily removed, and an example of a modular calibration fixture inserted to calibrate the PRPS, in accordance with some embodiments.

FIG. 31 shows a front view of the bottom up PRPS 3000 in FIG. 30 with some of the components temporarily removed, and an example of a modular calibration fixture inserted to calibrate PRPS 3000. The modular calibration fixture in this example includes a light sensor 3110, a Y-motor 3120 and an X-motor 3130. The components of the PRPS that mechanically interfere with the calibration fixture, such as the membrane 3020, optional glass plate 3030, resin 3040 and resin vat 3050, have all been removed so that the calibration fixture can position light sensor 3110 in a position (e.g., in or near the multi-image plane) to calibrate PRPS 3000. In some cases, PRPS mechanics 3060 in FIG. 30 and PRPS mechanics 3140 are the same, meaning that no PRPS mechanics are removed during calibration. In some cases, some of the PRPS mechanics 3060 can be removed and some of the PRPS mechanics 3140 (where PRPS mechanics 3140 are a subset of PRPS mechanics 3060) that do not interfere with the calibration fixture can be left in the PRPS during calibration. Some examples of PRPS mechanics 3060 in FIG. 30 and/or PRPS mechanics 3140 in FIG. 31 are a mechanical plate (e.g., all or a portion of chassis 105 in FIG. 1A) and/or a structure of the PRPS that holds removable components (e.g., the membrane 3020, optional glass plate 3030, resin 3040 and resin vat 3050, shown in FIG. 30).

In some embodiments, some of the PRPS mechanics 3140 enable the light sensor 3110 to be fixed at an ideal image plane distance that is sufficiently level. In such cases, movement of the calibration fixture in the Z direction (e.g., using Z-motors) may not be needed. In some cases, the calibration fixture in FIG. 31 can additionally be able to move in the Z direction (e.g., using Z-motors, not shown) for calibration and/or to add flexibility to the system as a contingency.

Figure 32:
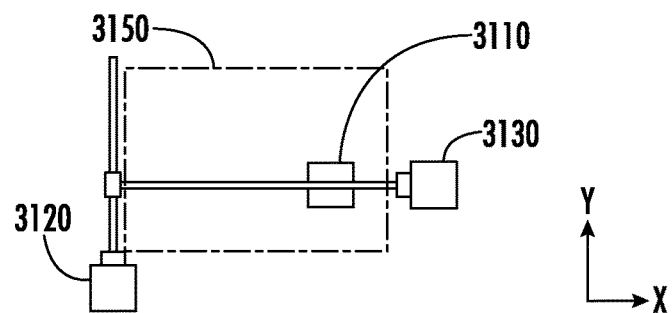
FIG. 32 shows a top view of the calibration fixture of FIG. 31, in accordance with some embodiments.

FIG. 32 shows a top view of the calibration fixture of FIG. 31. Light sensor 3110, Y-motor 3120 and X-motor 3130 are configured to enable light sensor 3110 to be positioned at various locations of the multi-image plane 3150. The configuration shown in FIG. 32 is only one possible example, and other configurations of motors can be used to move the light sensor in the X-Y area of the multi-image plane. In other cases, the X motor can be coupled to a component of the Y-motor, such that it rides along the Y-motor screwlead. In this example, some of the the PRPS mechanics 3140 in FIG. 31 are used to couple to and/or support the calibration fixture, which fixes and levels the calibration fixture at the optimal Z-height (distance from the image projectors). Accordingly, there are no Z-motors shown in FIGS. 31 and 32, since no Z adjustment is needed in this example. In other embodiments, the calibration fixture can also include Z-motors (e.g., as shown in FIGS. 22A-22C and 22G-22H).

In some embodiments, a bottom up PRPS with more than 2 image projectors can also be calibrated using the systems and methods described herein. For example, a bottom up PRPS with four image projectors (e.g., similar to the systems shown in FIGS. 1A-1G) can be calibrated using a modular calibration fixture (e.g., similar to the one shown in FIGS. 31 and 32). In other cases, a bottom PRPS with more than four image projectors (e.g., from 6 to 12 image projectors) can be calibrated using a modular calibration fixture (e.g., similar to the one shown in FIGS. 31 and 32). A challenge with large area bottom up PRPSs is the membrane, since it can be difficult to tension the membrane sufficiently. However, the calibration systems and methods described herein are not reliant on the membrane and therefore no such challenge exists with calibrating large area bottom up PRPSs.

Additional Embodiments

In a first aspect, the present disclosure provides an additive manufacturing system, comprising: an image projection system projecting a composite image onto a build area; and a display subsystem that controls the image projection system using digital light processing; wherein: the image projection system comprises a plurality of image projectors; the composite image comprises a plurality of sub-images arranged in an array or matrix (e.g., a 1×2, 1×4, 1×8, or 1×N array, or a 2×2, 3×2, 4×16, or N×M matrix); each of the image projectors projects a sub-image onto a portion of the build area; and the display subsystem controls each of the image projectors to adjust the properties of each sub-image and the alignment of the position of each sub-image within the composite image.

In another form of the first aspect, the properties of each sub-image are adjusted using a filter comprising: a warp correction that provides geometric correction.

In another form of the first aspect, the properties of each sub-image are adjusted using a filter comprising: an edge blending bar at one or more sub-image edges.

In another form of the first aspect, the edge blending bar comprises a blending distance and a function selected from the group consisting of: linear, sigmoid and geometric.

In another form of the first aspect, the edge blending bar adjusts the image based on a layer boundary location within the object being manufactured.

In another form of the first aspect, the properties of each sub-image are adjusted using a filter comprising: an irradiance mask that normalizes irradiance.

In another form of the first aspect, the properties of each sub-image are adjusted using a filter comprising: a "gamma" adjustment mask that adjusts sub-image energy based on a reactivity of the resin being used.

In another form of the first aspect, the properties of each sub-image are adjusted using a stack of filters comprising: a warp correction that provides geometric correction; an edge blending bar at one or more sub-image edges; an irradiance mask that normalizes irradiance; and a "gamma" adjustment mask that adjusts sub-image energy based on a reactivity of the resin being used.

In another form of the first aspect, further comprising: a circuit that synchronizes exposure control of the plurality of image projectors with each other.

In another form of the first aspect, the additive manufacturing system is a photoreactive 3D printing system (PRPS) further comprising a pool of resin, wherein the build area is located within the pool of resin.

In another form of the first aspect, further comprising: a calibration fixture comprising a plurality of sets of light sensors, wherein the properties of each sub-image and the alignment of the position of each sub-image within the composite image are adjusted using feedback from the plurality of sets of light sensors in the calibration fixture.

In another form of the first aspect, the calibration fixture further comprises light sensors that monitor the four corners of each sub-image.

In another form of the first aspect, adjacent sub-images in the array overlap at the sub-image edges.

In another form of the first aspect, the display subsystem uses real time feedback from the plurality of sets of light sensors in the calibration fixture to adjust the properties of each sub-image and the alignment of the position of each sub-image within the composite image before a print run.

In another form of the first aspect, the display subsystem uses real time feedback from the plurality of sets of light sensors in the calibration fixture to adjust the properties of each sub-image and the alignment of the position of each sub-image within the composite image during a print run using real time feedback from the calibration fixture.

In another form of the first aspect, the image projection system is configured to move the plurality of sub-images to different portions of the build area during the exposure of a layer.

In another form of the first aspect, the image projection comprises a movable light source or a movable optical system.

In another form of the first aspect, the movement of the sub-images is either a step-expose-step type movement or a continuous movement.

In another form of the first aspect, the plurality of sub-images comprises a 1D array of sub-images oriented in a first direction; and the movement of the sub-images is in a second direction perpendicular to the first direction.

In another form of the first aspect, the plurality of sub-images comprises a 2D array (or matrix) of sub-images with rows oriented along a first direction and columns oriented along a second direction; and the movement of the sub-images is in either one of the first or second directions, or both the first and second directions.

In another form of the first aspect, the plurality of sub-images comprises a 2D array of sub-images with rows oriented along a first direction and columns oriented along a second direction; and the movement of the sub-images is in a third direction that is different from both the first and second directions.

In a second aspect, the present disclosure provides an additive manufacturing system, comprising: an image projection system projecting a composite image onto a build area; a display subsystem that controls the image projection system using digital light processing; and a calibration fixture comprising a plurality of sets of light sensors; wherein: the image projection system comprises a plurality of image projectors; the composite image comprises a plurality of sub-images arranged in an array; each of the image projectors projects a sub-image onto a portion of the build area; each set of light sensors in the calibration fixture monitors a projected sub-image; and the properties of each sub-image and the alignment of the position of each sub-image within the composite image are adjusted using feedback from the plurality of sets of light sensors in the calibration fixture.

In another form of the second aspect, the calibration fixture further comprises light sensors that monitor the four corners of each sub-image.

In another form of the second aspect, adjacent sub-images in the array overlap at the sub-image edges.

In another form of the second aspect, the display subsystem uses real time feedback from the plurality of sets of light sensors in the calibration fixture to adjust the properties of each sub-image and the alignment of the position of each sub-image within the composite image before a print run.

In another form of the second aspect, the display subsystem uses real time feedback from the plurality of sets of light sensors in the calibration fixture to adjust the properties of each sub-image and the alignment of the position of each sub-image within the composite image during a print run using real time feedback from the calibration fixture.

In another form of the second aspect, the properties of each sub-image are adjusted using a filter comprising: a warp correction that provides geometric correction.

In another form of the second aspect, adjacent sub-images in the array overlap with one another at the sub-image edges; and the properties of each sub-image are adjusted using a filter comprising: an edge blending bar at one or more sub-image edges.

In another form of the second aspect, the edge blending bar comprises a blending distance and a function selected from the group consisting of: linear, sigmoid and geometric.

In another form of the second aspect, the edge blending bar adjusts the image based on a layer boundary location within the object being manufactured.

In another form of the second aspect, the properties of each sub-image are adjusted using a filter comprising: an irradiance mask that normalizes irradiance.

In another form of the second aspect, the properties of each sub-image are adjusted using a filter comprising: a "gamma" adjustment mask that adjusts sub-image energy based on a reactivity of the resin being used.

In another form of the second aspect, the properties of each sub-image are adjusted using a filter comprising: a warp correction that provides geometric correction; an edge blending bar at one or more sub-image edges; an irradiance mask that normalizes irradiance; and a "gamma" adjustment mask that adjusts sub-image energy based on a reactivity of the resin being used.

In another form of the second aspect, further comprising: a circuit that synchronizes exposure control of the plurality of image projectors with each other.

In another form of the second aspect, the additive manufacturing system is a photoreactive 3D printing system further comprising a pool of resin, wherein the build area is located within the pool of resin.

In another form of the second aspect, the image projection system is configured to move the plurality of sub-images to different portions of the build area during the exposure of a layer.

In another form of the second aspect, wherein the image projection comprises a movable light source or a movable optical system.

In another form of the second aspect, the movement of the sub-images is either a step-expose-step type movement or a continuous movement.

In another form of the second aspect, the plurality of sub-images comprises a 1D array of sub-images oriented in a first direction; and the movement of the sub-images is in a second direction perpendicular to the first direction.

In another form of the second aspect, the plurality of sub-images comprises a 2D array of sub-images with rows oriented along a first direction and columns oriented along a second direction; and the movement of the sub-images is in either one of the first or second directions, or both the first and second directions.

In another form of the second aspect, the plurality of sub-images comprises a 2D array of sub-images with rows oriented along a first direction and columns oriented along a second direction; and the movement of the sub-images is in a third direction that is different from both the first and second directions.

In a third aspect, the present disclosure provides a method comprising: providing an additive manufacturing system, comprising: an image projection system comprising a plurality of image projectors; an image display subsystem; and a calibration fixture comprising a plurality of sets of light sensors; projecting a composite image onto a build area using the image projection system, wherein: the image projection system is controlled by the image display subsystem using digital light processing; the composite image comprises a plurality of sub-images arranged in an array; and each sub-image is projected onto a portion of the build area using one of the plurality of image projectors; monitoring each of the projected sub-images using a set of the plurality of sets of light sensors; and adjusting the properties of each sub-image and aligning the position of each sub-image within the composite image using feedback from the plurality of sets of light sensors in the calibration fixture.

In another form of the third aspect, the calibration fixture further comprises light sensors that monitor the four corners of each sub-image.

In another form of the third aspect, adjacent sub-images in the array overlap at the sub-image edges.

In another form of the third aspect, the display subsystem uses real time feedback from the plurality of sets of light sensors in the calibration fixture to adjust the properties of each sub-image and the alignment of the position of each sub-image within the composite image before a print run.

In another form of the third aspect, the display subsystem uses real time feedback from the plurality of sets of light sensors in the calibration fixture to adjust the properties of each sub-image and the alignment of the position of each sub-image within the composite image during a print run using real time feedback from the calibration fixture.

In another form of the third aspect, the properties of each sub-image are adjusted using a filter comprising: a warp correction that provides geometric correction.

In another form of the third aspect, adjacent sub-images in the array overlap with one another at the sub-image edges; and the properties of each sub-image are adjusted using a filter comprising: an edge blending bar at one or more sub-image edges.

In another form of the third aspect, the edge blending bar comprises a blending distance and a function selected from the group consisting of: linear, sigmoid and geometric.

In another form of the third aspect, the edge blending bar adjusts the image based on a layer boundary location within the object being manufactured.

In another form of the third aspect, the properties of each sub-image are adjusted using a filter comprising: an irradiance mask that normalizes irradiance.

In another form of the third aspect, the properties of each sub-image are adjusted using a filter comprising: a "gamma" adjustment mask that adjusts sub-image energy based on a reactivity of the resin being used.

In another form of the third aspect, the properties of each sub-image are adjusted using a filter comprising: a warp correction that provides geometric correction; an edge blending bar at one or more sub-image edges; an irradiance mask that normalizes irradiance; and a "gamma" adjustment mask that adjusts sub-image energy based on a reactivity of the resin being used.

In another form of the third aspect, further comprising: a circuit that synchronizes exposure control of the plurality of image projectors with each other.

In another form of the third aspect, further comprising: the additive manufacturing system is a photoreactive 3D printing system further comprising a pool of resin, wherein the build area is located within the pool of resin.

In another form of the third aspect, the projecting the composite image further comprises moving the plurality of sub-images during the exposure of a layer.

In another form of the third aspect, the movement of the sub-images is either a step-expose-step type movement or a continuous movement.

In another form of the third aspect, the plurality of sub-images comprises a 1D array of sub-images oriented in a first direction; and the movement of the sub-images is in a second direction perpendicular to the first direction.

In another form of the third aspect, the plurality of sub-images comprises a 2D array of sub-images with rows oriented along a first direction and columns oriented along a second direction; and the movement of the sub-images is in either one of the first or second directions, or both the first and second directions.

In another form of the third aspect, the plurality of sub-images comprises a 2D array of sub-images with rows oriented along a first direction and columns oriented along a second direction; and the movement of the sub-images is in a third direction that is different from both the first and second directions.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments.

For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method of calibrating three or more image projectors of a photoreactive 3D printing system (PRPS), the method comprising:
projecting a sub-image from each of the three or more image projectors to form an array of sub-images in a build area of the PRPS, wherein the three or more image projectors are controlled by an image display subsystem, wherein the three or more image projectors are each stationary, wherein a first image projector of the three or more image projectors faces the build area and projects a sub-image directly onto the build area, and wherein a second image projector of the three or more image projectors faces a bounce mirror that redirects light from the second image projector onto the build area;
positioning a calibration fixture having a light sensor such that the light sensor lines up with a position of a sub-image in the array of sub-images, wherein the calibration fixture further comprises a movement system coupled to the light sensor, wherein the movement system moves the light sensor to different positions that line up with positions of the sub-images of the array of sub-images;
measuring light from an image projector of the three or more image projectors using the light sensor;
receiving a first signal from the light sensor using the image display subsystem;
processing information from the light sensor using the image display subsystem; and
sending a second signal from the image display subsystem to the image projector of the three or more image projectors to change a parameter of the sub-image in the array of sub-images based on the processed information.

2. The method of claim 1, wherein the parameter of the sub-image in the array of sub-images is a position, an intensity, an intensity distribution, an irradiance, an irradiance distribution, a size, an amount of zoom, a focus, an edge-blending parameter, a gamma, a skew, or a warp.

3. The method of claim 1, wherein the measuring light from an image protector of the three or more image projectors using the light sensor further comprises moving the light sensor such that the light sensor measures light at two or more locations within an X-Y area of the photoreactive 3D printing system (PRPS), wherein the X-Y area is approximately registered with at least a portion of the build area.

4. The method of claim 3, wherein the calibration fixture comprises a plurality of light sensors that are moved across the X-Y area, and information from the plurality of light sensors is used by the image display subsystem to change the parameter.

5. A photoreactive 3D printing system (PRPS) comprising:
a resin vat comprising a build area;
three or more image projectors each configured to project a sub-image onto the build area, wherein the three or more image projectors are each stationary, wherein a first image projector of the three or more image projectors faces the build area and is configured to project a sub-image directly onto the build area, and wherein a second image projector of the three or more image projectors faces a bounce mirror configured to redirect light from the second image projector onto the build area;
a calibration fixture comprising a light sensor configured to measure light from the three or more image projectors, wherein the light sensor lines up with a position of a sub-image of the three or more sub-images; and
an image display subsystem in communication with the calibration fixture and the three or more image projectors,
wherein the calibration fixture further comprises a movement system coupled to the light sensor, wherein the movement system is configured to move the light sensor to different positions that line up with positions of the sub-images of the three or more sub-images.

6. The photoreactive 3D printing system (PRPS) of claim 5, wherein the light sensor faces the first image projector.

7. The photoreactive 3D printing system (PRPS) of claim 5, wherein the light sensor is positioned in a plane of the build area.

8. The photoreactive 3D printing system (PRPS) of claim 5, wherein the light sensor is configured to detect projected light from an image projector of the three or more image projectors without the projected light reflecting off of a calibration surface or calibration feature.

9. The photoreactive 3D printing system (PRPS) of claim 5, wherein the light sensor is configured to detect light from the bounce mirror without the light from the bounce mirror reflecting off of a calibration surface or calibration feature.

10. The photoreactive 3D printing system (PRPS) of claim 5, wherein the image display subsystem is configured to receive a first signal from the light sensor, process information from the light sensor using a controller or processor, and send a second signal to an image projector of the three or more image projectors to change a parameter of the sub-image of the three or more sub-images.

11. The photoreactive 3D printing system (PRPS) of claim 10, wherein the parameter of the sub-image of the three or more sub-images is a position, an intensity, an intensity distribution, an irradiance, an irradiance distribution, a size, an amount of zoom, a focus, an edge-blending parameter, a gamma, a skew, or a warp.

12. The photoreactive 3D printing system (PRPS) of claim 5, wherein the calibration fixture further comprises a plurality of light sensors that are coupled to the movement system.

13. The photoreactive 3D printing system (PRPS) of claim 5, wherein the calibration fixture further comprises linear stages and Z motors configured to move the calibration fixture with respect to the resin vat to maintain levelness with a top surface of resin in the resin vat.

14. The photoreactive 3D printing system (PRPS) of claim 5, wherein the movement system comprises a first linear motor configured to move the light sensor in an X direction that is approximately parallel to a plane of the build area.

15. The photoreactive 3D printing system (PRPS) of claim 14, wherein the movement system comprises a second linear motor oriented approximately perpendicular to the first linear motor, wherein the first and second linear motors are configured to move the light sensor in the X direction and in a Y direction, wherein the Y direction is approximately parallel to the plane of the build area and is approximately perpendicular to the X direction.

* * * * *